US012299196B2

(12) United States Patent
Walkington et al.

(10) Patent No.: US 12,299,196 B2
(45) Date of Patent: May 13, 2025

(54) SENSORS FOR ACCURATELY INTERACTING WITH OBJECTS IN AN ARTIFICIAL-REALITY ENVIRONMENT, AND SYSTEMS AND METHODS OF USE THEREOF

(71) Applicant: Meta Platforms Technologies, LLC, Menlo Park, CA (US)

(72) Inventors: Peter Walkington, New York, NY (US); Zaina Edelson, New York, NY (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 18/545,969

(22) Filed: Dec. 19, 2023

(65) Prior Publication Data
US 2024/0302899 A1  Sep. 12, 2024

Related U.S. Application Data

(60) Provisional application No. 63/488,958, filed on Mar. 7, 2023.

(51) Int. Cl.
*G06F 3/01* (2006.01)
*G06F 3/0346* (2013.01)
(52) U.S. Cl.
CPC .............. *G06F 3/015* (2013.01); *G06F 3/017* (2013.01); *G06F 3/0346* (2013.01)
(58) Field of Classification Search
None
See application file for complete search history.

(56) References Cited

U.S. PATENT DOCUMENTS

2020/0069210 A1  3/2020  Berenzweig et al.
2022/0019284 A1* 1/2022  Kaifosh .................. G06F 3/016
2022/0134219 A1  5/2022  Stafford et al.

FOREIGN PATENT DOCUMENTS

KR      20210059079 A      5/2021

OTHER PUBLICATIONS

European Search Report for European Patent Application No. 24154761.1, dated May 23, 2024, 7 pages.
Unuma Y., et al., "See-through Mobile AR System for Natural 3D Interaction," Adjunct Proceedings of the 15th International Conference on Automotive User Interfaces and Interactive Vehicular Applications, Feb. 24, 2014, pp. 17-20.

* cited by examiner

*Primary Examiner* — Stephen T. Reed
(74) *Attorney, Agent, or Firm* — Morgan, Lewis & Bockius LLP

(57) ABSTRACT

The various implementations described herein include methods and systems for tracking user movements. In one aspect, a method includes, while a user is interacting with a virtual object, obtaining tracking information by tracking, via a sensor, a position of an arm of a user. The method also includes, in conjunction with tracking the position of the arm, obtaining wrist information by detecting, via a neuromuscular-signal sensor, a movement of a wrist of the arm. The method further includes assigning one or more motion characteristics to the virtual object in accordance with the tracking information and the wrist information.

19 Claims, 30 Drawing Sheets

SENSORS FOR ACCURATELY INTERACTING WITH OBJECTS IN AN ARTIFICIAL-REALITY ENVIRONMENT, AND SYSTEMS AND METHODS OF USE THEREOF

PRIORITY AND RELATED APPLICATIONS

This application claims priority to U.S. Provisional Patent Application No. 63/488,958, entitled "Accurately Throwing Objects in an Artificial-Reality Environment Using Two Different Sensors for Hand-Position Tracking and Wrist-Movement Tracking, and Systems and Methods of Use Thereof" filed Mar. 7, 2023, which is hereby incorporated by reference in its entirety.

TECHNICAL FIELD

This present disclosure relates generally to devices and methods for tracking a user's movement, including but not limited to, detecting in-air movements performed by a user's arm, wrist, and/or hand while the user is interacting with an artificial-reality system.

BACKGROUND

Artificial reality is used in a variety of applications such as entertainment (e.g., playing video games or experiencing new surroundings), sports training, medical, and commercial applications. For a positive user experience, a user expects their movements to translate correctly into the artificial-reality space. Thus, accurately and precisely tracking and responding to a user's movements is important to the user experience.

Some artificial-reality systems use cameras to attempt to track user movements. However, these techniques for detecting user movements are not sufficiently accurate or precise, and lead to issues where the artificial-reality environment does not respond to user movements as the user would expect and intend. As such, there is a need to address these challenges.

SUMMARY

As discussed above, there is a need for accurate and precise user movement tracking while a user is engaged in an artificial-reality experience. Accordingly, methods, systems, and devices described herein provide users interacting with an artificial-reality environment with an enhanced user experience by more accurately and precisely tracking and responding to their movements (e.g., arm, wrist, and/or hand movements). For example, the devices described herein include one or more sensors (e.g., an inertial measurement unit (IMU) and/or neuromuscular-signal sensor) such that movements in a user's arm, wrist, and/or hand are more precisely and accurately detected and the corresponding reactions to those movements are represented accurately and precisely in the artificial-reality environment.

The present disclosure includes methods and systems for tracking a user's arm, hand, and/or wrist while the user is throwing a virtual object such as a ball. In some embodiments, sensors in a wearable device (e.g., in conjunction with information from a camera) track a user's movements and accurately represent the user's movements in the artificial-reality environment. For example, while immersed in artificial reality, a user can throw different types of pitches (e.g., a fast ball and/or a curve ball) and, due to the sensors, the artificial-reality system is able to assign motion characteristics to the virtual ball to accurately represent the user's movements and intentions when throwing the virtual ball.

In another example, the user is playing virtual golf while immersed in artificial reality, and sensors in a wrist-wearable device (e.g., in conjunction with sensors in a controller) accurately and precisely detect the user's subtle wrist and/or arm movements. Thus, if the user is attempting to perform a specific type of swing, or hits the ball a specific way, the sensors accurately and precisely capture the user's movements and represent them in the artificial-reality environment (e.g., apply the corresponding motion characteristics to the virtual golf ball).

One example of a method of tracking user movements is described herein. The method includes, while a user is interacting with a virtual object, obtaining tracking information by tracking, via a sensor, a position of an arm of a user. The method further includes, in conjunction with tracking the position of the arm, obtaining wrist information by detecting, via a neuromuscular-signal sensor, a movement of a wrist of the arm; and assigning one or more motion characteristics to the virtual object in accordance with the tracking information and the wrist information.

In some embodiments, a computing device (e.g., a wearable device or an intermediary device, such as a smartphone or desktop or laptop computer) includes one or more processors, memory, a display (in some embodiments, the display can be optional, such as for certain example intermediary devices that can coordinate operations at the wrist-wearable device and the head-wearable device, and thus have ample processing and power resources, but need not have its own display), and one or more programs stored in the memory. The programs are configured for execution by the one or more processors. The one or more programs include instructions for performing (or causing performance of) any of the methods described herein.

In some embodiments, a non-transitory computer-readable storage medium stores one or more programs configured for execution by a computing device (e.g., a wearable device, or an intermediary device that can be configured to coordinate operations at the wearable device(s)) having one or more processors and memory. The one or more programs include instructions for performing (or causing performance of) any of the methods described herein.

Thus, methods, systems, and computer-readable storage media are disclosed for tracking and responding to user movements. Such methods and systems may complement or replace conventional methods for tracking and responding to user movements.

The features and advantages described in the specification are not necessarily all inclusive and, in particular, certain additional features and advantages will be apparent to one of ordinary skill in the art in view of the drawings, specification, and claims. Moreover, it should be noted that the language used in the specification has been principally selected for readability and instructional purposes. Having summarized the above example aspects, a brief description of the drawings will now be presented.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 6A, 6B, 6C-1, 6C-2, 6D-1, and 6D-2 illustrate example AR systems in accordance with some embodiments.

FIGS. 8A, 8B-1, 8B-2, and 8C illustrate example artificial-reality systems in accordance with some embodiments.

Figure 1A:
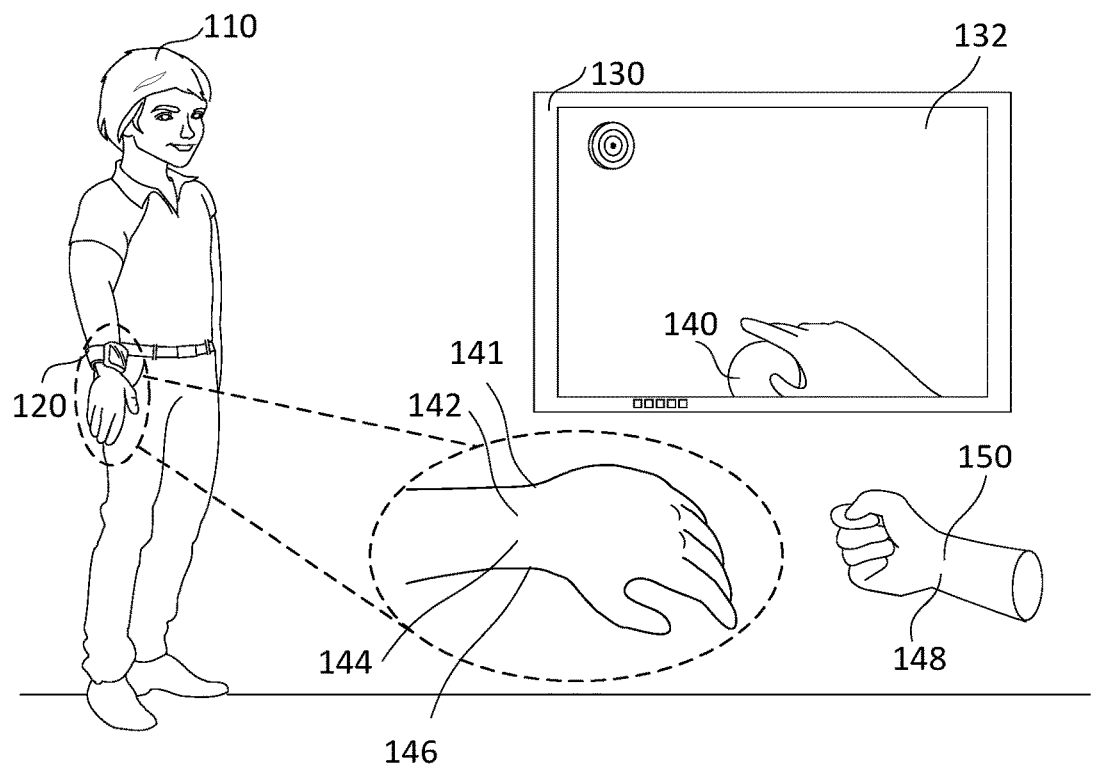
FIG. 1-1H illustrates examples of a user throwing a virtual object while wearing a wrist-wearable device in accordance with some embodiments.
Figure 1A:
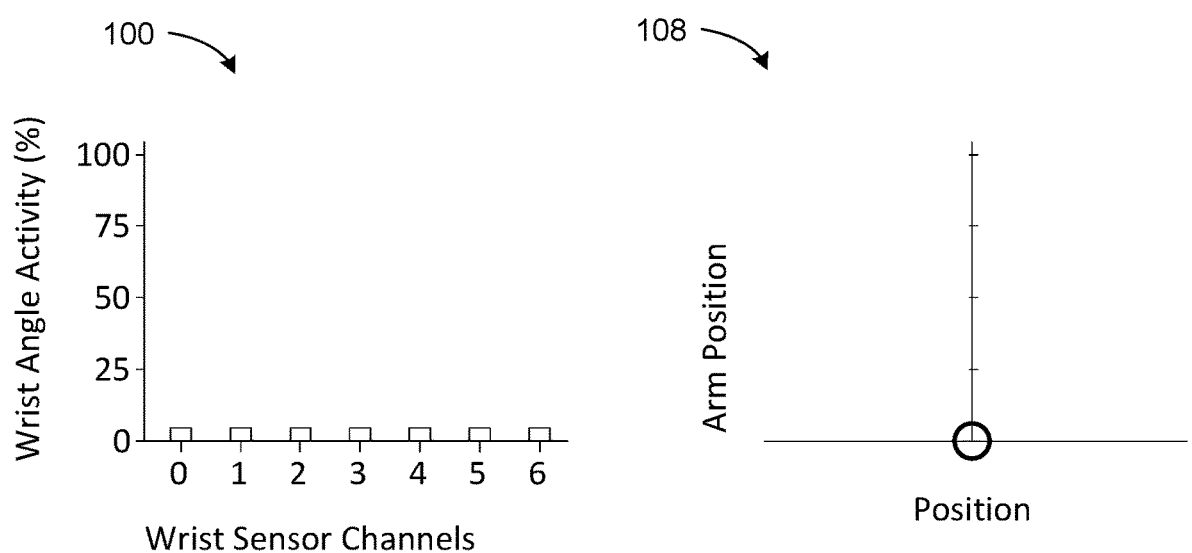

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

The present disclosure describes using neuromuscular-signal sensors (e.g., in conjunction with other types of sensors) to track a user's arm, wrist, and/or hand movements. Using neuromuscular-signal sensors to track minute movements allows for the device or system to accurately capture the movements and assign corresponding motion characteristics to virtual objects with which the user is interacting. The motion characteristics can include determining an angle of release, a release velocity, and/or a trajectory for the virtual objects.

Numerous details are described herein to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

Embodiments of this disclosure can include or be implemented in conjunction with various types or embodiments of artificial-reality systems. Artificial-reality, as described herein, is any superimposed functionality and or sensory-detectable presentation provided by an artificial-reality system within a user's physical surroundings. Such artificial-realities can include and/or represent virtual reality (VR), augmented reality (AR), mixed artificial-reality (MAR), or some combination and/or variation one of these. For example, a user can perform a swiping in-air hand gesture to cause a song to be skipped by a song-providing API providing playback at, for example, a home speaker. In some embodiments of an AR system, ambient light (e.g., a live feed of the surrounding environment that a user would normally see) can be passed through a display element of a respective head-wearable device presenting aspects of the AR system. In some embodiments, ambient light can be passed through respective aspect of the AR system. For example, a visual user interface element (e.g., a notification user interface element) can be presented at the head-wearable device, and an amount of ambient light (e.g., 15-50% of the ambient light) can be passed through the user interface element, such that the user can distinguish at least a portion of the physical environment over which the user interface element is being displayed.

Artificial-reality content can include completely generated content or generated content combined with captured (e.g., real-world) content. The artificial-reality content can include video, audio, haptic events, or some combination thereof, any of which can be presented in a single channel or in multiple channels (such as stereo video that produces a three-dimensional effect to a viewer). Additionally, in some embodiments, artificial reality can also be associated with applications, products, accessories, services, or some combination thereof, which are used, for example, to create content in an artificial reality and/or are otherwise used in (e.g., to perform activities in) an artificial reality.

FIG. 1A-1H illustrate examples of a user 110 throwing a virtual object (e.g., throwing a virtual ball) while sensors track wrist and arm movement in accordance with some embodiments. In some embodiments, the user's movements and the path of the virtual object 140 are displayed on a display (e.g., a head-wearable device or television). For example, the user 110 in FIGS. 1A-1H may be playing a baseball video game and/or practicing various pitching techniques. The wrist-wearable device 120 in FIGS. 1A-1H is configured to track the user's interaction with a virtual object 140 (e.g., using a neuromuscular-signal sensor and/or an IMU). FIG. 1A illustrates a user 110 wearing a wrist-wearable device 120 while holding the virtual object 140 (e.g., a virtual ball). For example, in FIG. 1A the user's arm is at rest prior to throwing the virtual object 140. FIG. 1A also illustrates an artificial-reality environment 132 and actions of the user 110 displayed on a display 130 (e.g., a television or monitor).

FIG. 1A further illustrates a graph 108 showing a position of the user's arm and a graph 100 showing a user's wrist angle activity. The positions and activity shown in the graphs 100 and 108 in FIGS. 1A-1H, 2A-2D, and 3A-3C are prophetic examples intended to convey the operation of the various sensors, not recorded data from actual operation of the devices. In some embodiments, the arm position is tracked via an IMU (e.g., on the wrist-wearable device 120). In some embodiments, the arm position is tracked via an optical sensor (e.g., a camera component of the wrist-wearable device 120 or a head-wearable device). FIGS. 2A-3C further show and discuss having a camera embedded in a head-wearable device to track a user's arm position. As described above, the graph 100 illustrates the intensity of wrist angle activity detected on one or more wrist EMG sensor channels. In FIG. 1A the user's arm and wrist are at rest and the intensity of the wrist angle activity is near zero at each channel as shown in the graph 100.

Figure 1B:
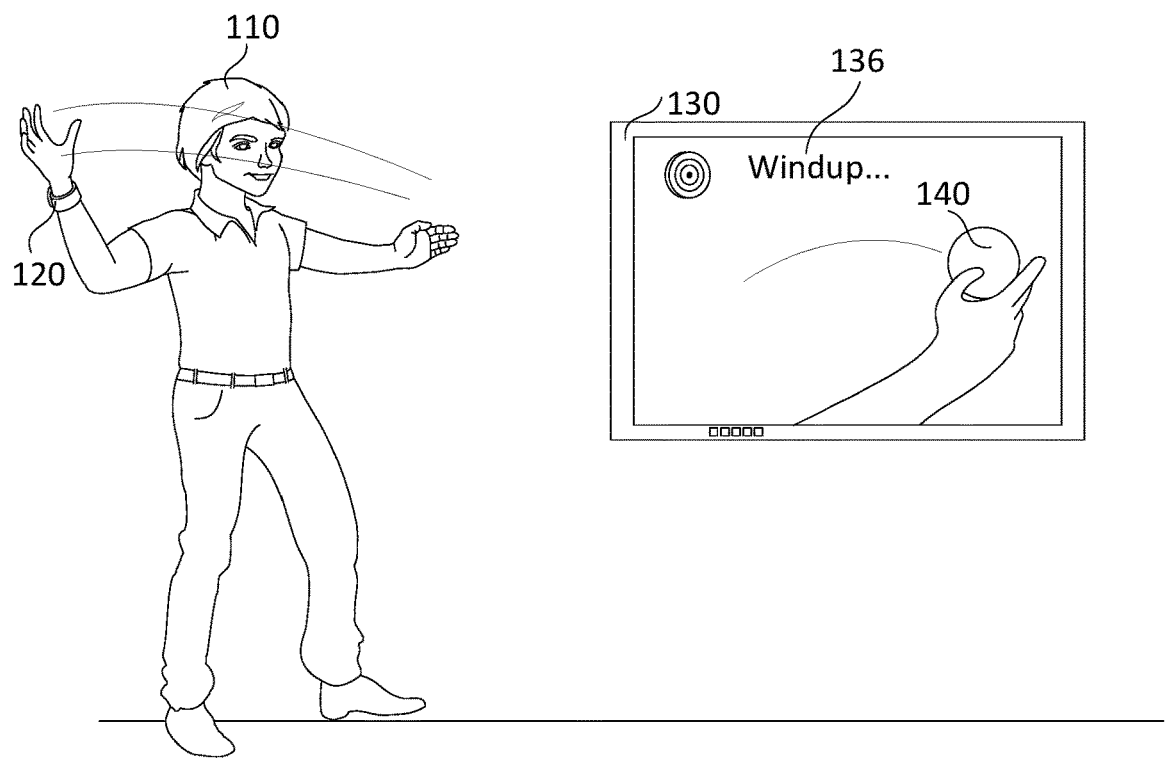
Figure 1B:
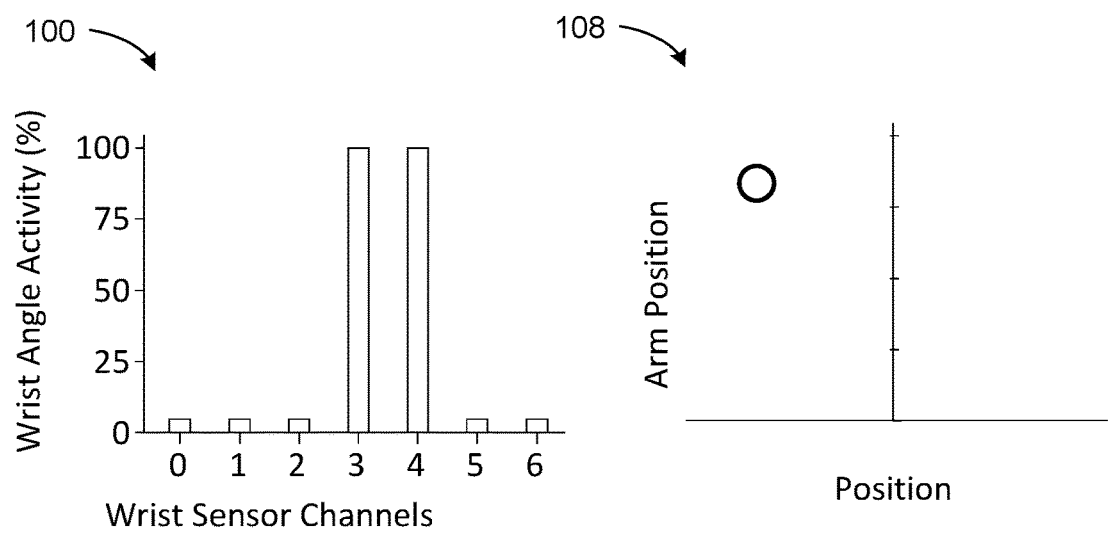

FIG. 1B illustrates the user 110 winding up to throw the virtual object 140 (e.g., corresponding to a time subsequent to the time of FIG. 1A). As the user 110 winds up to throw the virtual object 140, the sensors on the wrist-wearable device 120 detect neuromuscular signals in the user's wrist and determine wrist information (e.g., the wrist angle activity) based on the neuromuscular signals. For example, in FIG. 1B channels 3 and 4 are detecting increased wrist angle activity in accordance with the user's wrist movement, as shown in the graph 100. In this example, channels 3 and 4 correspond to the top of the user's wrist (e.g., portions 142 and 144), such that when the user 110 is bringing their arm back to throw the virtual object 140, the user's wrist bends backwards towards the user's forearm. This wrist information is gathered at channels 3 and 4 and the graph 100 shows the intensity of wrist angle activity based on the user's movement. The graph 100 illustrates the wrist angle activity intensity resulting from the user's wrist movements which include performing the pinch gesture.

The graph 108 in FIG. 1B has updated to show the position of the user's arm as tracked by one or more sensors. The graph 108 indicates that the user's arm has moved toward the top and left of the graph as compared to FIG. 1A, corresponding to the user has moving their arm into the wind-up position. FIG. 1B further illustrates the user 110 performing a pinch gesture to initiate the interaction with the virtual object 140. FIG. 1B illustrates the user's hand performing a pinch gesture as if the user 110 was holding onto (e.g., gripping) an object in real life.

FIG. 1B further illustrates a message 136 on the display 130 identifying a current action from the user (or giving the user 110 an instruction). In the example of FIG. 1B, the message 136 indicates to the user 110 that the system has recognized that the user 110 is getting ready to throw the virtual object 140. In some embodiments, the display 130 shows the message 136 prior to the user 110 winding up to throw the virtual object to indicate to the user 110 that the system is waiting for the user 110 to windup to throw the virtual object 140.

Figure 1C:
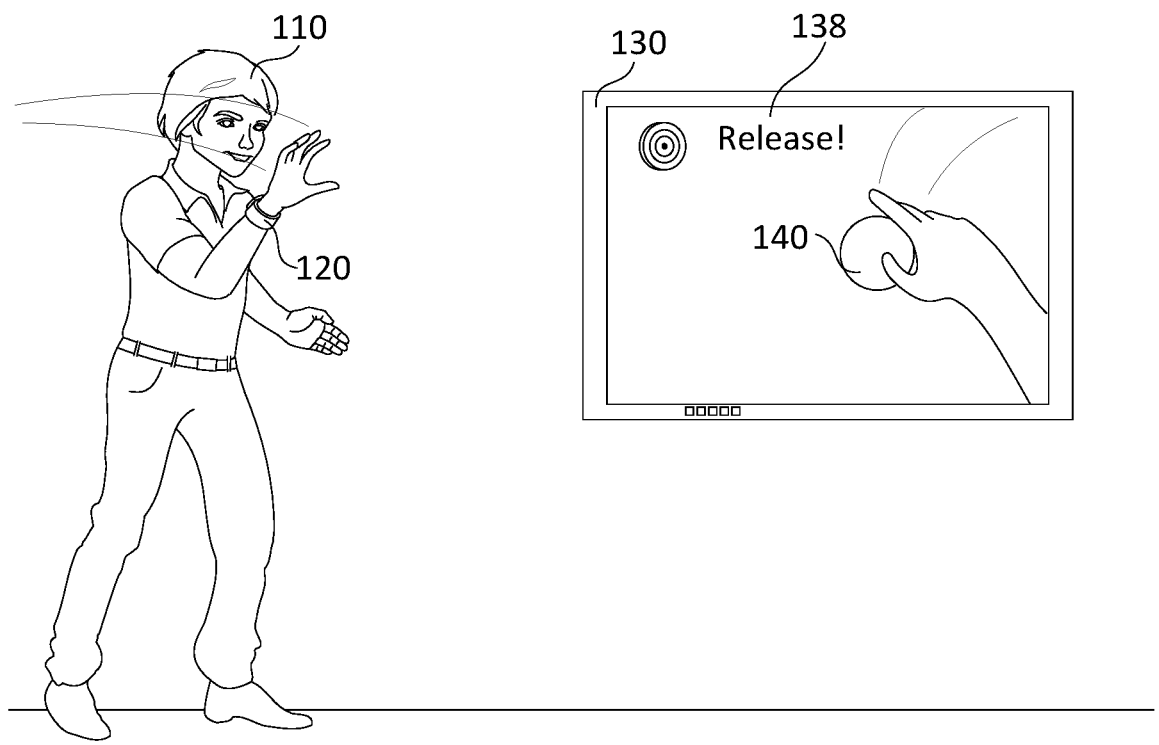

FIG. 1C illustrates the user 110 interacting with the virtual object (e.g., performing a throwing motion) just prior to releasing the virtual object 140 (e.g., corresponding to a time subsequent to the time of FIG. 1B). FIG. 1C also illustrates a message 138 on the display 130 instructing the user 110 to release the virtual object 140. The graph 100 in FIG. 1C shows the intensity of wrist angle activity corresponding to the user's throwing motion, e.g., increased activity on channels 1-4 (as compared to the at rest state represented in FIG. 1A). For example, the user 110 has moved their hand/wrist into a position that has activated muscle groups on both the top and bottom sides of the wrist. The user 110 is maintaining the pinch gesture in FIG. 1C, which also contributes to activation of the muscle groups. In this example, channels 1 and 2 show an intensity of about 50% indicating that the user 110 is activating the associated motor units but not fully engaging them. The graph 108 in FIG. 1C illustrates the position of the user's arm moving more toward right of the graph as compared to FIG. 1B, corresponding to the user 110 having moved their arm from a windup position to a release position.

Figure 1D:
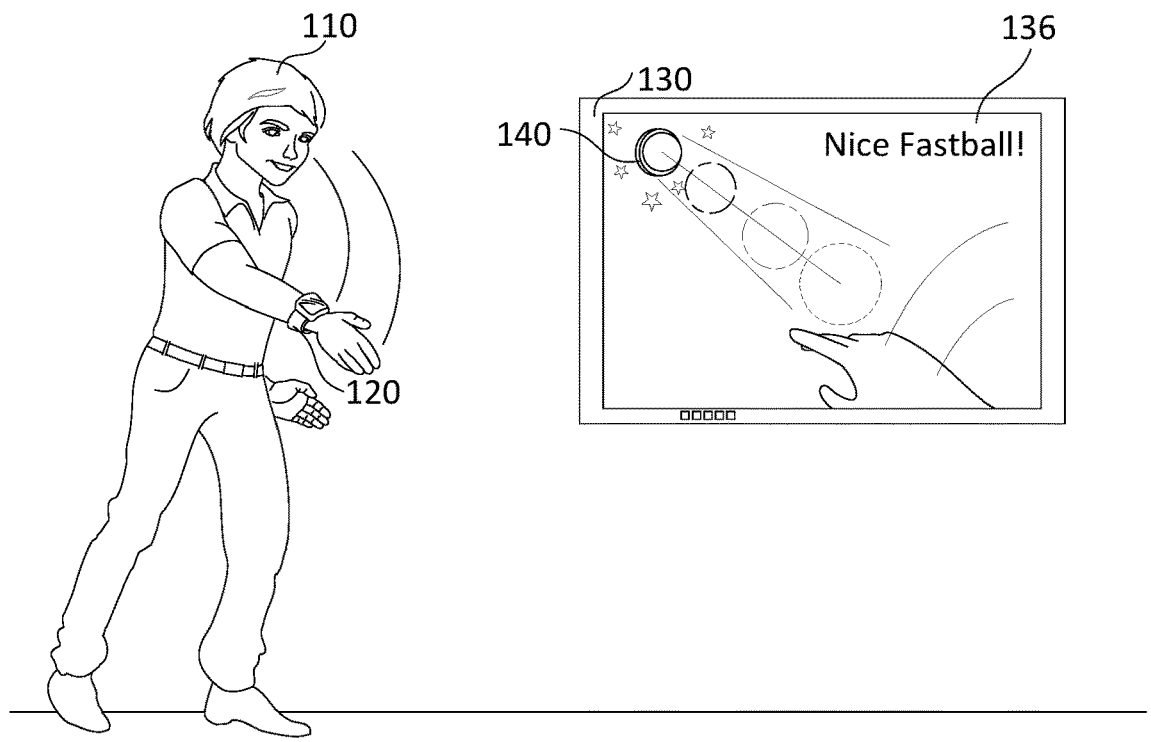
Figure 1D:
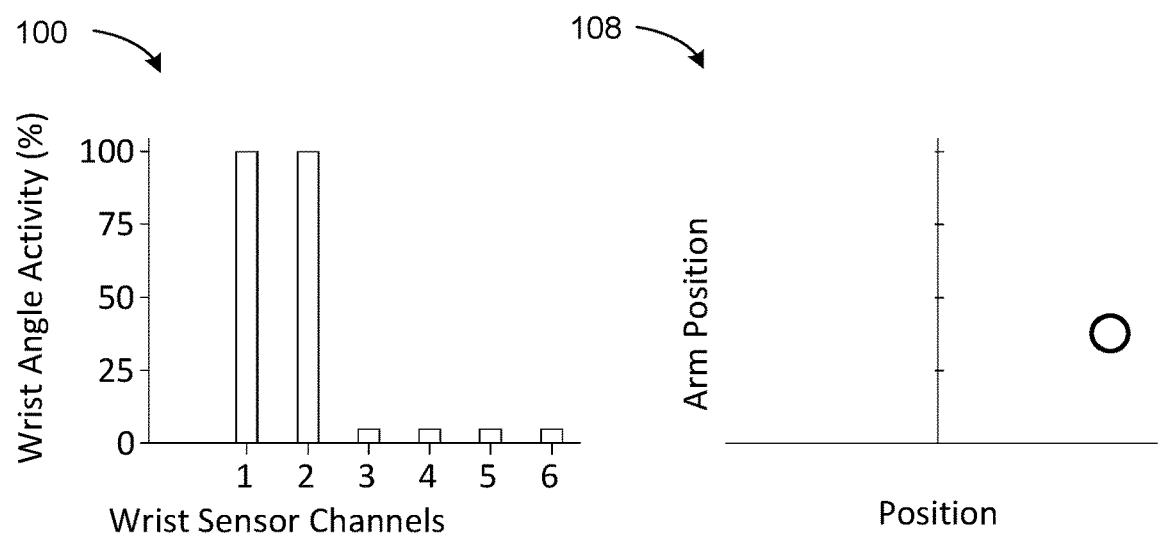

FIG. 1D illustrates the user 110 having released the virtual object 140 (e.g., corresponding to a time subsequent to the time of FIG. 1C). FIG. 1D further illustrates the display 130 displaying the message 136 ("Nice Fastball!") to the user 110. In some embodiments, as illustrated in FIG. 1D, the user 110 releasing the pinch gesture causes release of the virtual object 140 (e.g., triggers a release function of the AR system). In the example of FIG. 1D, the graph 100 shows increased wrist angle activity on channels 1 and 2 (as compared to the at rest state represented in FIG. 1A). From FIG. 1C to FIG. 1D, the user 110 has moved their hand/wrist into the release position which corresponds to activation of muscle groups on the bottom of the user's wrist (e.g., the portions 148 and 150). Accordingly, the graph 100 in FIG. 1D shows the increased activity for channels 1 and 2 (as compared to the at rest state represented in FIG. 1A).

In the example of FIG. 1D, the system has determined that the user 110 has thrown a fast ball. In some embodiments, the determination as to the type of pitch is based on detected movement of the user's hand, wrist, and/or arm movement. In some embodiments, the system determines a type of pitch thrown based on data from one or more sensors monitoring wrist activity and/or one or more sensors monitoring arm position and/or movement.

Figure 1E:
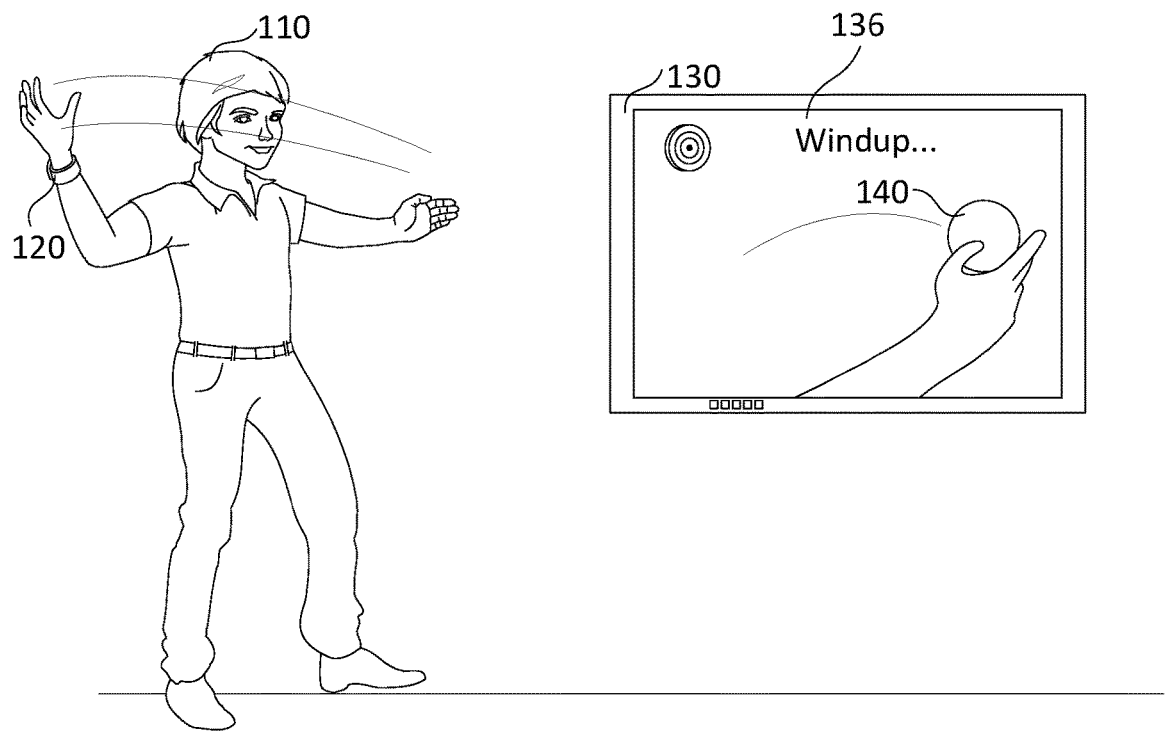
Figure 1E:
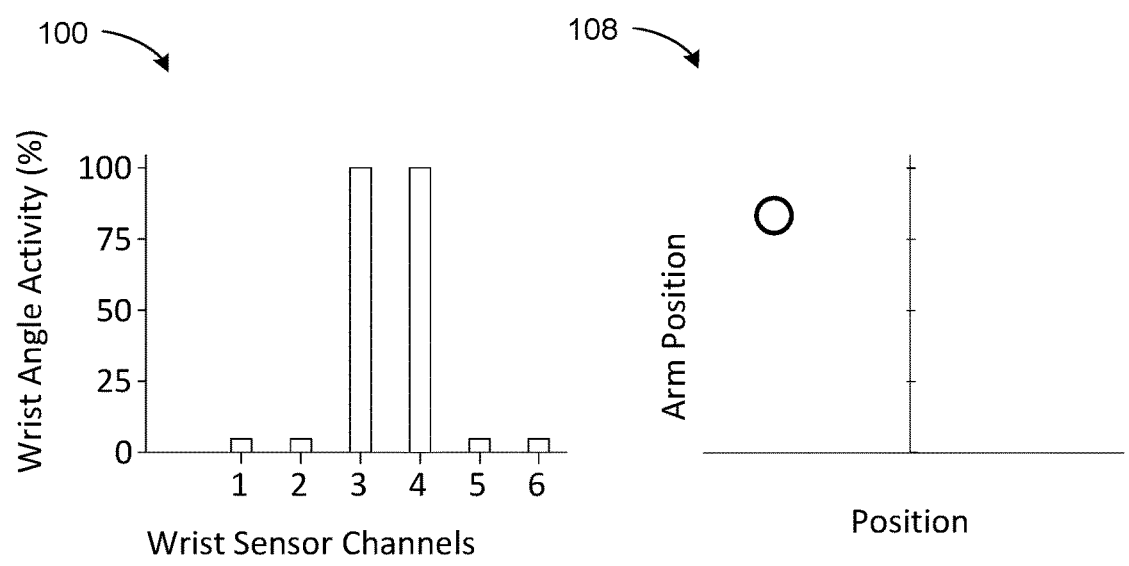

FIG. 1E illustrates the user 110 winding up to throw the virtual object 140 again. As the user 110 winds up to throw the virtual object 140, the sensors on the wrist-wearable device 120 continue to detect neuromuscular signals in the user's wrist and determine wrist information based on those signals. During the wind-up portion of the user's throw, channels 3 and 4 are active as they are during FIG. 1B. The graph 108 reflects the users arm position as tracked by the one or more sensors. Similar to FIG. 1B, the graph 108 shares that users arm position is to the top and left as compared to FIG. 1D. FIG. 1E also shows the user performing a pinch gesture as if the user 110 was gripping an object in real life. FIG. 1E further illustrates a message 136 on the display 130 identifying the user is winding up to throw the virtual object 140.

Figure 1F:
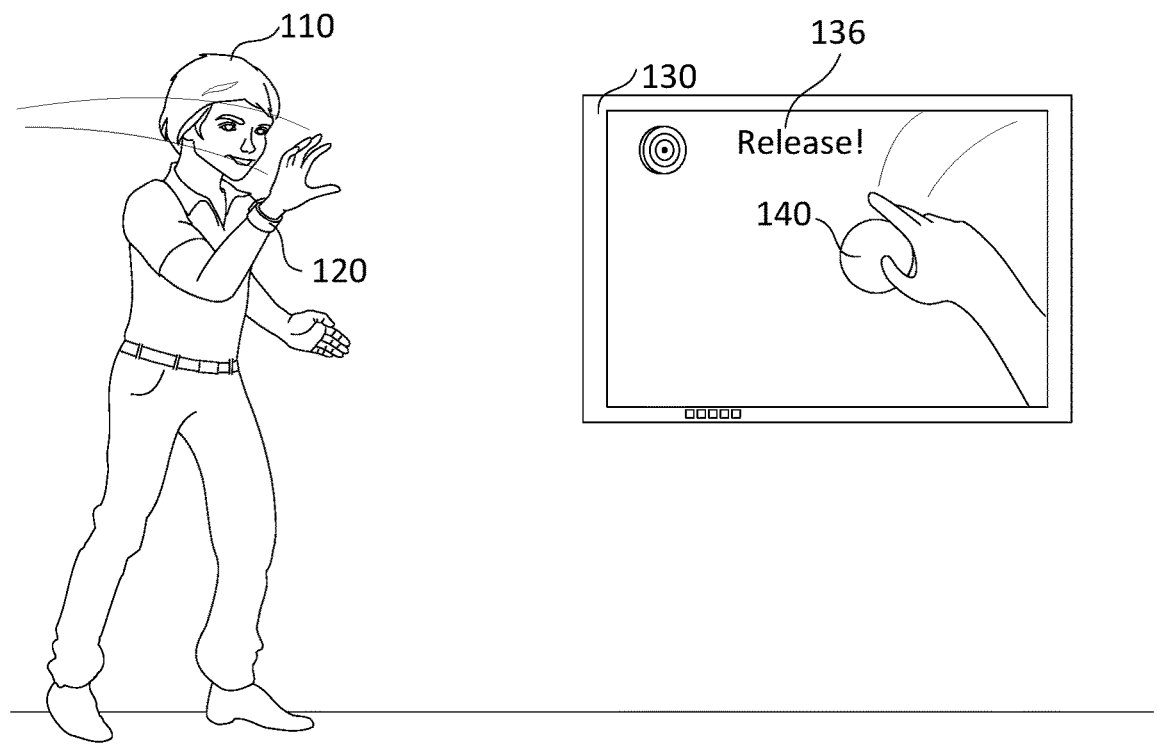
Figure 1F:
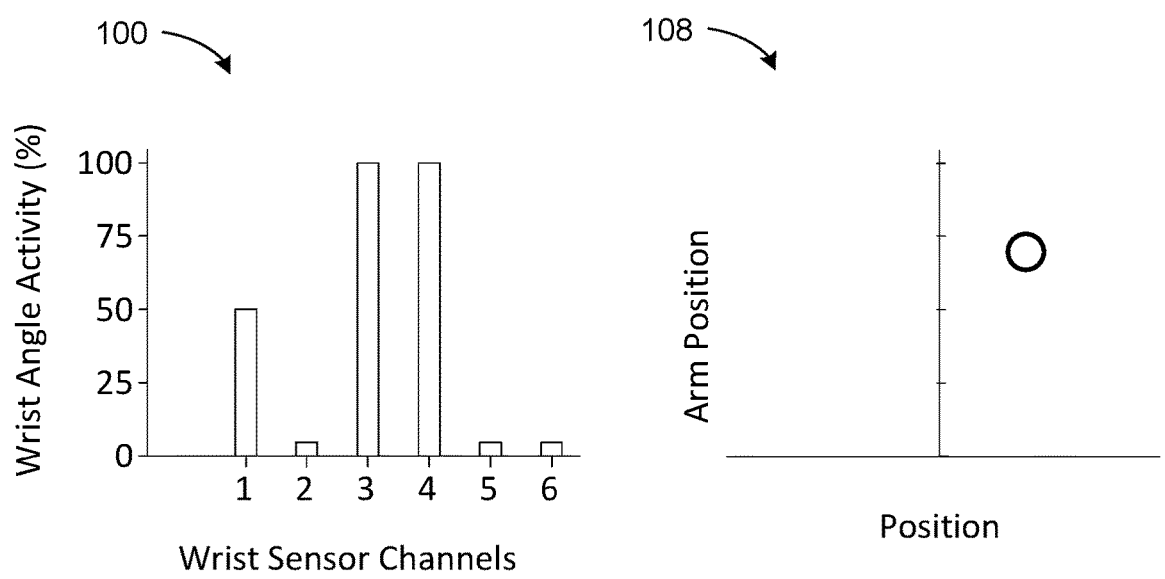

FIG. 1F illustrates the user 110 interacting with the virtual object 140 just prior to releasing the virtual object 140. FIG. 1F further illustrates a message 136 on the display 130 instructing the user 110 to release the virtual object 140. The graph 100 in 1F shows the intensity of wrist angle activity corresponding to the user's throwing motion (e.g., increased activity on channels 1, 3, and 4 but decreased activity on channel 2 compared to FIG. 1D). For example, the user 110 has moved their hand/wrist into a position that has activated muscle groups on both the top and bottom of the user's wrist. Compared to the user's previous throw (shown in FIGS. 1A-1D), the muscle group correlated with channel 2 is less active indicating the user 110 has adjusted their grip on the virtual object 140. In some embodiments, when the user 110 adjusts their grip on the virtual object 140, it can adjust affect the trajectory of the virtual object 140 when released. For example, in FIGS. 1A-1D the user 110 is throwing a fast ball, but in FIGS. 1E-1H shows the user 110 throwing a curve ball. In some embodiments, when a user 110 is attempting to throw a curve ball, the ball is held by the user 110 using a pinch gesture performed with the thumb and middle finger. In some embodiments, when the user 110 is attempting to throw a fast ball, the user 110 holds the ball with their thumb, index finger, and middle finger. Thus, graph 100 representing wrist angle activity can detect the nuances between the user using their index finger or not, and that change is represented in the decrease in activity in channel 2 in FIG. 1F. The graph 108 in FIG. 1F illustrates the position of the user's arm moving more toward right of the graph as compared to FIG. 1E, corresponding to the user 110 having moved their arm from a windup position to a release position.

Figure 1G:
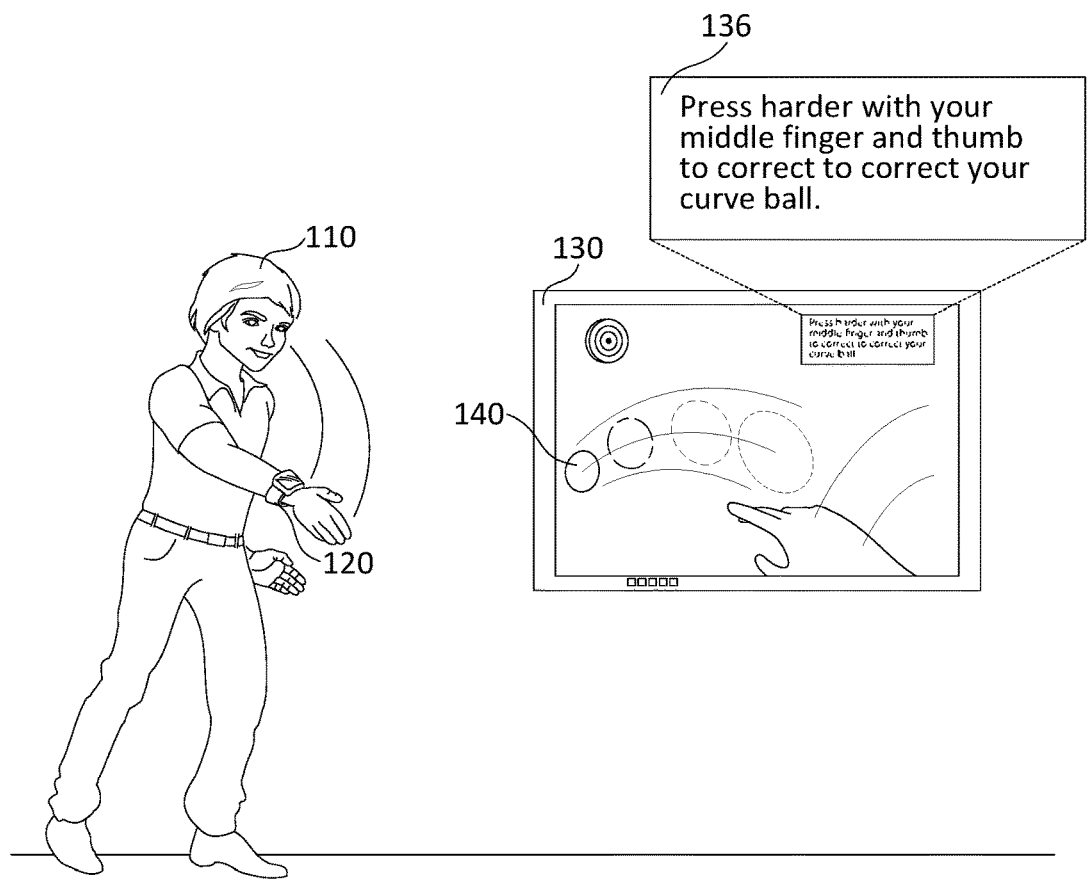
Figure 1G:
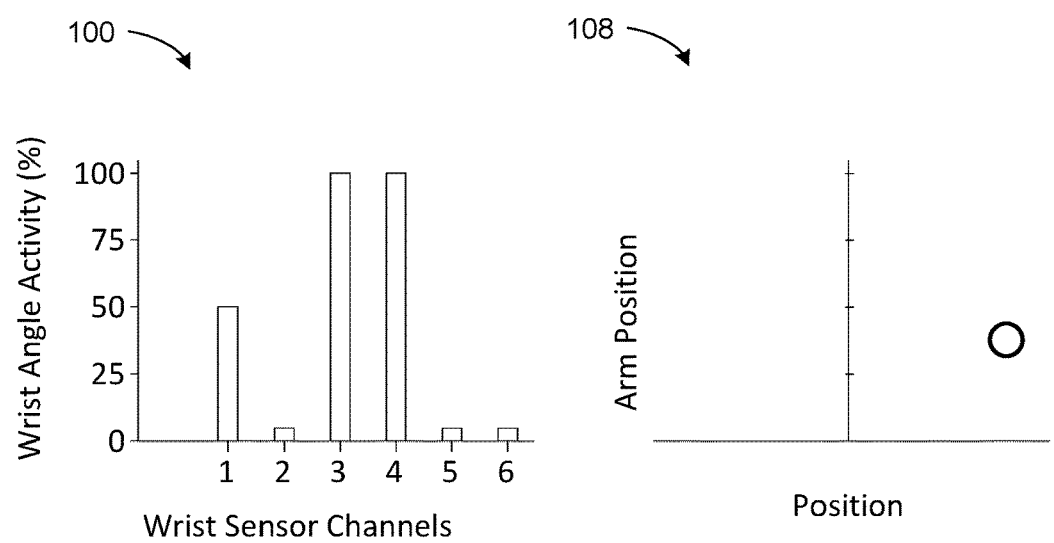

FIG. 1G illustrates the user 110 after releasing the virtual object 140. The system has determined (e.g., based on the wrist information collected from the neuromuscular signal sensors) that the user 110 is intending to throw a curve ball. In some embodiments, the system can provide the user with feedback regarding their interaction with the virtual object 140 based on gathered wrist information and arm position information. For example, FIG. 1G illustrates the message 136 on the display 130 telling the user 110 to "press harder with your middle finger and thumb to correct your curve ball". In some embodiments, the feedback provided to the user is provided visually (e.g., a message on the display as illustrated in FIG. 1G, via audio (e.g., through speakers coupled to the wrist-wearable device, head-wearable device and/or display such as the television), and/or via haptic feedback. In some embodiments, the system can determine what type of trajectory the user 110 is intending to pursue when the user 110 releases the virtual object 140. For example, as shown in FIG. 1G, the system anticipated the user 110 throwing a curve ball, and recognized that the user 110 needed to alter the position/intensity of one of the user's phalanges in order to properly throw the curve ball to achieve the desired trajectory.

Figure 1H:
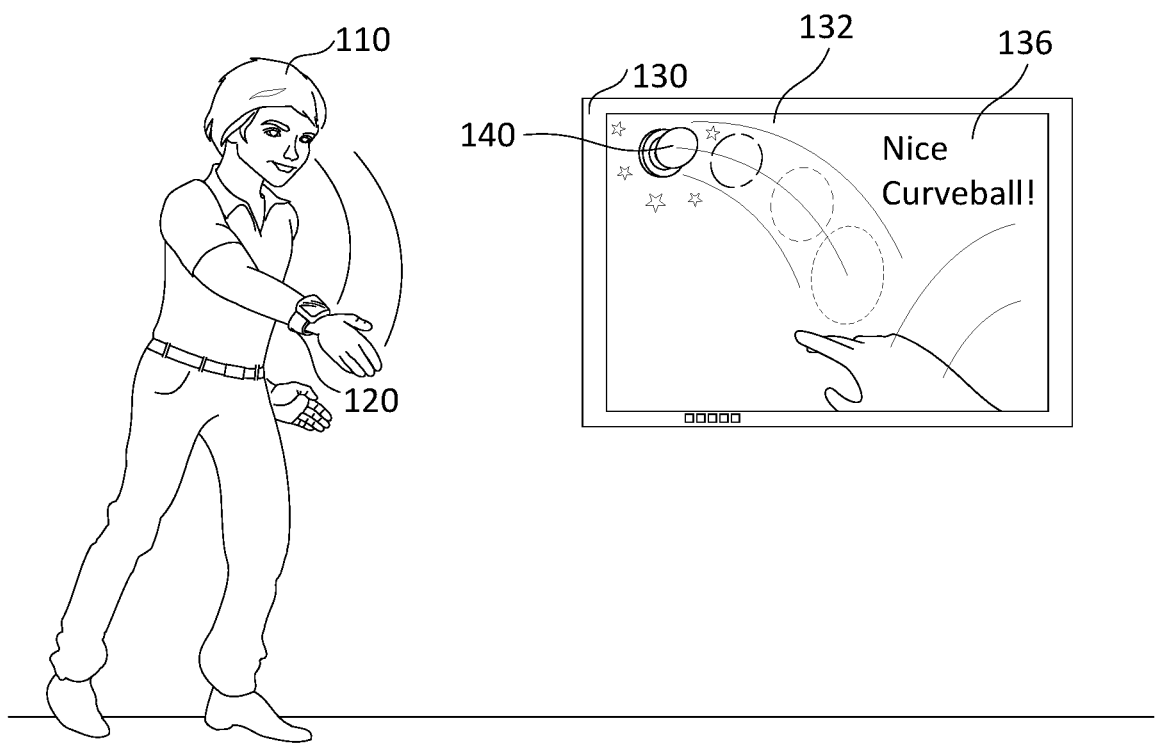
Figure 1H:
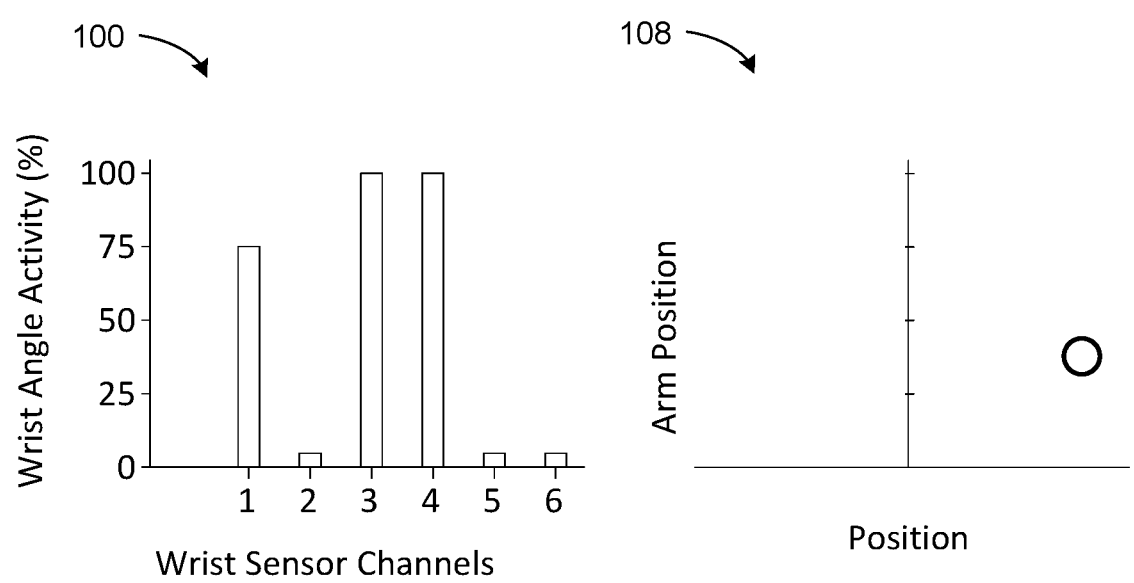

FIG. 1H illustrates the user 110 rethrowing the curve ball while increasing the intensity on the muscle group measured by channel 1 (e.g., the muscle group that measures the middle finger). The graph 100 in FIG. 1H reflects that the user 110 has increased the muscle intensity from 50% (as shown in FIG. 1G) to 75% as shown in FIG. 1H in the graph 100. Graph 108 in FIG. 1H illustrates the position of the user's arm moving more towards the right of the graph as compared to FIG. 1F, corresponding to the user having moved their arm from throwing the virtual object 140 to the release position.

As described above, FIGS. 1A-1H show a scenario where a user is throwing a virtual object. In this scenario the system needs to accurately and precisely detect the user's movements in order to be able to apply the correct motion characteristics to the virtual object (and optionally provide feedback to the user on their movements). A neuromuscular-signal sensor is capable of sensing minute muscle activations in a user's forearm, wrist, hand, and/or fingers such that the system can determine the type of interaction the user 110 has with the virtual object 140 using the neuromuscular-signal data. Using muscular-activation information allows for more precise and accurate motion characteristics than relying on motion data such as from an IMU. Additionally, a neuromuscular-signal sensor is not subject to the various issues associated with image-based tracking (e.g., the field of view, resolution, occlusion, and latency issues). In some embodiments, the system uses neuromuscular-signal data to provide recommendations on how the user 110 can change/improve their interaction with the virtual object 140 (e.g., as shown in FIG. 1G).

FIG. 2A-2D illustrates an example of a user hitting a virtual object using a virtual bat while wearing at least one wrist-wearable device in accordance with some embodiments. For example, the user 110 in FIGS. 2A-2D may be playing a baseball video game and/or practicing various hitting techniques. In some embodiments, the user 110 is playing virtual baseball while wearing at least one wrist-wearable device (e.g., the wrist-wearable device 220) such that when the user 110 holds their hands in a certain position, the system recognizes the user 110 is holding a virtual bat 250. In some embodiments, the user's actions and/or virtual objects are displayed on a display 231 of a head-wearable device 230 or a display (e.g., as shown in FIGS. 1A-1H). In the example of FIGS. 2A-2D the user's actions and virtual objects are displayed via augmented-reality glasses.

Figure 2A:
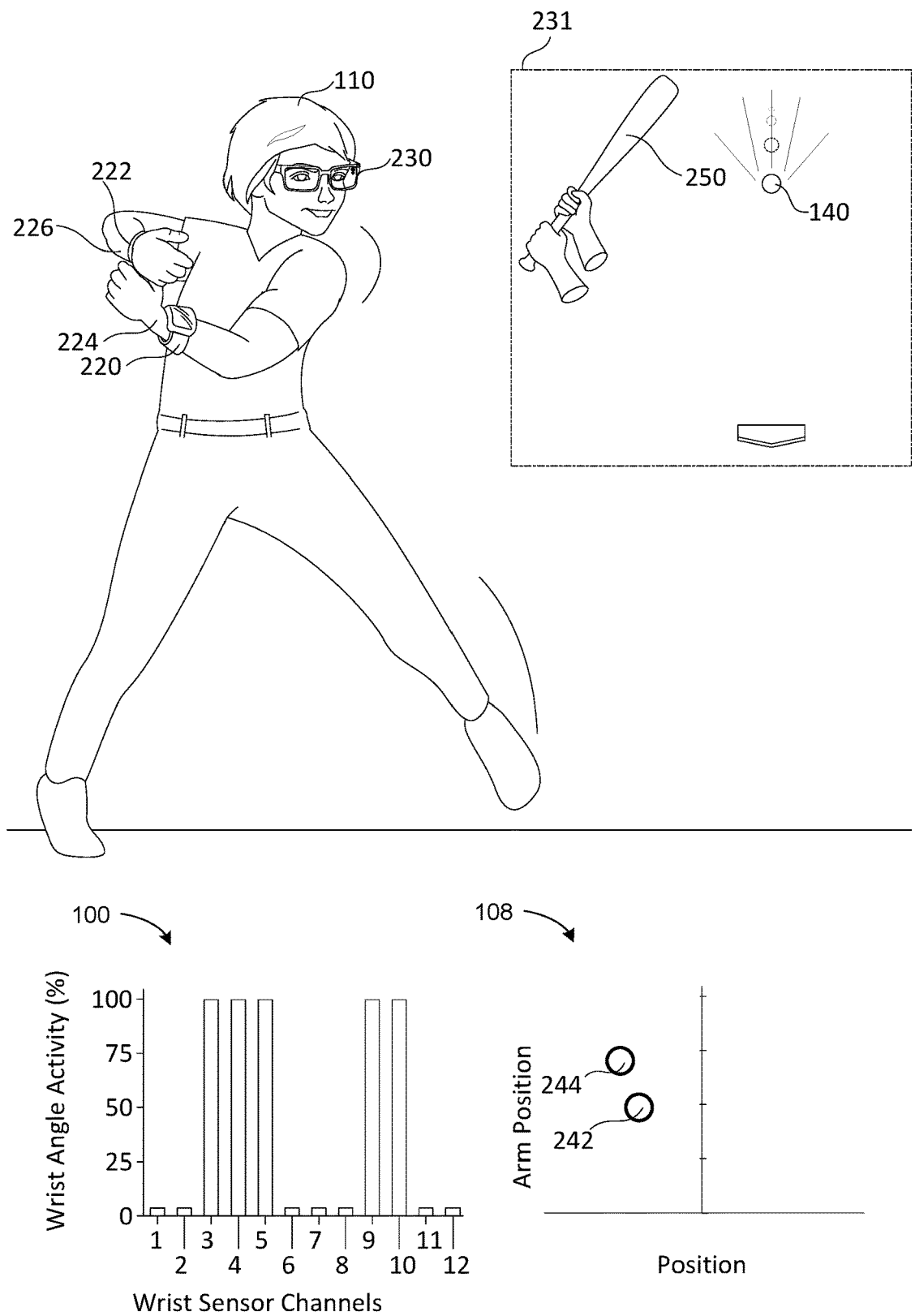
FIG. 2A-2D illustrates an example of a user hitting a virtual object using a virtual bat while wearing at least one wrist-wearable device in accordance with some embodiments.

FIG. 2A illustrates the user 110 with their hands in a position simulating the user 110 holding a bat and preparing to swing. In some embodiments, the user 110 is wearing the wrist-wearable device 220 and a wrist-wearable device 222 such that the system can recognize the position of the user's hands and display them on the display 231. In some embodiments, each wrist-wearable device is a smart watch or a wristband (e.g., without a display). In the example of FIGS. 2A-2D the user 110 is using one of each, with the wrist-wearable device 220 being a smart watch and the wrist-wearable device 222 being a smart band.

The graph 108 in FIG. 2A illustrates the sensed position of both the user's hands. In some embodiments, when the user 110 is performing an action requiring both hands, the activity of both wrists and arms are tracked by one or more sensors integrated in, or coupled with, the wrist-wearable devices 220 and 222. For example, the one or more sensors may be IMU sensors. The graph 108 illustrates the user's wrists being behind the center of the user's body (e.g., preparing to swing for the virtual object 140). In some embodiments, as the user 110 starts to swing the virtual bat 250 the sensors track the position of the user's arms and wrists and represents the position on the graph 108. The graph indicator 242 represents the position of the wrist-wearable device 220, and the graph indicator 244 indicates the position of the wrist-wearable device 222.

The graph 100 in FIG. 2A illustrates the wrist angle activity for channels 1-6, which correspond to the muscle groups in the user's wrist 224, and channels 7-12, which correspond to the muscle groups in the user's wrist 226. For example, as the user prepares to swing the virtual bat 250, the user 110 brings their hands back towards their dominant shoulder, prompting the user's wrist coupled to the wrist-wearable device 220 to bend backward and slightly inward toward the user 110 ultimately activating channels 3-5 of the neuromuscular signal sensor. Likewise, the user's wrist coupled to the wrist-wearable device 222 is also bent backward activating channels 9 and 10 of the neuromuscular signal sensor.

Figure 2B:
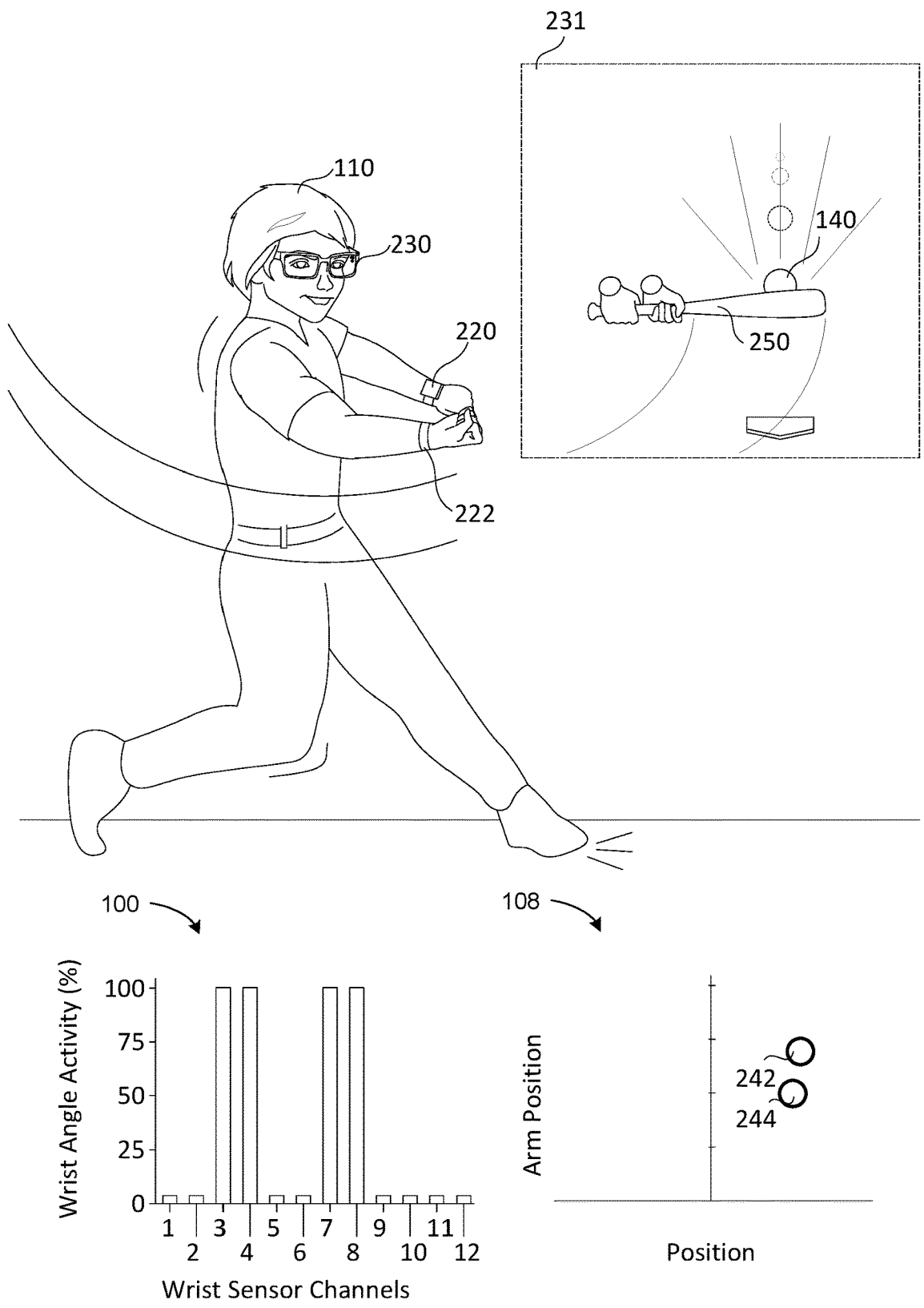

FIG. 2B illustrates the user 110 making contact with the virtual object 140 using the virtual bat 250 as indicated on the display 231. As the user 110 changes the position of their arms/wrists during the swing of the virtual bat 250, their updated positions are represented on the graph 108. In FIG. 2B, the wrist-wearable device position has moved above the wrist-wearable device position based on where the user 110 is now in their swing. Furthermore, different muscle groups are activated now that the user 110 performs the swing motion. In this example, channels 3 and 4 remain active, but channel 5 is now inactive. Additionally, channels 7 and 8 are active and channels 9 and 10 are now inactive.

Figure 2C:
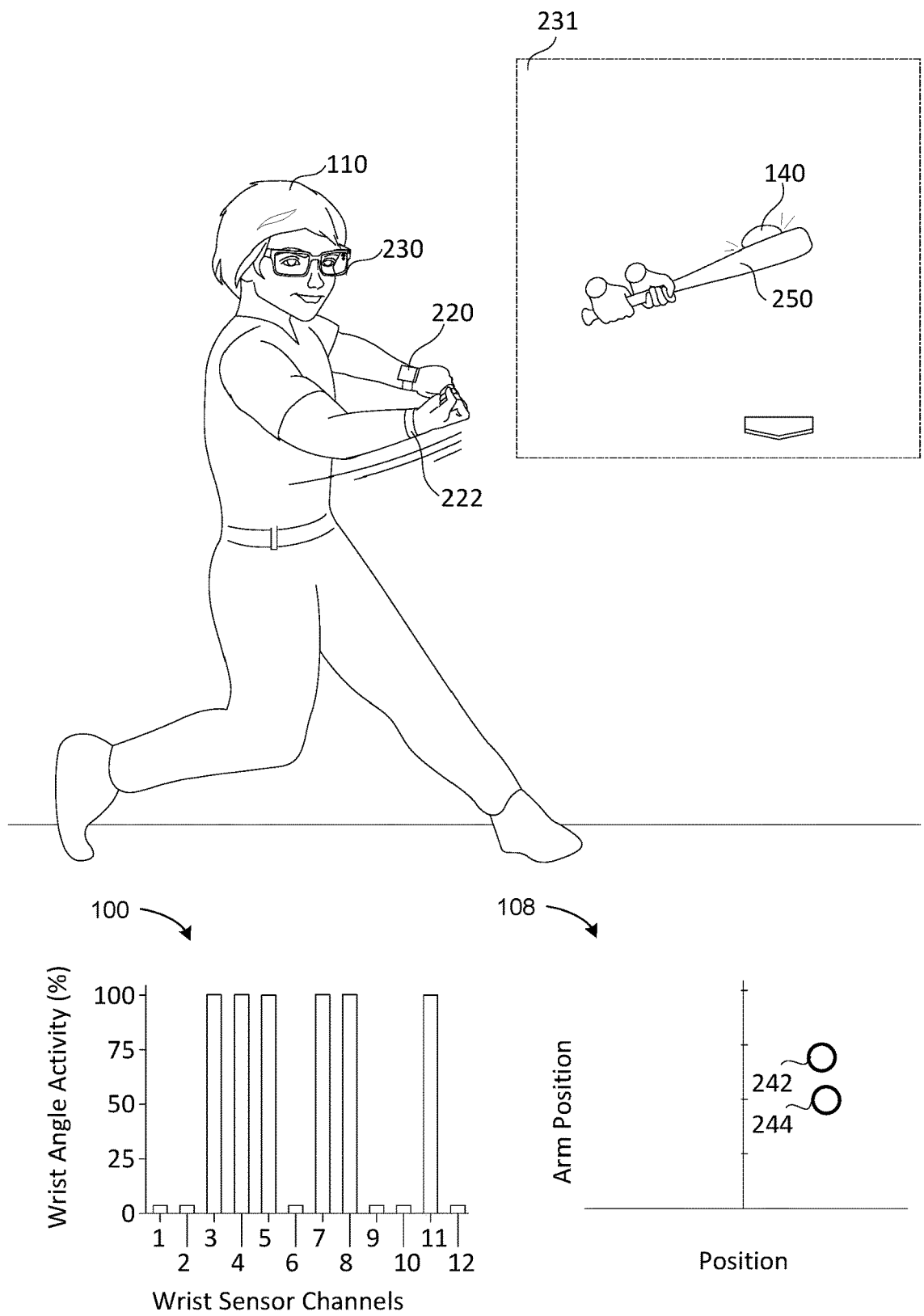
Figure 2D:
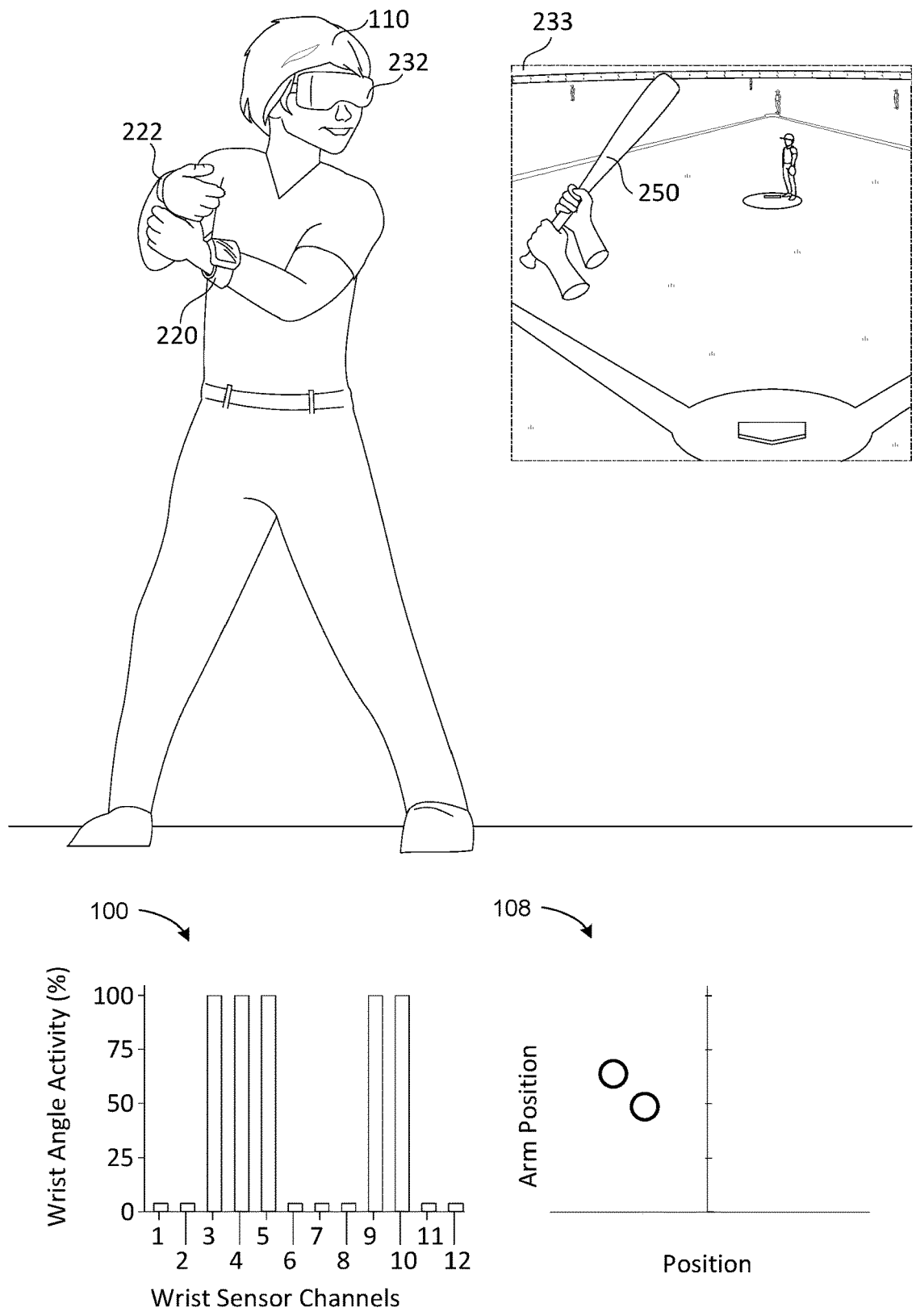

FIG. 2C illustrates the user 110 following through with their swing (e.g., after making contact with the virtual object 140) as indicated on the display 231. As the user 110 shifts to a different stage of the swing, different muscle groups are activated, and the wrist angle activity graph 100 is altered to reflect those changes. As illustrated in the graph 100, as the user 110 follows through on their swing, channels 3-5 are active as well as channels 7, 8 and 11. In some embodiments, the system uses the wrist information data gathered from different parts of the swing to suggest to the user 110 potential corrections to correct their form. The graph 108 in FIG. 2C illustrates the position of the users hands which have only changed slightly since their position in FIG. 2C. FIG. 2D illustrates the user 110 preparing to hit a virtual ball while wearing the head-wearable device 232 (e.g., a VR headset as opposed to the AR glasses shown in FIGS. 2A-2C). The head-wearable device 232 includes a display 233 showing a virtual baseball game.

As described above, FIGS. 2A-2D show a scenario where a user is able to swing a virtual bat to hit a virtual ball. In this scenario the system needs to accurately and precisely detect the user's movements in order to be able to apply the correct motion characteristics to the virtual bat, which in turn applies the correct motion characteristics to the virtual ball (and optionally provide feedback to the user on their movements). As discussed previously, in addition to tracking a user's arm movement/position, a user's hand and wrist activity can be used to more accurately and precisely determine the correct motion characteristics. In the example of FIGS. 2A-2C, the user's movement and activity can be sensed by sensors on the wrist-wearable devices 220 and 222 and/or the head-wearable device 230. In some embodiments, the user's movement and activity is sensed by sensors in a subset of these devices (e.g., the user is wearing only one wrist-wearable device). In some embodiments, the user is using other types of devices, such as the head-wearable device 232.

Figure 3A:
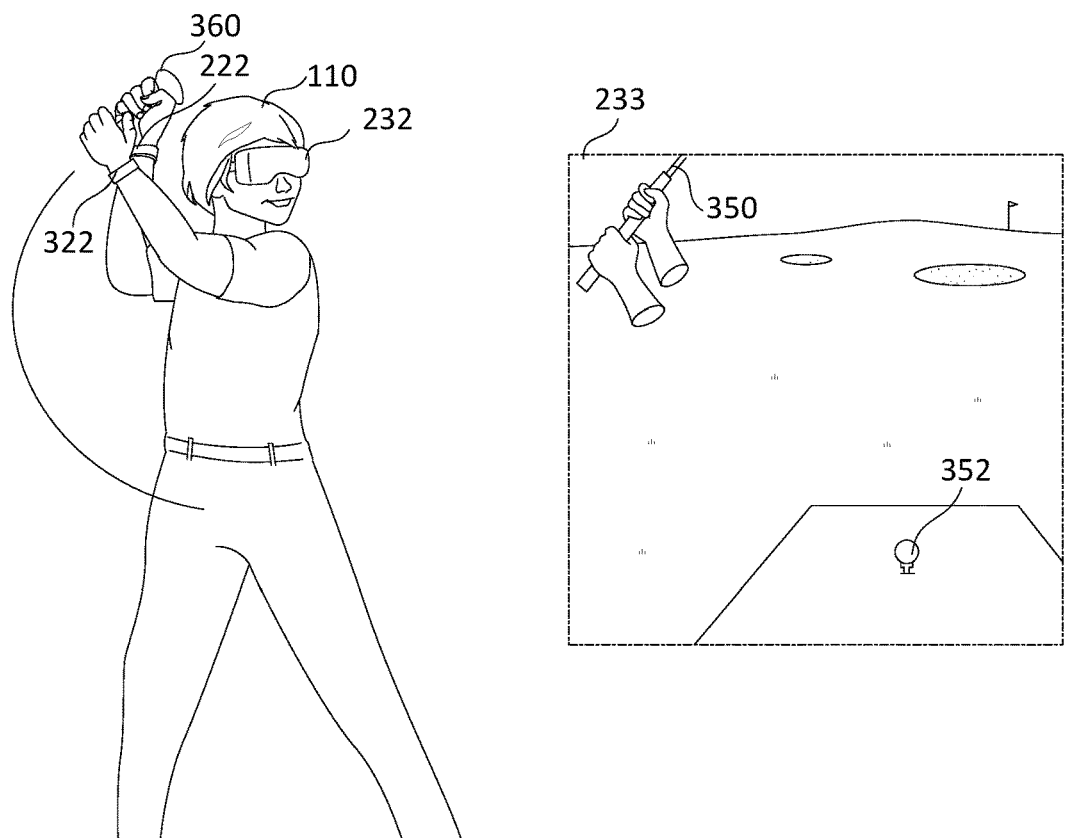
FIG. 3A-3C illustrates an example of a user hitting a virtual object using a virtual golf club while wearing at least one wrist-wearable device in accordance with some embodiments.
Figure 3A:
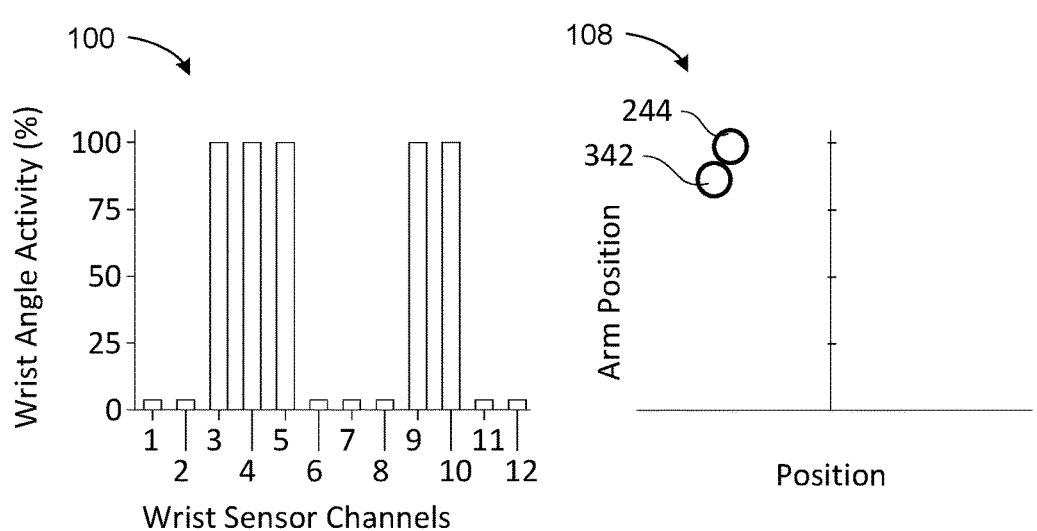
Figure 3B:
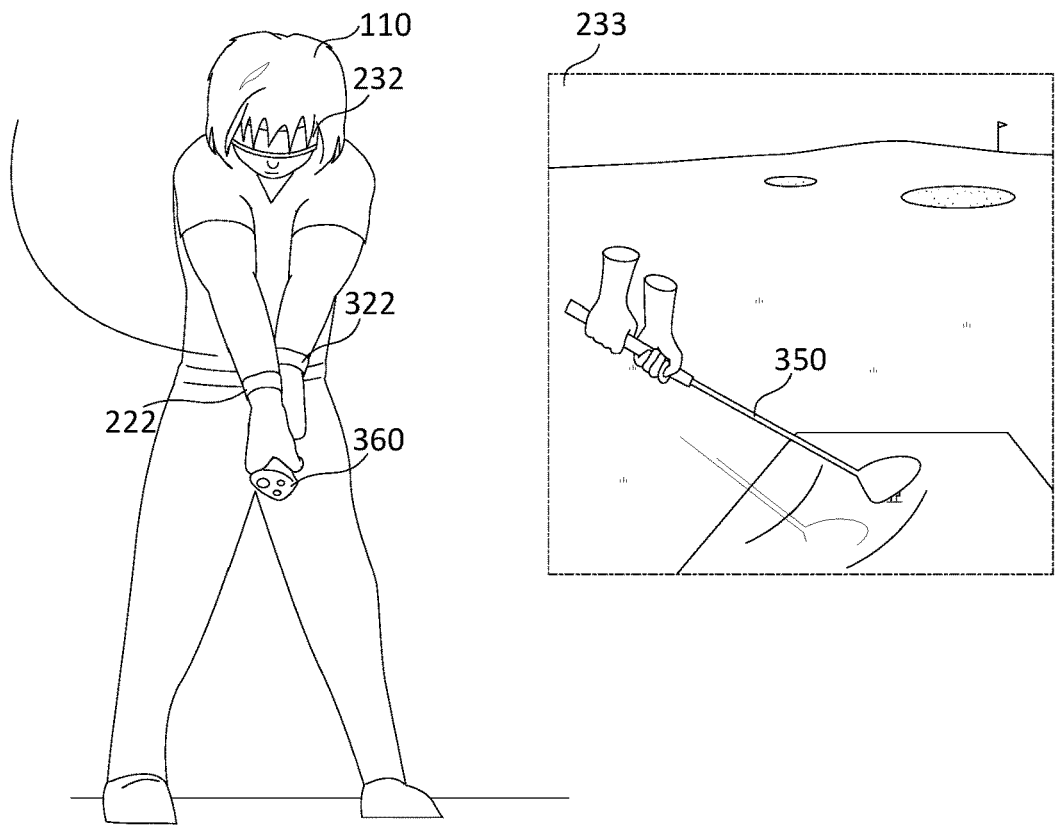
Figure 3B:
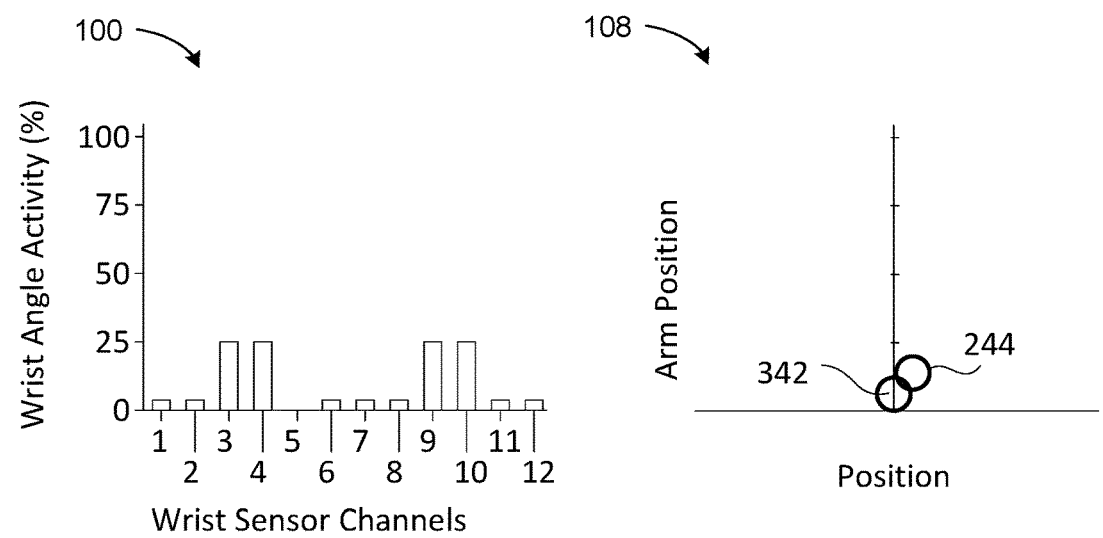
Figure 3C:
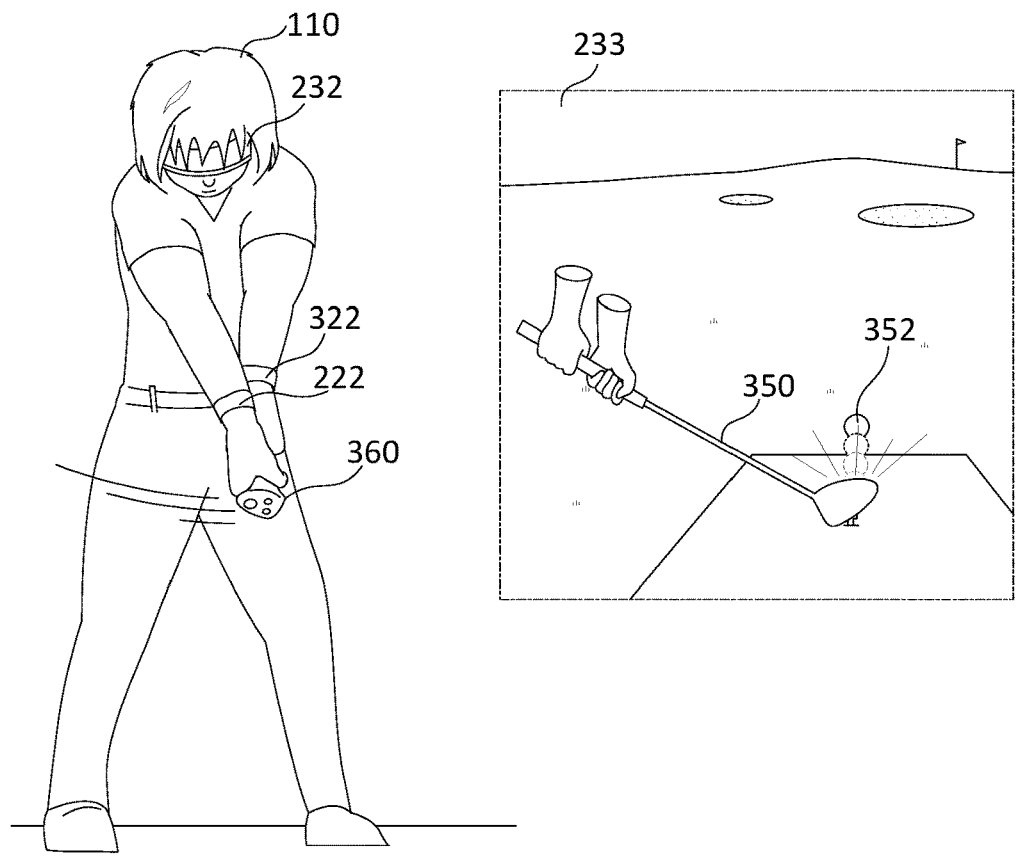
Figure 3C:
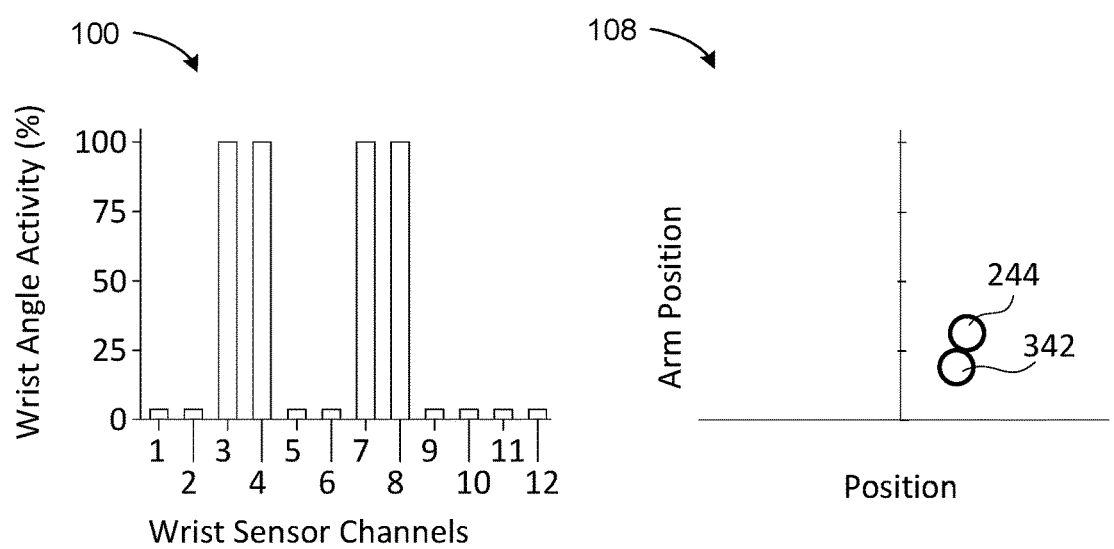

FIGS. 3A-3C illustrate an example of a user 110 hitting a virtual object 352 using a virtual golf club 350 while wearing at least one wrist-wearable device (e.g., wrist-wearable devices 322 and 222) in accordance with some embodiments. For example, the user 110 in FIGS. 3A-3C is playing a golf video game and/or practicing various golf swings and other golf techniques. In some embodiments, the user 110 is also holding a handheld device 360 (e.g., a controller) which appears as a virtual golf club 350 on the display 231 of the head-wearable device 232. In some embodiments, the sensor tracking the position of the user's arm/wrist is located on the handheld device 360 in addition to or independently from the one or more wrist-wearable devices (e.g., the wrist-wearable devices 222 and 322). In some embodiments, the sensor tracking the position of the user's arm, wrist, and/or hand is located in the head-wearable device 232.

FIG. 3A illustrates the user 110 with their hands holding a handheld device 360 preparing to swing a virtual golf club 350 to hit the virtual object 352 (e.g., a virtual golf ball). In some embodiments, the user 110 is wearing the wrist-wearable device 222 and a wrist-wearable device 322 (e.g., another band without a display) to track the user's arm, wrist, and/or hand positions such that the system can recognize the position of the user's hands and display them on display 233 (e.g., a virtual-reality display provided by the head-wearable device 232).

The graph 108 in FIG. 3A illustrates the sensed position of the wrist-wearable devices 222 and 322 respectively. The graph indicator 342 illustrates the position of the wrist-wearable device 322 and the graph indicator 244 continues to illustrate the position of the wrist-wearable device 222. The graph 108 in FIG. 3A illustrates the position of the user's wrists behind the user's head and above their shoulder in preparation to swing the virtual golf club 350. As described in FIGS. 1A-2D, the position of the user's hands are updated on the graph 108 as the user 110 progresses through their swing. Similar to the start of the user's swing in FIG. 2A, the graph 100 in FIG. 3A illustrates channels 3-5 and 9-10 active as the user 110 is preparing to swing. As the user 110 swings the virtual golf club 350, the activation of different channels are illustrated on the graph 100.

FIG. 3B illustrates the user 110 in the middle of their swing and interacting with the virtual object 352. In some embodiments, as the user 110 brings their arms down to hit the virtual object 352, the intensity of the wrist-angle activity decreases. In some embodiments, the decrease in wrist-angle activity is illustrated on the graph 100. For example, as shown in FIG. 3B, channels 3-4 and 9-10 are activated but the wrist-angle activity intensity has decreased for this period in time. The graph 108 in FIG. 3B further illustrates the altered position of the user's hands and arms tracked by at least one of the wrist-wearable devices 222 and 322 and/or the handheld device 360 held by the user.

FIG. 3C illustrates the user 110 directly after striking the virtual object 352 with the virtual golf club 350, in accordance with some embodiments. In some embodiments, as the user 110 strikes the virtual object 352, the wrist-angle activity intensity increases. For example, as shown in FIG. 3C, as the user 110 hits the virtual object 352 and starts to utilize the muscle groups more, channels 3-4 and 7-8 are sensing 100% intensity compared to just before making contact with the virtual object as shown in FIG. 3B.

As the user 110 shifts to a different stage of the swing, different muscle groups are activated, and the wrist angle activity graph is altered to reflect those changes. As illustrated in the graph 100, as the user 110 follows through on their swing, channels 3-5 are active as well as channels 7, 8 and 11. In some embodiments, the system uses the wrist information data gathered from different parts of the swing to suggest to the user 110 potential corrections to correct their form. The graph 108 illustrates the position of the users hands which have only changed slightly since their position in FIG. 3B. The graph 108 in FIG. 3C further illustrates the position of the user's arms/hands as they move through their golf swing.

As described above, FIGS. 3A-3C show a scenario where a user is able to swing a handheld device (e.g., a controller) that represents a virtual golfclub to hit a virtual ball. In this scenario the system needs to accurately and precisely detect the user's movements in order to be able to apply the correct motion characteristics to the virtual golfclub, which in turn applies the correct motion characteristics to the virtual ball (and optionally provide feedback to the user on their movements). As discussed previously, in addition to tracking a user's arm movement/position, a user's hand and wrist activity can be used to more accurately and precisely determine the correct motion characteristics. In the example of FIGS. 3A-3C, the user's movement and activity can be sensed by sensors on the wrist-wearable devices 222 and 322, the handheld device 360, and/or the head-wearable device 232. In some embodiments, the user's movement and activity is sensed by sensors in a subset of these devices (e.g., the user is wearing only one wrist-wearable device). In some embodiments, the user is using other types of devices, such as the head-wearable device 230 and/or the wrist-wearable device 220.

Although FIGS. 1A-3C show neuromuscular-signal sensors coupled to a user's wrists, in some embodiments, neuromuscular-signal sensors are coupled to other parts of the user's body in an analogous fashion. For example, an ankle-wearable device may include one or more neuromuscular-signal sensors used to determine a user's ankle/foot activations while kicking a virtual ball. In some embodiments, as shown in FIGS. 1A-1H, a sensor has 7 sensor channels. In some embodiments, the sensor has more or fewer than 7 channels. In some embodiments, the sensors does not use sensor channels.

Figure 4:
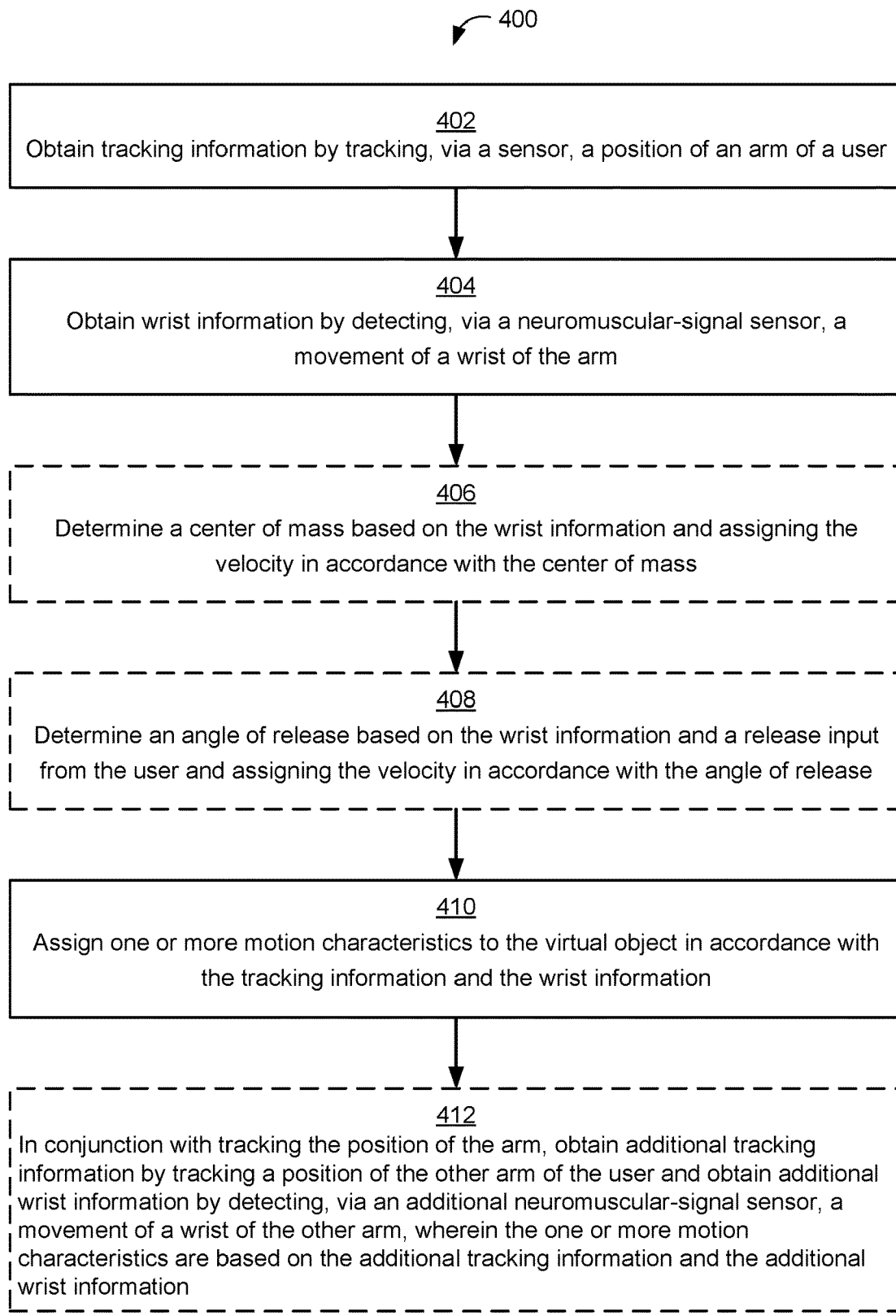
FIG. 4 is a flowchart showing an example method for tracking user movements in accordance with some embodiments.

FIG. 4 is a flowchart showing a method 400 for tracking user movements in accordance with some embodiments. The method 400 is performed at a computing system (e.g., the AR system 5000a shown in FIG. 6A). In some embodiments, the computing system includes one or more wearable devices (e.g., the wrist-wearable device 120 and/or head-wearable device 230). In some embodiments, the computing system includes one or more intermediary devices (e.g., a smartphone, laptop, or gaming console). In some embodiments, the computing system includes one or more handheld devices 360 (e.g., a controller or HIPD 8000). The computing system includes one or more processors (e.g., the processor(s) 6079 and/or 6049 and the memory 6080 and/or 6050 in FIG. 7B). In some embodiments, the memory stores one or more programs configured for execution by the one or more processors. At least some of the operations of the method 400 correspond to instructions stored in a computer memory or computer-readable storage medium.

The method 400 includes obtaining (402) tracking information by tracking, via a sensor, a position of an arm of a user 110. In some embodiments, the sensor is an IMU (e.g., located in a controller or wearable device). In some embodiments, the sensor is an image sensor (e.g., located in a head-wearable device). As described above with reference to FIGS. 1A-3C, the disclosed embodiments include methods and systems for tracking a user's movements while the user 110 is interacting with a virtual object and while an artificial reality is being displayed to the user 110. In some embodiments, the artificial reality environment is displayed on a head-wearable device such as those shown and described in FIGS. 8A-8C (e.g., AR system 7000 and VR System 7010). In some embodiments, the user's actions (and virtual environs) are displayed an external display 130 (e.g., a TV or monitor).

In some embodiments, the user's actions are tracked using one or more devices such as a wrist-wearable device (e.g., wrist-wearable device 120, wrist-wearable device 220, wrist-wearable device 222, and the wrist-wearable device 322), a head-wearable device (e.g., head-wearable device 230 and head-wearable device 232), and/or a handheld device 360 (e.g., controller). In some embodiments, the user 110 is wearing a wrist-wearable device 6000 such as those shown and described in FIGS. 7A-7B. In some embodiments, the user 110 is wearing one or more wrist-wearable devices (e.g., the wrist-wearable devices 222 and 322) as shown in FIGS. 2A-3C. In some embodiments, the user 110 is wearing one or more wrist-wearable devices and holding a handheld device 360 as shown in FIGS. 3A-3C.

In some embodiments, one or more sensors are integrated into the one or more devices (e.g., head-wearable device, wrist-wearable device, and a handheld device). In some embodiments, the one or more sensors includes at least one of a neuromuscular-signal sensor, an inertial measurement unit (IMU), and an imaging sensor (e.g., a camera coupled to a head-wearable device, or an external camera coupled to the head-wearable device or TV). In some embodiments, a head-wearable device worn by the user 110 includes an imaging sensor configured to capture the movement of the user's arm and/or hand. In some embodiments, the user's arm/hand position captured via the imaging sensor are represented on the arm position graph 108. In some embodiments, the imaging sensor is also coupled to a television to capture movements of the user's arm/wrists. In some embodiments, the wrist-wearable device 120 includes one or both of an IMU and a neuromuscular-signal sensor integrated into or coupled to the wrist-wearable device 120. In some embodiments, the sensors are arranged on the arm band of the wrist-wearable device 120 and/or inside of a display capsule. In some embodiments, the sensors are arranged on a glove. In some embodiments, the IMU tracks the position of the user's arm and movements of the user's wrist, which is then represented via the arm position graph 108 illustrated in FIGS. 1A-3C.

In some embodiments, the position of the other arm (e.g., an arm opposite the arm wearing a wrist-wearable device) is tracked via an additional sensor (e.g., an IMU sensor on a wearable device on the other arm). In some embodiments, the additional neuromuscular-signal sensor is arranged on a wearable device with the additional sensor. In some embodiments, a same sensor (e.g., the sensor) is used to obtain the tracking information and the additional tracking information is used to provide a more accurate account of the arms position. In some embodiments, detecting the arm position includes detecting a position a hand on the arm.

In some embodiments, the handheld device 360 is a controller and contains one or more sensors (e.g., a neuromuscular-signal sensor and/or an IMU) integrated into or coupled to the handheld device 360. In some embodiments, the user 110 is holding the handheld device 360 while interacting with the virtual object 352 as illustrated in FIGS. 3A-3C. In the virtual space, the handheld device 360 can simulate many objects such as a virtual bat 250, a virtual golf club 350, or a virtual tennis racket. In some embodiments, the virtual object 352 also represents many different objects typically corresponding to the object simulated by the handheld device 360 such as a baseball, golf ball, and tennis ball.

The method 400 further includes obtaining (404) wrist information by detecting, via a neuromuscular-signal sensor, a movement of a wrist of the arm. In some embodiments, each neuromuscular-signal sensor is arranged to sense signals for at least one motor unit in the arm or wrist of the user 110. For example, signals in the first motor unit correspond to wrist deflection in a first direction and signals in the second motor unit correspond to wrist deflection in a second direction (e.g., opposite the first direction). In some embodiments, the first and second motor units correspond to the same muscle. In some embodiments, the first and second motor units correspond to different muscles or muscle groups. In some embodiments, a neuromuscular-signal-sensor device includes one or more sensors arranged into one or more sensor channels (e.g., channels 0-6 as shown in FIG. 1A). In some embodiments, each sensor channel corresponds to a particular motor unit. In some embodiments, each sensor channel corresponds to a differential signal from two or more sensing electrodes. For example, each electrode or sensor channel detects neuromuscular-signal information on a different motor unit in the arm of the user based on the location of the electrode or sensor channel. In this way, when the user moves their wrist, the one or more electrodes or channels detect the movement via neuromuscular signals associated with each motor unit.

In some embodiments, each of the sensor channels 1-6 correspond to a respective position on the user's wrist (e.g., a respective motor unit). For example, in some embodiments channel 1 corresponds to a portion 150 of the wrist, channel 2 corresponds to a portion 148 of the wrist, channel 3 corresponds to a portion 144 of the wrist, channel 4 corresponds to a portion 142 of the wrist, channel 5 corresponds to a portion 146 of the wrist, and channel 6 corresponds to a portion 141 of the wrist, as shown in FIG. 1A. FIGS. 1A-3C show the different channels at different intensities as the user 110 moves their wrist. The graph 100 in FIG. 1A displays the intensity of wrist angle activity detected on one or more wrist EMG sensor channels. FIG. 1B-1H illustrate different wrist angle activity intensity levels as the user 110 goes through different stages of interacting with a virtual object (e.g., a user 110 throwing a virtual object).

In some embodiments, when the user 110 begins the interaction with the virtual object 140, the beginning of the interaction is indicated by performing a pinch gesture (e.g., as shown in FIG. 1B). Furthermore, the pinch gesture can be held while the user 110 is interacting with the virtual object 140 and when the user 110 is ready to release the virtual object 140 (e.g., throw the virtual ball), the pinch gesture is released. In some embodiments, releasing the pinch gesture (e.g., an unpinch gesture) corresponds to a release input. In some embodiments, a release function is activated in response to the user 110 pressing or releasing a button on the handheld device 360.

In some embodiments, the method 400 further determines (406) a center of mass based on the wrist information and assigning the velocity in accordance with the center of mass. In some embodiments, the velocity is calculated by performing the derivative of positional measurements over time and/or by integrating one or more motion characteristics such as acceleration. In some embodiments, assigning the one or more motion characteristics includes programmatically associating the one or more motion characteristics with the virtual object, e.g., so that a device can later retrieve the motion characteristics and render the virtual object with the motion characteristics applied. In some embodiments, one or more motion characteristics are assigned to the virtual object 140 based on arm information gathered by one or more sensors and wrist information detected by one or more sensors coupled to a wrist-wearable device. For example, if the user 110 is throwing a virtual object 140 and presses harder with one of their fingers while throwing a virtual object 140, a neuromuscular-signal sensor can detect the press and the system can alter the trajectory of the virtual object 140 shown on the display 130. In some embodiments, when the user 110 throws the virtual object, the angle of release of the virtual object is determined based on the wrist information (e.g., from one or more EMG sensors) and a release input. Additionally, the wrist information is used to determine the center of mass of the virtual object. For example, as shown in Figures IC-1D, the neuromuscular-signal sensor in the wrist-wearable device 120 gathers wrist information such that when the user 110 throws and releases the virtual object 140, the system can determine the center of mass and ultimately the velocity of the virtual object 140 in order to determine that the user 110 is throwing a fastball. The system appropriately displays the proper velocity on the display 130 as the virtual object 140 moves across the screen and displays a message 136 to the user 110 acknowledging the user 110 threw a fastball (based on the assigned velocity). In some embodiments, the system displays the characteristics to the user 110 on the display 130 such as the velocity of the virtual object 140.

In some embodiments, the method 400 further determines (408) an angle of release based on the wrist information and a release input from the user and assigning the velocity in accordance with the angle of release. In some embodiments, a velocity is assigned to the virtual object 140 based on the angle of release and/or the center of mass of the virtual object 140. In some embodiments, assigning a velocity to the virtual object 140 includes assigning a trajectory to the virtual object 140. For example, as shown in FIGS. 1A-1H, as the user 110 throws the virtual object 140 and positions their hand, wrist and arm in the release position (e.g., a release input), the wrist information gathered by the one or more sensors can determine an angle of release of the virtual object 140. In some embodiments, the velocity is determined based on a time of release of the virtual object. Additionally, in some embodiments, the velocity is assigned to the virtual object in response to detecting the user perform a release gesture. In some embodiments, the release gesture includes the user 110 releasing a pinch gesture (e.g., as shown in FIG. 1D) after the user performs a throwing motion with a pinch gesture. In some embodiments, when the user 110 is holding a handheld device 360, pressing or releasing a button on the handheld device 360 is a release gesture.

The method 400 further includes assigning (410) one or more motion characteristics to the virtual object in accordance with the tracking information and the wrist information. In some embodiments, motion characteristics include center of mass, velocity, speed, direction, and/or angle of release. In some embodiments, the trajectory of the virtual object determined or altered based on one or more motion characteristics. For example, as shown in FIGS. 1A-3C, the trajectory of the virtual object in the virtual space is determined based on the angle of release and the velocity of the object. In some embodiments, extrapolations from wrist information gathered by one or more sensors can contribute to motion characteristics. In some embodiments, assigning a velocity to a virtual object includes assigning a speed, direction and trajectory to the virtual object. For example, if the user 110 is throwing a change up, the speed and direction of the ball are going to vary throughout the trajectory of the ball, and the change in speed in direction will be essential to the trajectory. In some embodiments, an acceleration is assigned to the virtual object in accordance with the wrist and tracking information.

In some embodiments, characteristics such as rotational velocity can be assigned to the virtual object based on wrist information. In some embodiments, the rotational velocity is assigned based on hand (e.g., finger) information in the wrist information. For example, the rotational velocity is assigned based on a position of one or more fingers at a time of release (e.g., the time when the release gesture is performed).

In some embodiments, feedback corresponding to one or more of the motion characteristics is provided to the user 110. For example, the feedback information indicates to the user 110 whether the user's form is correct. In some embodiments, the feedback information includes audio feedback, visual feedback, and/or haptic feedback. In some embodiments, the feedback information is provided to the user via the head-wearable device. For example, as shown in FIG. 1G, the system provides feedback to the user 110 about their fast ball and a corrective step in order to improve the user's form.

In some embodiments, the method 400 further includes, in conjunction with tracking the position of the arm, the computer system obtains (412) additional tracking information by tracking a position of the other arm of the user and obtain additional wrist information by detecting, via an additional neuromuscular-signal sensor, a movement of a wrist of the other arm, wherein the one or more motion characteristics are based on the additional tracking information and the additional wrist information. In some embodiments, the user 110 is wearing one or more devices to track the position of both of the user's arms/wrists. In some embodiments, the device on the first arm can track positions on the first arm and a second arm. In some embodiments, the user 110 is wearing one or more devices coupled to sensors that can track both arms and wrists of the user 110.

Figure 5:
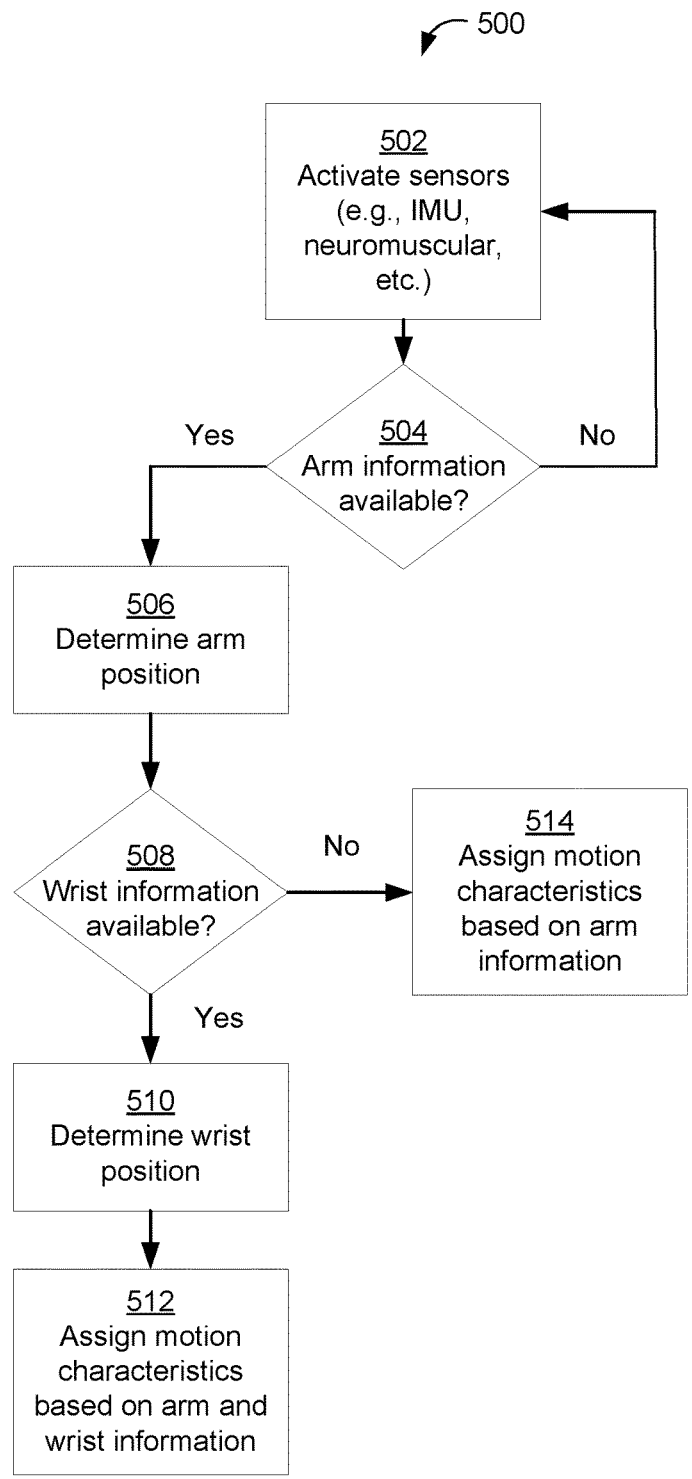
FIG. 5 is a logical flow diagram showing an example method for assigning motion characteristics based on user movements in accordance with some embodiments.

FIG. 5 is a logical flow diagram showing a method 500 for assigning motion characteristics based on user movements in accordance with some embodiments. The method 500 is performed at a computing system (e.g., the AR system 5000 shown in FIGS. 6A-6D). In some embodiments, the computing system includes one or more wearable devices (e.g., the wrist-wearable device 120 and/or the head-wearable device 230). In some embodiments, the computing system includes one or more intermediary devices (e.g., a smartphone, laptop, or gaming console). In some embodiments, the computing system includes one or more handheld devices (e.g., a controller). The computing system includes one or more processors (e.g., the processor(s) 6079 and the memory 6080 in FIG. 7B and/or the processor(s) 7048 and the memory 7050 in FIG. 8C). In some embodiments, the memory stores one or more programs configured for execution by the one or more processors. At least some of the operations of the method 500 correspond to instructions stored in a computer memory or computer-readable storage medium.

The system activates (502) one or more sensors (e.g., an IMU and/or neuromuscular sensor). In some embodiments, the one or more sensors are activated when a user 110 moves their wrist/arm. In some embodiments, the one or more sensors are activated via a command by the user 110. In some embodiments, the command is a verbal command, or a button pressed by the user 110. In some embodiments, a subset of the sensors are active, and when the subset sense that the user 110 moving, the remainder of the sensors are activated.

The system determines (504) whether any arm information is available. For example, the system determines whether any sensors are active and positioned to sense arm movement/position. In some embodiments, the sensors detect whether the arm is moving in a way in which arm information is detected. In some embodiments, if arm information is not detected, the system returns to activating (502) the sensors. In some embodiments, if arm information is not detected, the system notifies the user. In some embodiments, the system maintains its current state until arm information is detected. If arm information is detected, the system moves onto to determining the position of the user's arm.

The system determines (506) the position of the user's arm. In some embodiments, the system uses the arm information to determine the position of the user's arm. In some embodiments, as shown in the graph 108 in FIGS. 1A-3C, the system determines the position of the user's arm via one or more sensors and displays the position of the user's arm via the display 130. In some embodiments, the system tracks the position of the user's arm using one or more IMUs and/or one or more image sensors.

The system determines (508) whether there is wrist information. For example, the system determines whether any sensors are active and positioned to capture wrist information. In some embodiments, the one or more sensors coupled to the wrist-wearable device sense wrist information when the user is moving their wrist. For example, as shown in FIGS. 1A-1H, while the user 110 is interacting with the virtual object 140 (e.g., throwing a virtual ball), the wrist activity graph 100 indicates to the user's different intensity of wrist angle activity. In some embodiments, the system performs operation 508 before operation 506 (e.g., performs operation 508 concurrently with operation 504).

If no wrist information is available, the system assigns (514) motion characteristics to the virtual object 140 based on the arm information (e.g., without any wrist information). For example, if no wrist information is detected, the system only has arm information with which to assign motion characteristics to a virtual object 140.

If wrist information is available, the system determines (510) the position of the user's wrist. In some embodiments, the system uses the wrist information to determine wrist position and wrist activity intensity (as shown in the graph 100 in FIGS. 1A-3C). The position of the user's wrist at each given point of a user's throw, for example, can impact the result of the trajectory of the virtual object 140.

The system assigns (512) the motion characteristics based on the arm and wrist information. In some embodiments, motion characteristics are assigned based on both arm and wrist information as each type of information influences the motion characteristics of the virtual object 140. For example, the user 110 in FIG. 1A-1H is attempting to throw a virtual baseball and the arm movement, wrist movement, and angle of release all impact the movement of the virtual baseball. In this way, the motion characteristics assigned in operation 512 may be more accurate and precise than the motion characteristics assigned in operation 514. Having thus described example scenarios and processes, attention will now be turned to example devices and systems.

Example Systems

Figure 6A:
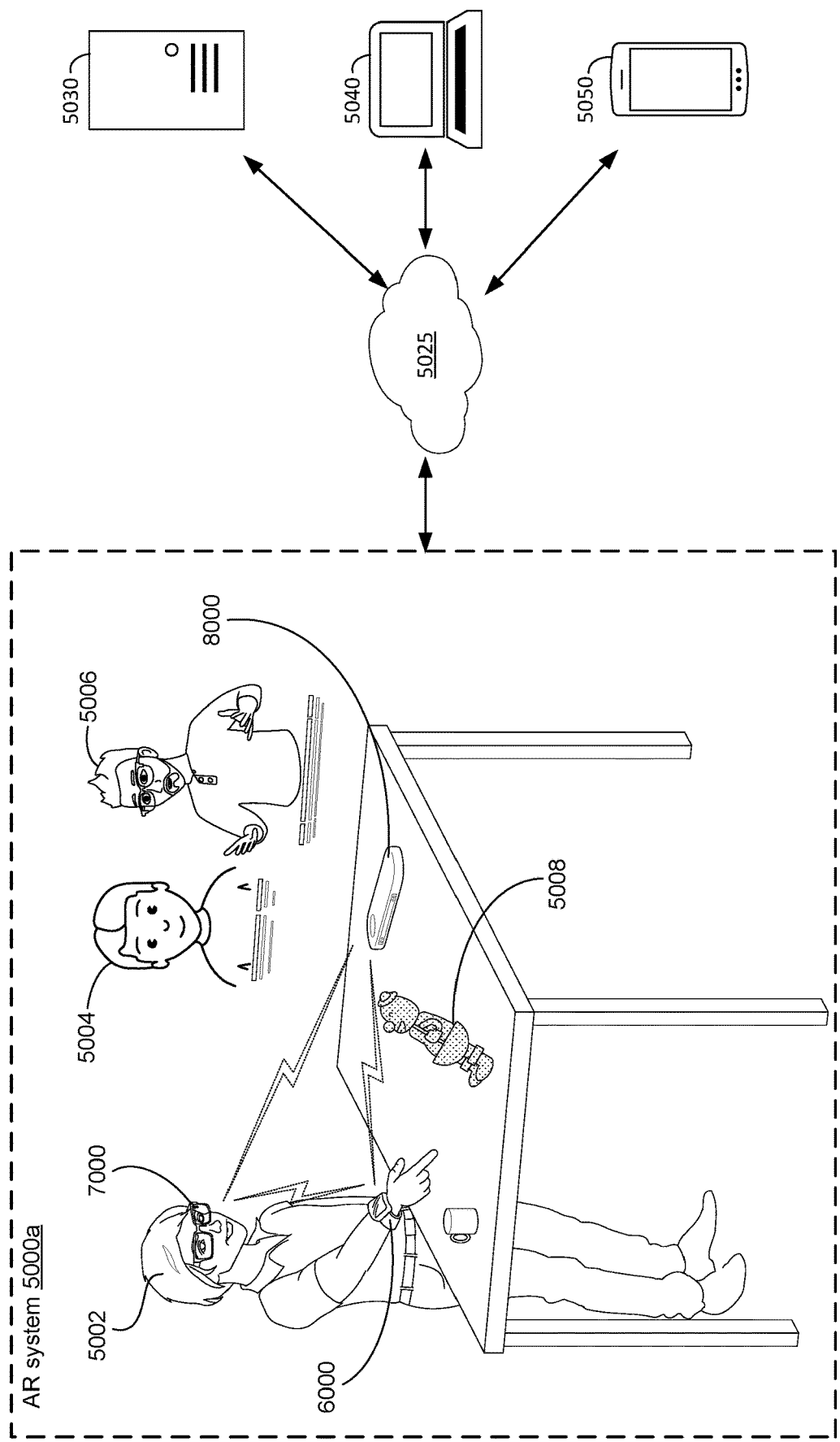
Figure 6B:
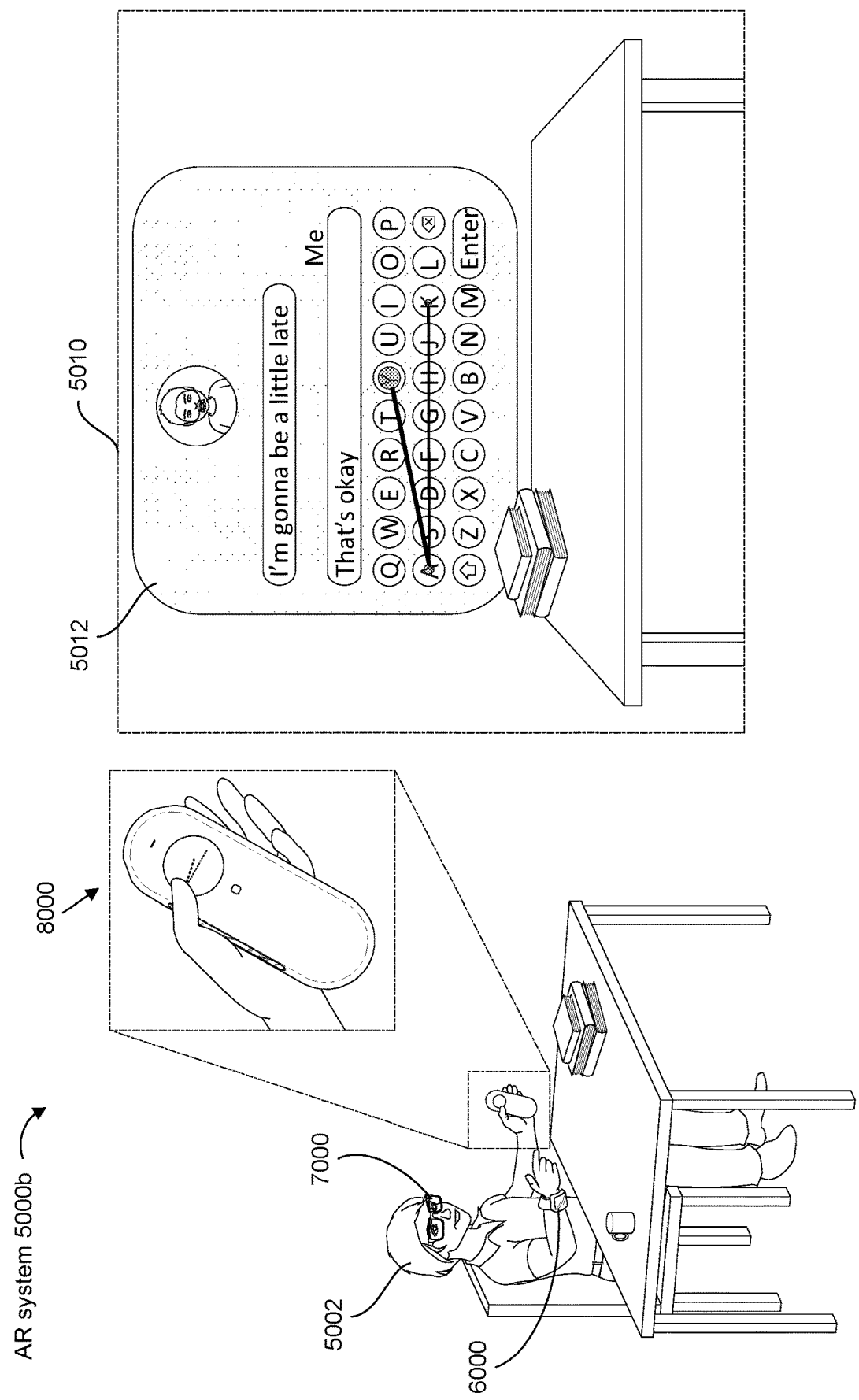
Figures 1, 6C:
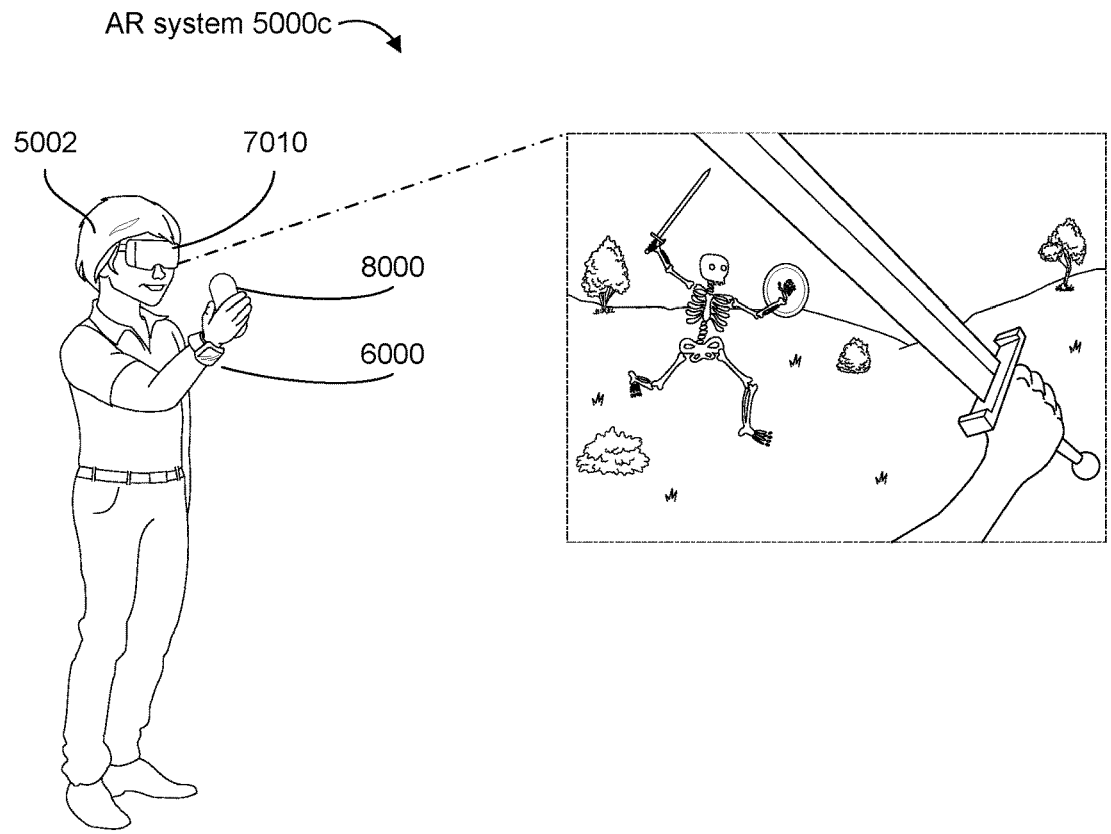
Figures 2, 6C:
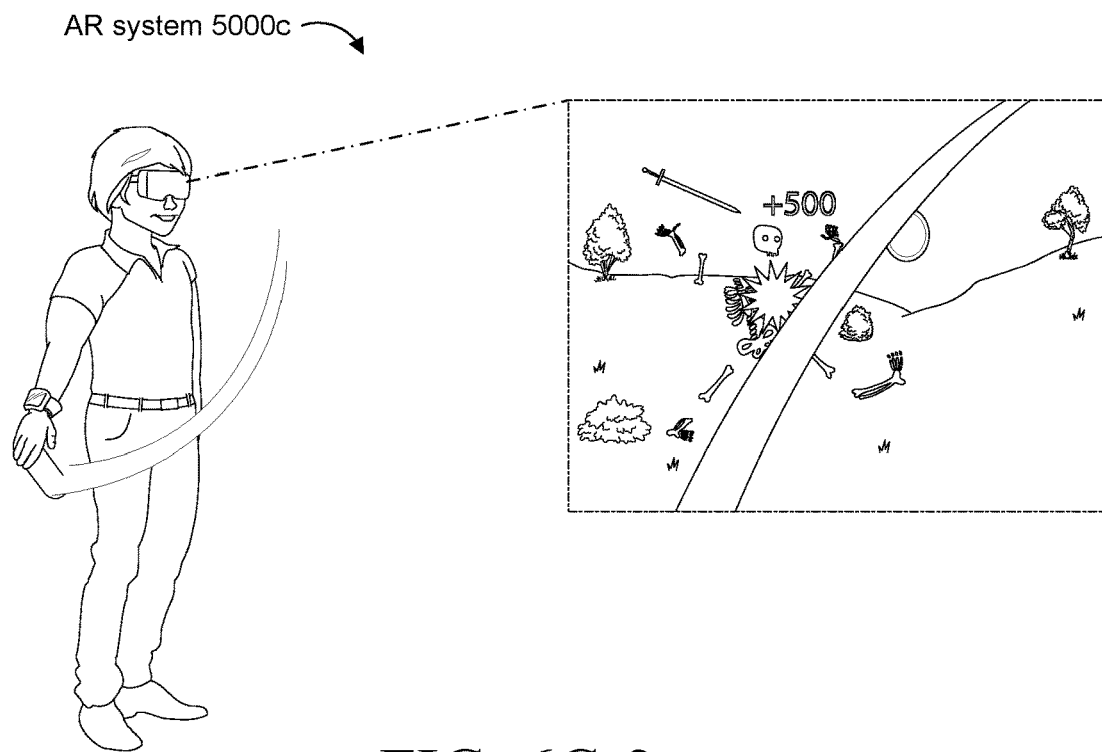
Figures 1, 6D:
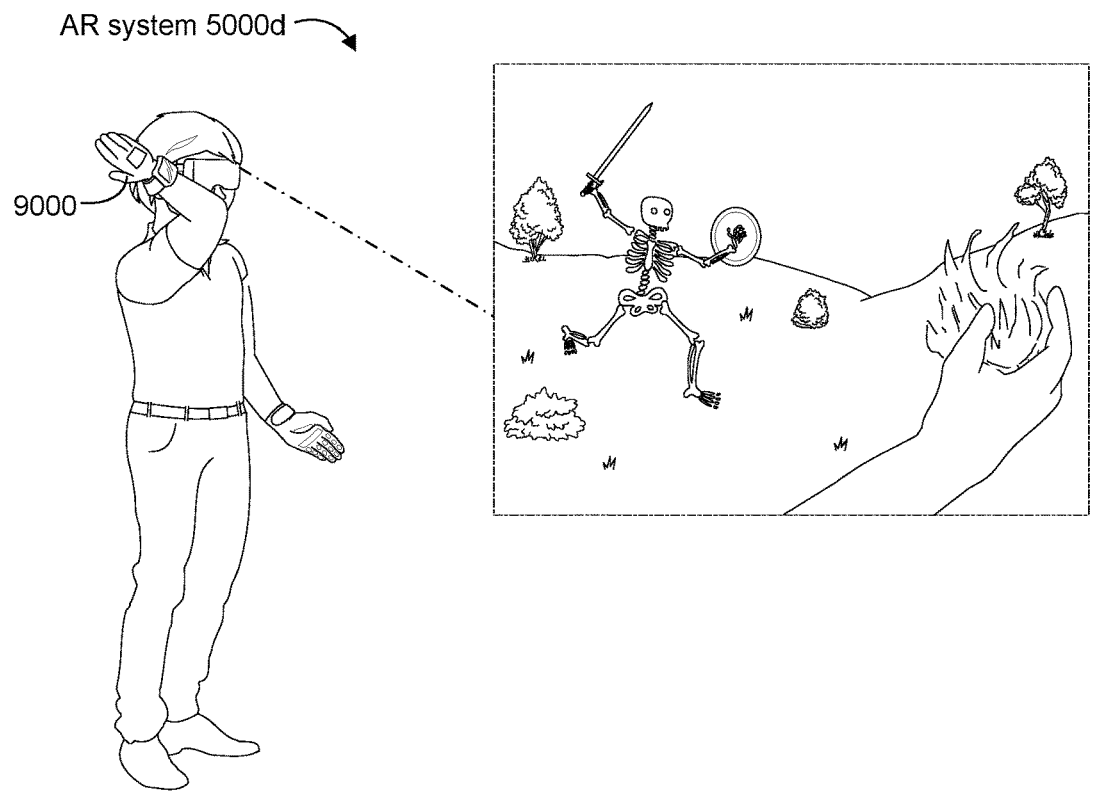
Figures 2, 6D:
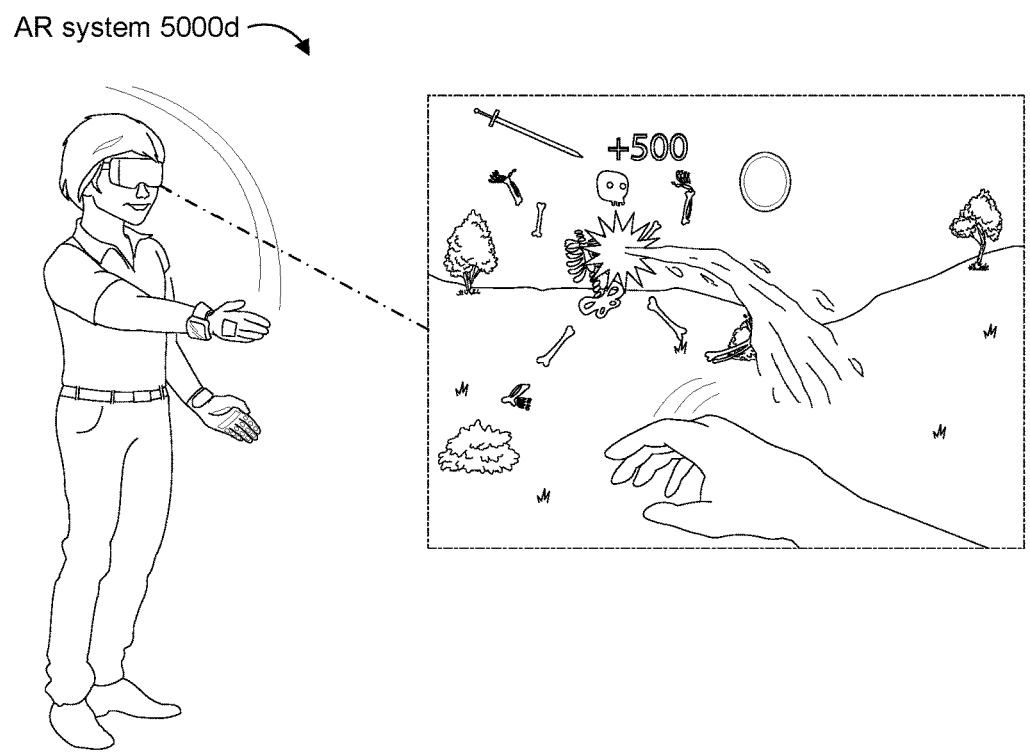

FIGS. 6A-6D illustrate example AR systems in accordance with some embodiments. FIG. 6A shows an AR system 5000a and first example user interactions using a wrist-wearable device 6000, a head-wearable device (e.g., AR system 7000), and/or a handheld intermediary processing device (HIPD) 8000. FIG. 6B shows an AR system 5000b and second example user interactions using the wrist-wearable device 6000, the AR system 7000, and/or an HIPD 8000. FIGS. 6C-1 and 6C-2 show an AR system 5000c and third example user interactions using a wrist-wearable device 6000, a head-wearable device (e.g., VR headset 7010), and/or an HIPD 8000. FIGS. 6D-1 and 6D-2 show a fourth AR system 5000d and fourth example user interactions using a wrist-wearable device 6000, VR headset 7010, and/or device 9000 (e.g., wearable haptic gloves). The above-example AR systems (described in detail below) can perform the various functions and/or operations described above with reference to FIGS. 1-5.

The wrist-wearable device 6000 and its components are described below in reference to FIGS. 7A-7B; the head-wearable devices and their components are described below in reference to FIGS. 8A-8D; and the HIPD 8000 and its components are described below in reference to FIGS. 9A-9B. Wearable gloves and their components are described below in reference to FIGS. 10A-10C. As shown in FIG. 6A, the wrist-wearable device 6000, the head-wearable devices, and/or the HIPD 8000 can communicatively couple via a network 5025 (e.g., cellular, near field, Wi-Fi, personal area network, or wireless LAN). Additionally, the wrist-wearable device 6000, the head-wearable devices, and/or the HIPD 8000 can also communicatively couple with one or more servers 5030, computers 5040 (e.g., laptops or desktop computers), mobile devices 5050 (e.g., smartphones or tablets), and/or other electronic devices via the network 5025 (e.g., cellular, near field, Wi-Fi, personal area network, or wireless LAN) Similarly, the device 9000 can also communicatively couple with the wrist-wearable device 6000, the head-wearable devices, the HIPD 8000, the one or more servers 5030, the computers 5040, the mobile devices 5050, and/or other electronic devices via the network 5025.

Turning to FIG. 6A, a user 5002 is shown wearing the wrist-wearable device 6000 and the AR system 7000 and having the HIPD 8000 on their desk. The wrist-wearable device 6000, the AR system 7000, and the HIPD 8000 facilitate user interaction with an AR environment. In particular, as shown by the AR system 5000a, the wrist-wearable device 6000, the AR system 7000, and/or the HIPD 8000 cause presentation of one or more avatars 5004, digital representations of contacts 5006, and virtual objects 5008. As discussed below, the user 5002 can interact with the one or more avatars 5004, digital representations of the contacts 5006, and virtual objects 5008 via the wrist-wearable device 6000, the AR system 7000, and/or the HIPD 8000.

The user 5002 can use any of the wrist-wearable device 6000, the AR system 7000, and/or the HIPD 8000 to provide user inputs. For example, the user 5002 can perform one or more hand gestures that are detected by the wrist-wearable device 6000 (e.g., using one or more EMG sensors and/or IMUs, described below in reference to FIGS. 7A-7B) and/or AR system 7000 (e.g., using one or more image sensor or camera, described below in reference to FIGS. 8A-8B) to provide a user input. Alternatively, or additionally, the user 5002 can provide a user input via one or more touch surfaces of the wrist-wearable device 6000, the AR system 7000, and/or the HIPD 8000, and/or voice commands captured by a microphone of the wrist-wearable device 6000, the AR system 7000, and/or the HIPD 8000. In some embodiments, the wrist-wearable device 6000, the AR system 7000, and/or the HIPD 8000 include a digital assistant to help the user in providing a user input (e.g., completing a sequence of operations, suggesting different operations or commands, providing reminders, or confirming a command). In some embodiments, the user 5002 provides a user input via one or more facial gestures and/or facial expressions. For example, cameras of the wrist-wearable device 6000, the AR system 7000, and/or the HIPD 8000 can track the user 5002's eyes for navigating a user interface.

The wrist-wearable device 6000, the AR system 7000, and/or the HIPD 8000 can operate alone or in conjunction to allow the user 5002 to interact with the AR environment. In some embodiments, the HIPD 8000 is configured to operate as a central hub or control center for the wrist-wearable device 6000, the AR system 7000, and/or another communicatively coupled device. For example, the user 5002 can provide an input to interact with the AR environment at any of the wrist-wearable device 6000, the AR system 7000, and/or the HIPD 8000, and the HIPD 8000 can identify one or more back-end and front-end tasks to cause the performance of the requested interaction and distribute instructions to cause the performance of the one or more back-end and front-end tasks at the wrist-wearable device 6000, the AR system 7000, and/or the HIPD 8000. In some embodiments, a back-end task is background processing task that is not perceptible by the user (e.g., rendering content, decompression, or compression), and a front-end task is a user-facing task that is perceptible to the user (e.g., presenting information to the user or providing feedback to the user). As described below in reference to FIGS. 9A-9B, the HIPD 8000 can perform the back-end tasks and provide the wrist-wearable device 6000 and/or the AR system 7000 operational data corresponding to the performed back-end tasks such that the wrist-wearable device 6000 and/or the AR system 7000 can perform the front-end tasks. In this way, the HIPD 8000, which can have more computational resources and greater thermal headroom than the wrist-wearable device 6000 and/or the AR system 7000, performs computationally intensive tasks and reduces the computer resource utilization and/or power usage of the wrist-wearable device 6000 and/or the AR system 7000.

In the example shown by the AR system 5000*a*, the HIPD 8000 identifies one or more back-end tasks and front-end tasks associated with a user request to initiate an AR video call with one or more other users (represented by the avatar 5004 and the digital representation of the contact 5006) and distributes instructions to cause the performance of the one or more back-end tasks and front-end tasks. In particular, the HIPD 8000 performs back-end tasks for processing and/or rendering image data (and other data) associated with the AR video call and provides operational data associated with the performed back-end tasks to the AR system 7000 such that the AR system 7000 perform front-end tasks for presenting the AR video call (e.g., presenting the avatar 5004 and the digital representation of the contact 5006).

In some embodiments, the HIPD 8000 operates as a focal or anchor point for causing the presentation of information. This allows the user 5002 to be generally aware of where information is presented. For example, as shown in the AR system 5000*a*, the avatar 5004 and the digital representation of the contact 5006 are presented above the HIPD 8000. In particular, the HIPD 8000 and the AR system 7000 operate in conjunction to determine a location for presenting the avatar 5004 and the digital representation of the contact 5006. In some embodiments, information can be presented a predetermined distance from the HIPD 8000 (e.g., within 5 meters). For example, as shown in the AR system 5000*a*, virtual object 5008 is presented on the desk some distance from the HIPD 8000. Similar to the above example, the HIPD 8000 and the AR system 7000 can operate in conjunction to determine a location for presenting the virtual object 5008. Alternatively, in some embodiments, presentation of information is not bound by the HIPD 8000. More specifically, the avatar 5004, the digital representation of the contact 5006, and the virtual object 5008 do not have to be presented within a predetermined distance of the HIPD 8000.

User inputs provided at the wrist-wearable device 6000, the AR system 7000, and/or the HIPD 8000 are coordinated such that the user can use any device to initiate, continue, and/or complete an operation. For example, the user 5002 can provide a user input to the AR system 7000 to cause the AR system 7000 to present the virtual object 5008 and, while the virtual object 5008 is presented by the AR system 7000, the user 5002 can provide one or more hand gestures via the wrist-wearable device 6000 to interact and/or manipulate the virtual object 5008.

FIG. 6B shows the user 5002 wearing the wrist-wearable device 6000 and the AR system 7000 and holding the HIPD 8000. In the AR system 5000*b*, the wrist-wearable device 6000, the AR system 7000, and/or the HIPD 8000 are used to receive and/or provide one or more messages to a contact of the user 5002. In particular, the wrist-wearable device 6000, the AR system 7000, and/or the HIPD 8000 detect and coordinate one or more user inputs to initiate a messaging application and prepare a response to a received message via the messaging application.

In some embodiments, the user 5002 initiates, via a user input, an application on the wrist-wearable device 6000, the AR system 7000, and/or the HIPD 8000 that causes the application to initiate on at least one device. For example, in the AR system 5000*b* the user 5002 performs a hand gesture associated with a command for initiating a messaging application (represented by messaging user interface 5012); the wrist-wearable device 6000 detects the hand gesture; and, based on a determination that the user 5002 is wearing AR system 7000, causes the AR system 7000 to present a messaging user interface 5012 of the messaging application. The AR system 7000 can present the messaging user interface 5012 to the user 5002 via its display (e.g., as shown by user 5002's field of view 5010). In some embodiments, the application is initiated and ran on the device (e.g., the wrist-wearable device 6000, the AR system 7000, and/or the HIPD 8000) that detects the user input to initiate the application, and the device provides another device operational data to cause the presentation of the messaging application. For example, the wrist-wearable device 6000 can detect the user input to initiate a messaging application; initiate and run the messaging application; and provide operational data to the AR system 7000 and/or the HIPD 8000 to cause presentation of the messaging application. Alternatively, the application can be initiated and ran at a device other than the device that detected the user input. For example, the wrist-wearable device 6000 can detect the hand gesture associated with initiating the messaging application and cause the HIPD 8000 to run the messaging application and coordinate the presentation of the messaging application.

Further, the user 5002 can provide a user input provided at the wrist-wearable device 6000, the AR system 7000, and/or the HIPD 8000 to continue and/or complete an operation initiated are at another device. For example, after initiating the messaging application via the wrist-wearable device 6000 and while the AR system 7000 present the messaging user interface 5012, the user 5002 can provide an input at the HIPD 8000 to prepare a response (e.g., shown by the swipe gesture performed on the HIPD 8000). The user 5002's gestures performed on the HIPD 8000 can be provided and/or displayed on another device. For example, the user 5002's swipe gestured performed on the HIPD 8000 are displayed on a virtual keyboard of the messaging user interface 5012 displayed by the AR system 7000.

In some embodiments, the wrist-wearable device 6000, the AR system 7000, the HIPD 8000, and/or other communicatively couple device presents one or more notifications to the user 5002. The notification can be an indication of a new message, an incoming call, an application update, or a status update. The user 5002 can select the notification via the wrist-wearable device 6000, the AR system 7000, the HIPD 8000, and cause presentation of an application or operation associated with the notification on at least one device. For example, the user 5002 can receive a notification that a message was received at the wrist-wearable device 6000, the AR system 7000, the HIPD 8000, and/or other communicatively couple device and provide a user input at the wrist-wearable device 6000, the AR system 7000, and/or the HIPD 8000 to review the notification, and the device detecting the user input can cause an application associated with the notification to be initiated and/or presented at the wrist-wearable device 6000, the AR system 7000, and/or the HIPD 8000.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, and financial applications. For example, the AR system 7000 can present to the user 5002 game application data and the HIPD 8000 can use a controller to provide inputs to the game. Similarly, the user 5002 can use the wrist-wearable device 6000 to initiate a camera of the AR system 7000, and the user can use the wrist-wearable device 6000, the AR system 7000, and/or the HIPD 8000 to manipulate the image capture (e.g., zoom in or out or apply filters) and capture image data.

Having discussed example AR systems, devices for interacting with such AR systems, and other computing systems more generally, will now be discussed in greater detail below. Some definitions of devices and components that can be included in some or all of the example devices discussed below are defined here for case of reference. A skilled artisan will appreciate that certain types of the components described below may be more suitable for a particular set of devices, and less suitable for a different set of devices. But subsequent reference to the components defined here should be considered to be encompassed by the definitions provided.

In some embodiments discussed below example devices and systems, including electronic devices and systems, will be discussed. Such example devices and systems are not intended to be limiting, and one of skill in the art will understand that alternative devices and systems to the example devices and systems described herein may be used to perform the operations and construct the systems and device that are described herein.

As described herein, an electronic device is a device that uses electrical energy to perform one or more functions. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices, and/or a subset of components of one or more electronic devices and facilitates communication, and/or data processing and/or data transfer between the respective electronic devices and/or electronic components.

As described herein, a processor (e.g., a central processing unit (CPU)), is an electronic component that is responsible for executing instructions and controlling the operation of an electronic device (e.g., a computer). There are various types of processors that may be used interchangeably, or may be specifically required, by embodiments described herein. For example, a processor may be: (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., virtual-reality animations, such as three-dimensional modeling); (iv) a field-programmable gate array (FPGA) that can be programmed and reconfigured after manufacturing, and/or can be customized to perform specific tasks, such as signal processing, cryptography, and machine learning; (v) a digital signal processor (DSP) designed to perform mathematical operations on signals such as audio, video, and radio waves. One of skill in the art will understand that one or more processors of one or more electronic devices may be used in various embodiments described herein.

As described herein, memory refers to electronic components in a computer or electronic device that store data and instructions for the processor to access and manipulate. Examples of memory can include: (i) random access memory (RAM) configured to store data and instructions temporarily; (ii) read-only memory (ROM) configured to store data and instructions permanently (e.g., one or more portions of system firmware, and/or boot loaders); (iii) flash memory, which can be configured to store data in electronic devices (e.g., USB drives, memory cards, and/or solid-state drives (SSDs); and (iv) cache memory configured to temporarily store frequently accessed data and instructions. Memory, as described herein, can include structured data (e.g., SQL databases, MongoDB databases, GraphQL data, and/or JSON data). Other examples of memory can include: (i) profile data, including user account data, user settings, and/or other user data stored by the user; (ii) sensor data detected and/or otherwise obtained by one or more sensors;

(iii) media content data including stored image data, audio data, documents, and the like; (iv) application data, which can include data collected and/or otherwise obtained and stored during use of an application; and/or any other types of data described herein.

As described herein, controllers are electronic components that manage and coordinate the operation of other components within an electronic device (e.g., controlling inputs, processing data, and/or generating outputs). Examples of controllers can include: (i) microcontrollers, including small, low-power controllers that are commonly used in embedded systems and Internet of Things (IoT) devices; (ii) programmable logic controllers (PLCs) which may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs.

As described herein, a power system of an electronic device is configured to convert incoming electrical power into a form that can be used to operate the device. A power system can include various components, including: (i) a power source, which can be an alternating current (AC) adapter or a direct current (DC) adapter power supply; (ii) a charger input, and can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and to ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals, and can provide a means for input and output of data and signals. Examples of peripheral interfaces can include: (i) universal serial bus (USB) and/or micro-USB interfaces configured for connecting devices to an electronic device; (ii) Bluetooth interfaces configured to allow devices to communicate with each other, including Bluetooth low energy (BLE); (iii) near field communication (NFC) interfaces configured to be short-range wireless interface for operations such as access control; (iv) POGO pins, which may be small, spring-loaded pins configured to provide a charging interface; (v) wireless charging interfaces; (vi) GPS interfaces; (vii) Wi-Fi interfaces for providing a connection between a device and a wireless network; (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can includer: (i) imaging sensors for collecting imaging data (e.g., including one or more cameras disposed on a respective electronic device); (ii) biopotential-signal sensors; (iii) inertial measurement unit (e.g., IMUs) for detecting, for example, angular rate, force, magnetic field, and/or changes in acceleration; (iv) heart rate sensors for measuring a user's heart rate; (v) SpO2 sensors for measuring blood oxygen saturation and/or other biometric data of a user; (vi) capacitive sensors for detecting changes in potential at a portion of a user's body (e.g., a sensor-skin interface); and light sensors (e.g., time-of-flight sensors, infrared light sensors, and/or visible light sensors). As described herein biopotential-signal-sensing components are devices used to measure electrical activity within the body (e.g., biopotential-signal sensors). Some types of biopotential-signal sensors include: (i) electroencephalography (EEG) sensors configured to measure electrical activity in the brain to diagnose neurological disorders; (ii) electrocardiography (ECG or EKG) sensors configured to measure electrical activity of the heart to diagnose heart problems; (iii) electromyography (EMG) sensors configured to measure the electrical activity of muscles and to diagnose neuromuscular disorders; (iv) electrooculography (EOG) sensors configure to measure the electrical activity of eye muscles to detect eye movement and diagnose eye disorders.

As described herein, an application stored in memory of an electronic device (e.g., software) includes instructions stored in the memory. Examples of such applications include: (i) games; (ii) word processors; messaging applications; media-streaming applications; financial applications; calendars; clocks; communication interface modules for enabling wired and/or wireless connections between different respective electronic devices (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocols);

As described herein, a communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, Bluetooth). In some embodiments, a communication interface can refer to a software layer that enables different software programs to communicate with each other (e.g., application programming interfaces (APIs) and/or protocols like HTTP and TCP/IP).

As described herein, a graphics module is a component or software module that is designed to handle graphical operations and/or processes, and can include a hardware module and/or a software module.

As described herein, non-transitory computer-readable storage media are physical devices or storage medium that can be used to store electronic data in a non-transitory form (e.g., such that the data is stored permanently until it is intentionally deleted or modified).

Example Wrist-Wearable Devices

Figure 7A:
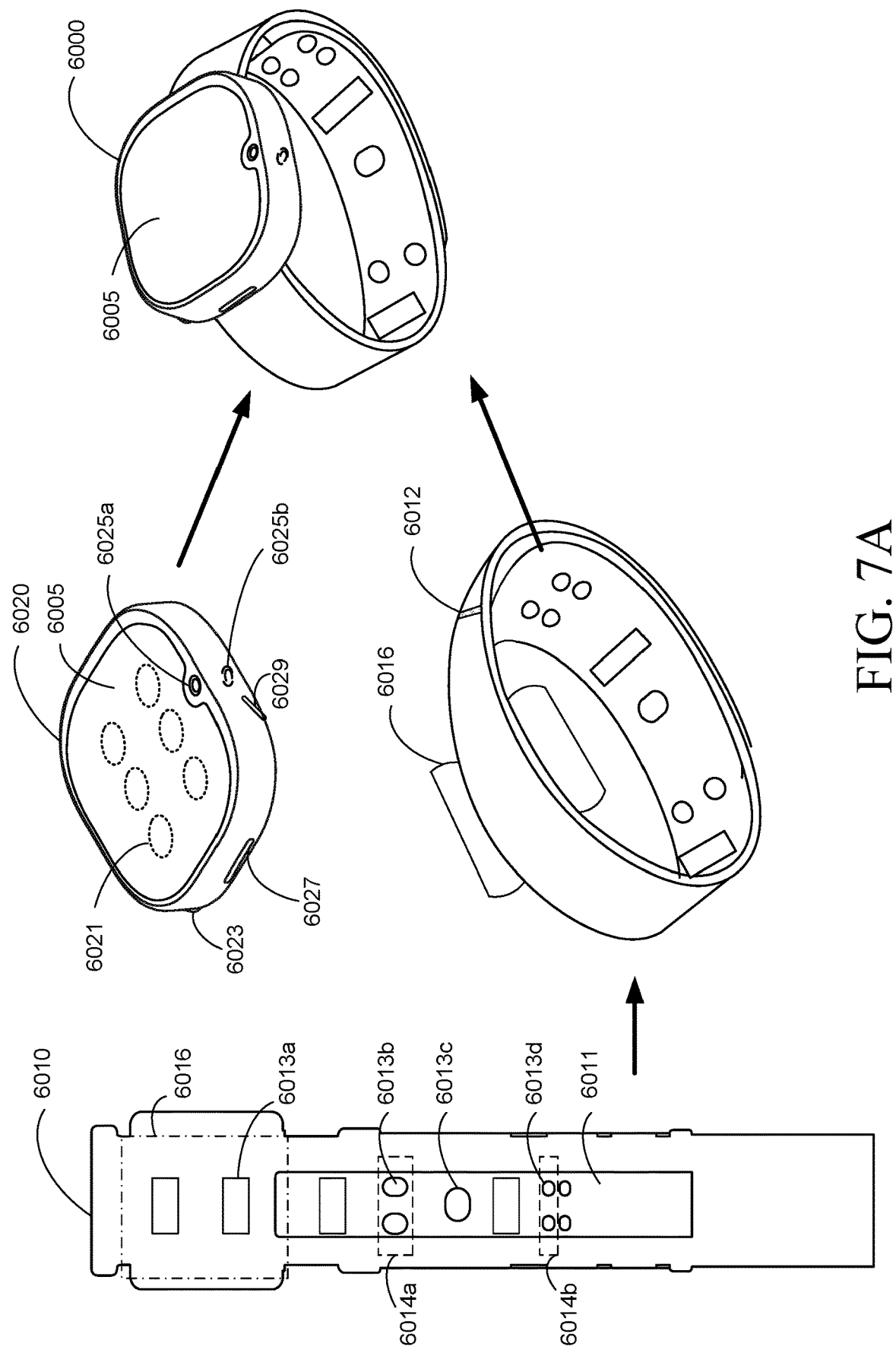
FIGS. 7A-7B illustrate an example wrist-wearable device in accordance with some embodiments.
Figure 7B:
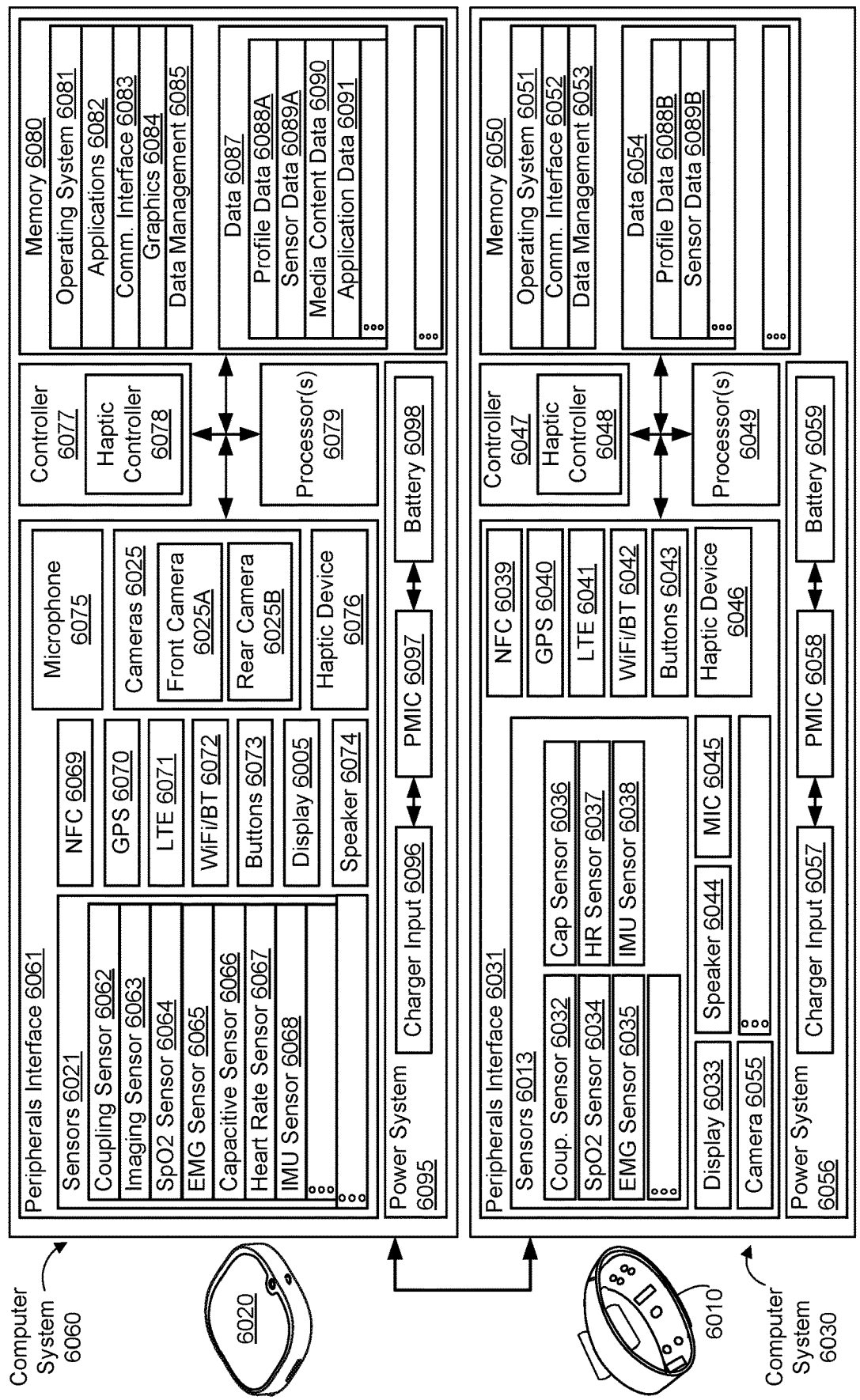

FIGS. 7A and 7B illustrate the wrist-wearable device 6000 in accordance with some embodiments. FIG. 7A illustrates components of the wrist-wearable device 6000, which can be used individually or in combination, including combinations that include other electronic devices and/or electronic components.

FIG. 7A shows a wearable band 6010 and a watch body 6020 (or capsule) being coupled, as discussed below, to form the wrist-wearable device 6000. The wrist-wearable device 6000 can perform various functions and/or operations associated with navigating through user interfaces and selectively opening applications, as well as the functions and/or operations described above with reference to FIGS. 1A-6.

As will be described in more detail below, operations executed by the wrist-wearable device 6000 can include: (i) presenting content to a user (e.g., displaying visual content via a display 6005); (ii) detecting (e.g., sensing) user input (e.g., sensing a touch on peripheral button 6023 and/or at a touch screen of the display 6005, a hand gesture detected by sensors (e.g., biopotential sensors); (iii) sensing biometric data via one or more sensors 6013 (e.g., neuromuscular signals, heart rate, temperature, and/or sleep); messaging (e.g., text, speech, and/or video); image capture via one or more imaging devices or cameras 6025; wireless communications (e.g., cellular, near field, Wi-Fi, and/or personal area network); location determination; financial transactions; providing haptic feedback; alarms; notifications; biometric authentication; health monitoring; and sleep monitoring.

The above-example functions can be executed independently in the watch body 6020, independently in the wearable band 6010, and/or via an electronic communication between the watch body 6020 and the wearable band 6010. In some embodiments, functions can be executed on the wrist-wearable device 6000 while an AR environment is being presented (e.g., via one of the AR systems 5000a to 5000d). As the skilled artisan will appreciate upon reading the descriptions provided herein, the novel wearable devices described herein can be used with other types of AR environments.

The wearable band 6010 can be configured to be worn by a user such that an inner surface of the wearable band 6010 is in contact with the user's skin. When worn by a user, sensors 6013 contact the user's skin. The sensors 6013 can sense biometric data such as a user's heart rate, saturated oxygen level, temperature, sweat level, neuromuscular signal sensors, or a combination thereof. The sensors 6013 can also sense data about a user's environment including a user's motion, altitude, location, orientation, gait, acceleration, position, or a combination thereof. In some embodiment, the sensors 6013 are configured to track a position and/or motion of the wearable band 6010. The one or more sensors 6013 can include any of the sensors defined above and/or discussed below with respect to FIG. 7B.

The one or more sensors 6013 can be distributed on an inside and/or an outside surface of the wearable band 6010. In some embodiments, the one or more sensors 6013 are uniformly spaced along the wearable band 6010. Alternatively, in some embodiments, the one or more sensors 6013 are positioned at distinct points along the wearable band 6010. As shown in FIG. 7A, the one or more sensors 6013 can be the same or distinct. For example, in some embodiments, the one or more sensors 6013 can be shaped as a pill (e.g., sensor 6013a), an oval, a circle a square, an oblong (e.g., sensor 6013c) and/or any other shape that maintains contact with the user's skin (e.g., such that neuromuscular signal and/or other biometric data can be accurately measured at the user's skin). In some embodiments, the one or more sensors 6013 are aligned to form pairs of sensors (e.g., for sensing neuromuscular signals based on differential sensing within each respective sensor). For example, sensor 6013b is aligned with an adjacent sensor to form sensor pair 6014a and sensor 6013d aligned with an adjacent sensor to form sensor pair 6014b. In some embodiments, the wearable band 6010 does not have a sensor pair. Alternatively, in some embodiments, the wearable band 6010 has a predetermined number of sensor pairs (e.g., one pair of sensors, three pairs of sensors, four pairs of sensors, six pairs of sensors, or sixteen pairs of sensors).

The wearable band 6010 can include any suitable number of sensors 6013. In some embodiments, the number and arrangement of sensors 6013 depends on the particular application for which the wearable band 6010 is used. For instance, a wearable band 6010 configured as an armband, wristband, or chest-band may include a plurality of sensors 6013 with different number of sensors 6013 and different arrangement for each use case, such as medical use cases as compared to gaming or general day-to-day use cases.

In accordance with some embodiments, the wearable band 6010 further includes an electrical ground electrode and a shielding electrode. The electrical ground and shielding electrodes, like the sensors 6013, can be distributed on the inside surface of the wearable band 6010 such that they contact a portion of the user's skin. For example, the electrical ground and shielding electrodes can be at an inside surface of coupling mechanism 6016 or an inside surface of a wearable structure 6011. The electrical ground and shielding electrodes can be formed and/or use the same components as the sensors 6013. In some embodiments, the wearable band 6010 includes more than one electrical ground electrode and more than one shielding electrode.

The sensors 6013 can be formed as part of the wearable structure 6011 of the wearable band 6010. In some embodiments, the sensors 6013 are flush or substantially flush with the wearable structure 6011 such that they do not extend beyond the surface of the wearable structure 6011. While flush with the wearable structure 6011, the sensors 6013 are still configured to contact the user's skin (e.g., via a skin-contacting surface). Alternatively, in some embodiments, the sensors 6013 extend beyond the wearable structure 6011 a predetermined distance (e.g., 0.1-2 mm) to make contact and depress into the user's skin. In some embodiment, the sensors 6013 are coupled to an actuator (not shown) configured to adjust an extension height (e.g., a distance from the surface of the wearable structure 6011) of the sensors 6013 such that the sensors 6013 make contact and depress into the user's skin. In some embodiments, the actuators adjust the extension height between 0.01 mm-1.2 mm. This allows the user to customize the positioning of the sensors 6013 to improve the overall comfort of the wearable band 6010 when worn while still allowing the sensors 6013 to contact the user's skin. In some embodiments, the sensors 6013 are indistinguishable from the wearable structure 6011 when worn by the user.

The wearable structure 6011 can be formed of an elastic material (e.g., an elastomer) configured to be stretched and fitted to be worn by the user. In some embodiments, the wearable structure 6011 is a textile or woven fabric. As described above, the sensors 6013 can be formed as part of a wearable structure 6011. For example, the sensors 6013 can be molded into the wearable structure 6011 or be integrated into a woven fabric (e.g., the sensors 6013 can be sewn into the fabric and mimic the pliability of fabric (e.g., the sensors 6013 can be constructed from a series woven strands of fabric)).

The wearable structure 6011 can include flexible electronic connectors that interconnect the sensors 6013, the electronic circuitry, and/or other electronic components (described below in reference to FIG. 7B) that are enclosed in the wearable band 6010. In some embodiments, the flexible electronic connectors are configured to interconnect the sensors 6013, the electronic circuitry, and/or other electronic components of the wearable band 6010 with respective sensors and/or other electronic components of another electronic device (e.g., watch body 6020). The flexible electronic connectors are configured to move with the wearable structure 6011 such that the user adjustment to the wearable structure 6011 (e.g., resizing, pulling, and/or folding) does not stress or strain the electrical coupling of components of the wearable band 6010.

As described above, the wearable band 6010 is configured to be worn by a user. In particular, the wearable band 6010 can be shaped or otherwise manipulated to be worn by a user. For example, the wearable band 6010 can be shaped to have a substantially circular shape such that it can be configured to be worn on the user's lower arm or wrist. Alternatively, the wearable band 6010 can be shaped to be worn on another body part of the user, such as the user's upper arm (e.g., around a bicep), forearm, chest, or legs. The wearable band 6010 can include a retaining mechanism 6012 (e.g., a buckle or a hook and loop fastener) for securing the wearable band 6010 to the user's wrist or other body part. While the wearable band 6010 is worn by the user, the sensors 6013 sense data (referred to as sensor data) from the user's skin. In particular, the sensors 6013 of the wearable band 6010 obtain (e.g., sense and record) neuromuscular signals.

The sensed data (e.g., sensed neuromuscular signals) can be used to detect and/or determine the user's intention to perform certain motor actions. In particular, the sensors 6013 sense and record neuromuscular signals from the user as the user performs muscular activations (e.g., movements and/or gestures). The detected and/or determined motor actions (e.g., phalange (or digits) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on the display 6005 of the wrist-wearable device 6000 and/or can be transmitted to a device responsible for rendering an artificial-reality environment (e.g., a head-mounted display) to perform an action in an associated artificial-reality environment, such as to control the motion of a virtual device displayed to the user. The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by the sensors 6013 can be used to provide a user with an enhanced interaction with a physical object (e.g., devices communicatively coupled with the wearable band 6010) and/or a virtual object in an artificial-reality application generated by an artificial-reality system (e.g., user interface objects presented on the display 6005, or another computing device (e.g., a smartphone)).

In some embodiments, the wearable band 6010 includes one or more haptic devices 6046 (FIG. 7B, e.g., a vibratory haptic actuator) that are configured to provide haptic feedback (e.g., a cutaneous and/or kinesthetic sensation) to the user's skin. The sensors 6013, and/or the haptic devices 6046 can be configured to operate in conjunction with multiple applications including, without limitation, health monitoring, social media, games, and artificial reality (e.g., the applications associated with artificial reality).

The wearable band 6010 can also include coupling mechanism 6016 (e.g., a cradle or a shape of the coupling mechanism can correspond to shape of the watch body 6020 of the wrist-wearable device 6000) for detachably coupling a capsule (e.g., a computing unit) or watch body 6020 (via a coupling surface of the watch body 6020) to the wearable band 6010. In particular, the coupling mechanism 6016 can be configured to receive a coupling surface proximate to the bottom side of the watch body 6020 (e.g., a side opposite to a front side of the watch body 6020 where the display 6005 is located), such that a user can push the watch body 6020 downward into the coupling mechanism 6016 to attach the watch body 6020 to the coupling mechanism 6016. In some embodiments, the coupling mechanism 6016 can be configured to receive a top side of the watch body 6020 (e.g., a side proximate to the front side of the watch body 6020 where the display 6005 is located) that is pushed upward into the cradle, as opposed to being pushed downward into the coupling mechanism 6016. In some embodiments, the coupling mechanism 6016 is an integrated component of the wearable band 6010 such that the wearable band 6010 and the coupling mechanism 6016 are a single unitary structure. In some embodiments, the coupling mechanism 6016 is a type of frame or shell that allows the watch body 6020 coupling surface to be retained within or on the wearable band 6010 coupling mechanism 6016 (e.g., a cradle, a tracker band, a support base, or a clasp).

The coupling mechanism 6016 can allow for the watch body 6020 to be detachably coupled to the wearable band 6010 through a friction fit, magnetic coupling, a rotation-based connector, a shear-pin coupler, a retention spring, one or more magnets, a clip, a pin shaft, a hook and loop fastener, or a combination thereof. A user can perform any type of motion to couple the watch body 6020 to the wearable band 6010 and to decouple the watch body 6020 from the wearable band 6010. For example, a user can twist, slide, turn, push, pull, or rotate the watch body 6020 relative to the wearable band 6010, or a combination thereof, to attach the watch body 6020 to the wearable band 6010 and to detach the watch body 6020 from the wearable band 6010. Alternatively, as discussed below, in some embodiments, the watch body 6020 can be decoupled from the wearable band 6010 by actuation of the release mechanism 6029.

The wearable band 6010 can be coupled with a watch body 6020 to increase the functionality of the wearable band 6010 (e.g., converting the wearable band 6010 into a wrist-wearable device 6000, adding an additional computing unit and/or battery to increase computational resources and/or a battery life of the wearable band 6010, and/or adding additional sensors to improve sensed data). As described above, the wearable band 6010 (and the coupling mechanism 6016) is configured to operate independently (e.g., execute functions independently) from watch body 6020. For example, the coupling mechanism 6016 can include one or more sensors 6013 that contact a user's skin when the wearable band 6010 is worn by the user and provide sensor data for determining control commands.

A user can detach the watch body 6020 (or capsule) from the wearable band 6010 in order to reduce the encumbrance of the wrist-wearable device 6000 to the user. For embodiments in which the watch body 6020 is removable, the watch body 6020 can be referred to as a removable structure, such that in these embodiments the wrist-wearable device 6000 includes a wearable portion (e.g., the wearable band 6010) and a removable structure (the watch body 6020).

Turning to the watch body 6020, the watch body 6020 can have a substantially rectangular or circular shape. The watch body 6020 is configured to be worn by the user on their wrist or on another body part. More specifically, the watch body 6020 is sized to be easily carried by the user, attached on a portion of the user's clothing, and/or coupled to the wearable band 6010 (forming the wrist-wearable device 6000). As described above, the watch body 6020 can have a shape corresponding to the coupling mechanism 6016 of the wearable band 6010. In some embodiments, the watch body 6020 includes a single release mechanism 6029 or multiple release mechanisms (e.g., two release mechanisms 6029 positioned on opposing sides of the watch body 6020, such as spring-loaded buttons) for decoupling the watch body 6020 and the wearable band 6010. The release mechanism 6029 can include, without limitation, a button, a knob, a plunger, a handle, a lever, a fastener, a clasp, a dial, a latch, or a combination thereof.

A user can actuate the release mechanism 6029 by pushing, turning, lifting, depressing, shifting, or performing other actions on the release mechanism 6029. Actuation of the release mechanism 6029 can release (e.g., decouple) the watch body 6020 from the coupling mechanism 6016 of the wearable band 6010, allowing the user to use the watch body 6020 independently from wearable band 6010, and vice versa. For example, decoupling the watch body 6020 from the wearable band 6010 can allow the user to capture images using rear-facing camera 6025B. Although the is shown positioned at a corner of watch body 6020, the release mechanism 6029 can be positioned anywhere on watch body 6020 that is convenient for the user to actuate. In addition, in some embodiments, the wearable band 6010 can also include a respective release mechanism for decoupling the watch body 6020 from the coupling mechanism 6016. In some embodiments, the release mechanism 6029 is optional and the watch body 6020 can be decoupled from the coupling mechanism 6016 as described above (e.g., via twisting or rotating).

The watch body 6020 can include one or more peripheral buttons 6023 and 6027 for performing various operations at the watch body 6020. For example, the peripheral buttons 6023 and 6027 can be used to turn on or wake (e.g., transition from a sleep state to an active state) the display 6005, unlock the watch body 6020, increase or decrease a volume, increase or decrease a brightness, interact with one or more applications, and/or interact with one or more user interfaces. Additionally, or alternatively, in some embodiments, the display 6005 operates as a touch screen and allows the user to provide one or more inputs for interacting with the watch body 6020.

In some embodiments, the watch body 6020 includes one or more sensors 6021. The sensors 6021 of the watch body 6020 can be the same or distinct from the sensors 6013 of the wearable band 6010. The sensors 6021 of the watch body 6020 can be distributed on an inside and/or an outside surface of the watch body 6020. In some embodiments, the sensors 6021 are configured to contact a user's skin when the watch body 6020 is worn by the user. For example, the sensors 6021 can be placed on the bottom side of the watch body 6020 and the coupling mechanism 6016 can be a cradle with an opening that allows the bottom side of the watch body 6020 to directly contact the user's skin. Alternatively, in some embodiments, the watch body 6020 does not include sensors that are configured to contact the user's skin (e.g., including sensors internal and/or external to the watch body 6020 that configured to sense data of the watch body 6020 and the watch body 6020's surrounding environment). In some embodiment, the sensors 6013 are configured to track a position and/or motion of the watch body 6020.

The watch body 6020 and the wearable band 6010 can share data using a wired communication method (e.g., a Universal Asynchronous Receiver/Transmitter (UART) or a USB transceiver) and/or a wireless communication method (e.g., near field communication or Bluetooth). For example, the watch body 6020 and the wearable band 6010 can share data sensed by the sensors 6013 and 6021, as well as application and device specific information (e.g., active and/or available applications, output devices (e.g., display and/or speakers), input devices (e.g., touch screen, microphone, and/or imaging sensors).

In some embodiments, the watch body 6020 can include, without limitation, a front-facing camera 6025A and/or a rear-facing camera 6025B, sensors 6021 (e.g., a biometric sensor, an IMU, a heart rate sensor, a saturated oxygen sensor, a neuromuscular signal sensor, an altimeter sensor, a temperature sensor, a bioimpedance sensor, a pedometer sensor, an optical sensor (e.g., imaging sensor 6063; FIG. 7B), a touch sensor, and/or a sweat sensor). In some embodiments, the watch body 6020 can include one or more haptic devices 6076 (FIG. 7B; a vibratory haptic actuator) that is configured to provide haptic feedback (e.g., a cutaneous and/or kinesthetic sensation) to the user. The sensors 6021 and/or the haptic device 6076 can also be configured to operate in conjunction with multiple applications including, without limitation, health monitoring applications, social media applications, game applications, and artificial reality applications (e.g., the applications associated with artificial reality).

As described above, the watch body 6020 and the wearable band 6010, when coupled, can form the wrist-wearable device 6000. When coupled, the watch body 6020 and wearable band 6010 operate as a single device to execute functions (operations, detections, and/or communications) described herein. In some embodiments, each device is provided with particular instructions for performing the one or more operations of the wrist-wearable device 6000. For example, in accordance with a determination that the watch body 6020 does not include neuromuscular signal sensors, the wearable band 6010 can include alternative instructions for performing associated instructions (e.g., providing sensed neuromuscular signal data to the watch body 6020 via a different electronic device). Operations of the wrist-wearable device 6000 can be performed by the watch body 6020 alone or in conjunction with the wearable band 6010 (e.g., via respective processors and/or hardware components) and vice versa. In some embodiments, operations of the wrist-wearable device 6000, the watch body 6020, and/or the wearable band 6010 can be performed in conjunction with one or more processors and/or hardware components of another communicatively coupled device (e.g., the HIPD 8000; FIGS. 9A-9B).

As described below with reference to the block diagram of FIG. 7B, the wearable band 6010 and/or the watch body 6020 can each include independent resources required to independently execute functions. For example, the wearable band 6010 and/or the watch body 6020 can each include a power source (e.g., a battery), a memory, data storage, a processor (e.g., a central processing unit (CPU)), communications, a light source, and/or input/output devices.

FIG. 7B shows block diagrams of a computing system 6030 corresponding to the wearable band 6010, and a computing system 6060 corresponding to the watch body 6020, according to some embodiments. A computing system of the wrist-wearable device 6000 includes a combination of components of the wearable band computing system 6030 and the watch body computing system 6060, in accordance with some embodiments.

The watch body 6020 and/or the wearable band 6010 can include one or more components shown in watch body computing system 6060. In some embodiments, a single integrated circuit includes all or a substantial portion of the components of the watch body computing system 6060 are included in a single integrated circuit. Alternatively, in some embodiments, components of the watch body computing system 6060 are included in a plurality of integrated circuits that are communicatively coupled. In some embodiments, the watch body computing system 6060 is configured to couple (e.g., via a wired or wireless connection) with the wearable band computing system 6030, which allows the computing systems to share components, distribute tasks, and/or perform other operations described herein (individually or as a single device).

The watch body computing system 6060 can include one or more processors 6079, a controller 6077, a peripherals interface 6061, a power system 6095, and memory (e.g., a memory 6080), each of which are defined above and described in more detail below.

The power system 6095 can include a charger input 6057, a power-management integrated circuit (PMIC) 6097, and a battery 6096, each are which are defined above. In some embodiments, a watch body 6020 and a wearable band 6010 can have respective batteries (e.g., battery 6098 and 6059), and can share power with each other. The watch body 6020 and the wearable band 6010 can receive a charge using a variety of techniques. In some embodiments, the watch body 6020 and the wearable band 6010 can use a wired charging assembly (e.g., power cords) to receive the charge. Alternatively, or in addition, the watch body 6020 and/or the wearable band 6010 can be configured for wireless charging. For example, a portable charging device can be designed to mate with a portion of watch body 6020 and/or wearable band 6010 and wirelessly deliver usable power to a battery of watch body 6020 and/or wearable band 6010. The watch body 6020 and the wearable band 6010 can have independent power systems (e.g., power system 6095 and 6056) to enable each to operate independently. The watch body 6020 and wearable band 6010 can also share power (e.g., one can charge the other) via respective PMICs (e.g., PMICs 6097 and 6058) that can share power over power and ground conductors and/or over wireless charging antennas.

In some embodiments, the peripherals interface 6061 can include one or more sensors 6021, many of which listed below are defined above. The sensors 6021 can include one or more coupling sensor 6062 for detecting when the watch body 6020 is coupled with another electronic device (e.g., a wearable band 6010). The sensors 6021 can include imaging sensors 6063 (one or more of the cameras 6025, and/or separate imaging sensors 6063 (e.g., thermal-imaging sensors)). In some embodiments, the sensors 6021 include one or more SpO2 sensors 6064. In some embodiments, the sensors 6021 include one or more biopotential-signal sensors (e.g., EMG sensors 6065 and 6035, which may be disposed on a user-facing portion of the watch body 6020 and/or the wearable band 6010). In some embodiments, the sensors 6021 include one or more capacitive sensors 6066. In some embodiments, the sensors 6021 include one or more heart rate sensors 6067. In some embodiments, the sensors 6021 include one or more IMU sensors 6068. In some embodiments, one or more IMU sensors 6068 can be configured to detect movement of a user's hand or other location that the watch body 6020 is placed or held).

In some embodiments, the peripherals interface 6061 includes a near-field communication (NFC) component 6069, a global-position system (GPS) component 6070, a long-term evolution (LTE) component 6071, and/or a Wi-Fi and/or Bluetooth communication component 6072. In some embodiments, the peripherals interface 6061 includes one or more buttons 6073 (e.g., the peripheral buttons 6023 and 6027 in FIG. 7A), which, when selected by a user, cause operation to be performed at the watch body 6020. In some embodiments, the peripherals interface 6061 includes one or more indicators, such as a light emitting diode (LED), to provide a user with visual indicators (e.g., message received, low battery, active microphone and/or camera).

The watch body 6020 can include at least one display 6005, for displaying visual representations of information or data to the user, including user-interface elements and/or three-dimensional virtual objects. The display can also include a touch screen for inputting user inputs, such as touch gestures, swipe gestures, and the like. The watch body 6020 can include at least one speaker 6074 and at least one microphone 6075 for providing audio signals to the user and receiving audio input from the user. The user can provide user inputs through the microphone 6075 and can also receive audio output from the speaker 6074 as part of a haptic event provided by the haptic controller 6078. The watch body 6020 can include at least one camera 6025, including a front camera 6025A and a rear camera 6025B. The cameras 6025 can include ultra-wide-angle cameras, wide angle cameras, fish-eye cameras, spherical cameras, telephoto cameras, a depth-sensing cameras, or other types of cameras.

The watch body computing system 6060 can include one or more haptic controllers 6077 and associated componentry (e.g., haptic devices 6076) for providing haptic events at the watch body 6020 (e.g., a vibrating sensation or audio output in response to an event at the watch body 6020). The haptic controllers 6078 can communicate with one or more haptic devices 6076, such as electroacoustic devices, including a speaker of the one or more speakers 6074 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 6078 can provide haptic events to that are capable of being sensed by a user of the watch body 6020. In some embodiments, the one or more haptic controllers 6078 can receive input signals from an application of the applications 6082.

In some embodiments, the computing system 6030 and/or the computing system 6060 can include memory 6080, which can be controlled by a memory controller of the one or more controllers 6077. In some embodiments, software components stored in the memory 6080 include one or more applications 6082 configured to perform operations at the watch body 6020. In some embodiments, the one or more applications 6082 include games, word processors, messaging applications, calling applications, web browsers, social media applications, media streaming applications, financial applications, calendars, and/or clocks. In some embodiments, software components stored in the memory 6080 include one or more communication interface modules 6083 as defined above. In some embodiments, software components stored in the memory 6080 include one or more graphics modules 6084 for rendering, encoding, and/or decoding audio and/or visual data; and one or more data management modules 6085 for collecting, organizing, and/or providing access to the data 6087 stored in memory 6080. In some embodiments, one or more of applications 6082 and/or one or more modules can work in conjunction with one another to perform various tasks at the watch body 6020.

In some embodiments, software components stored in the memory 6080 can include one or more operating systems 6081 (e.g., a Linux-based operating system or an Android operating system). The memory 6080 can also include data 6087. The data 6087 can include profile data 6088A, sensor data 6089A, media content data 6090, and application data 6091.

It should be appreciated that the watch body computing system 6060 is an example of a computing system within the watch body 6020, and that the watch body 6020 can have more or fewer components than shown in the watch body computing system 6060, combine two or more components, and/or have a different configuration and/or arrangement of the components. The various components shown in watch body computing system 6060 are implemented in hardware, software, firmware, or a combination thereof, including one or more signal processing and/or application-specific integrated circuits.

Turning to the wearable band computing system 6030, one or more components that can be included in the wearable band 6010 are shown. The wearable band computing system 6030 can include more or fewer components than shown in the watch body computing system 6060, combine two or more components, and/or have a different configuration and/or arrangement of some or all of the components. In some embodiments, all, or a substantial portion of the components of the wearable band computing system 6030 are included in a single integrated circuit. Alternatively, in some embodiments, components of the wearable band computing system 6030 are included in a plurality of integrated circuits that are communicatively coupled. As described above, in some embodiments, the wearable band computing system 6030 is configured to couple (e.g., via a wired or wireless connection) with the watch body computing system 6060, which allows the computing systems to share components, distribute tasks, and/or perform other operations described herein (individually or as a single device).

The wearable band computing system 6030, similar to the watch body computing system 6060, can include one or more processors 6049, one or more controllers 6047 (including one or more haptics controller 6048), a peripherals interface 6031 that can includes one or more sensors 6013 and other peripheral devices, power source (e.g., a power system 6056), and memory (e.g., a memory 6050) that includes an operating system (e.g., an operating system 6051), data (e.g., data 6054 including profile data 6088B and/or sensor data 6089B), and one or more modules (e.g., a communications interface module 6052 and/or a data management module 6053).

The one or more sensors 6013 can be analogous to sensors 6021 of the computing system 6060 and in light of the definitions above. For example, sensors 6013 can include one or more coupling sensors 6032, one or more SpO2 sensor 6034, one or more EMG sensors 6035, one or more capacitive sensor 6036, one or more heart rate sensor 6037, and one or more IMU sensor 6038.

The peripherals interface 6031 can also include other components analogous to those included in the peripheral interface 6061 of the computing system 6060, including an NFC component 6039, a GPS component 6040, an LTE component 6041, a Wi-Fi and/or Bluetooth communication component 6042, and/or one or more haptic devices 6076 as described above in reference to peripherals interface 6061. In some embodiments, the peripherals interface 6061 includes one or more buttons 6043, a display 6033, a speaker 6044, a microphone 6045, and a camera 6055. In some embodiments, the peripherals interface 6061 includes one or more indicators, such as an LED.

It should be appreciated that the wearable band computing system 6030 is an example of a computing system within the wearable band 6010, and that the wearable band 6010 can have more or fewer components than shown in the wearable band computing system 6030, combine two or more components, and/or have a different configuration and/or arrangement of the components. The various components shown in wearable band computing system 6030 can be implemented in one or a combination of hardware, software, firmware, including one or more signal processing and/or application-specific integrated circuits.

The wrist-wearable device 6000 with respect to FIG. 7A is an example of the wearable band 6010 and the watch body 6020 coupled, so the wrist-wearable device 6000 will be understood to include the components shown and described for the wearable band computing system 6030 and the watch body computing system 6060. In some embodiments, wrist-wearable device 6000 has a split architecture (e.g., a split mechanical architecture, a split electrical architecture) between the watch body 6020 and the wearable band 6010. In other words, all of the components shown in the wearable band computing system 6030 and the watch body computing system 6060 can be housed or otherwise disposed in a combined watch device 6000, or within individual components of the watch body 6020, wearable band 6010, and/or portions thereof (e.g., a coupling mechanism 6016 of the wearable band 6010).

The techniques described above can be used with any device for sensing neuromuscular signals, including the arm-wearable devices of FIG. 7A-7B, but could also be used with other types of wearable devices for sensing neuromuscular signals (such as body-wearable or head-wearable devices that might have neuromuscular sensors closer to the brain or spinal column).

In some embodiments, a wrist-wearable device 6000 can be used in conjunction with a head-wearable device described below (e.g., AR system 7000 and VR headset 7010) and/or an HIPD 8000; and the wrist-wearable device 6000 can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). In some embodiments, a wrist-wearable device 6000 can also be used in conjunction with a wearable garment, such as the wearable gloves described below in reference to FIGS. 10A-10C. Having thus described example wrist-wearable device, attention will now be turned to example head-wearable devices, such AR system 7000 and VR headset 7010.

Example Head-Wearable Devices

Figure 8A:
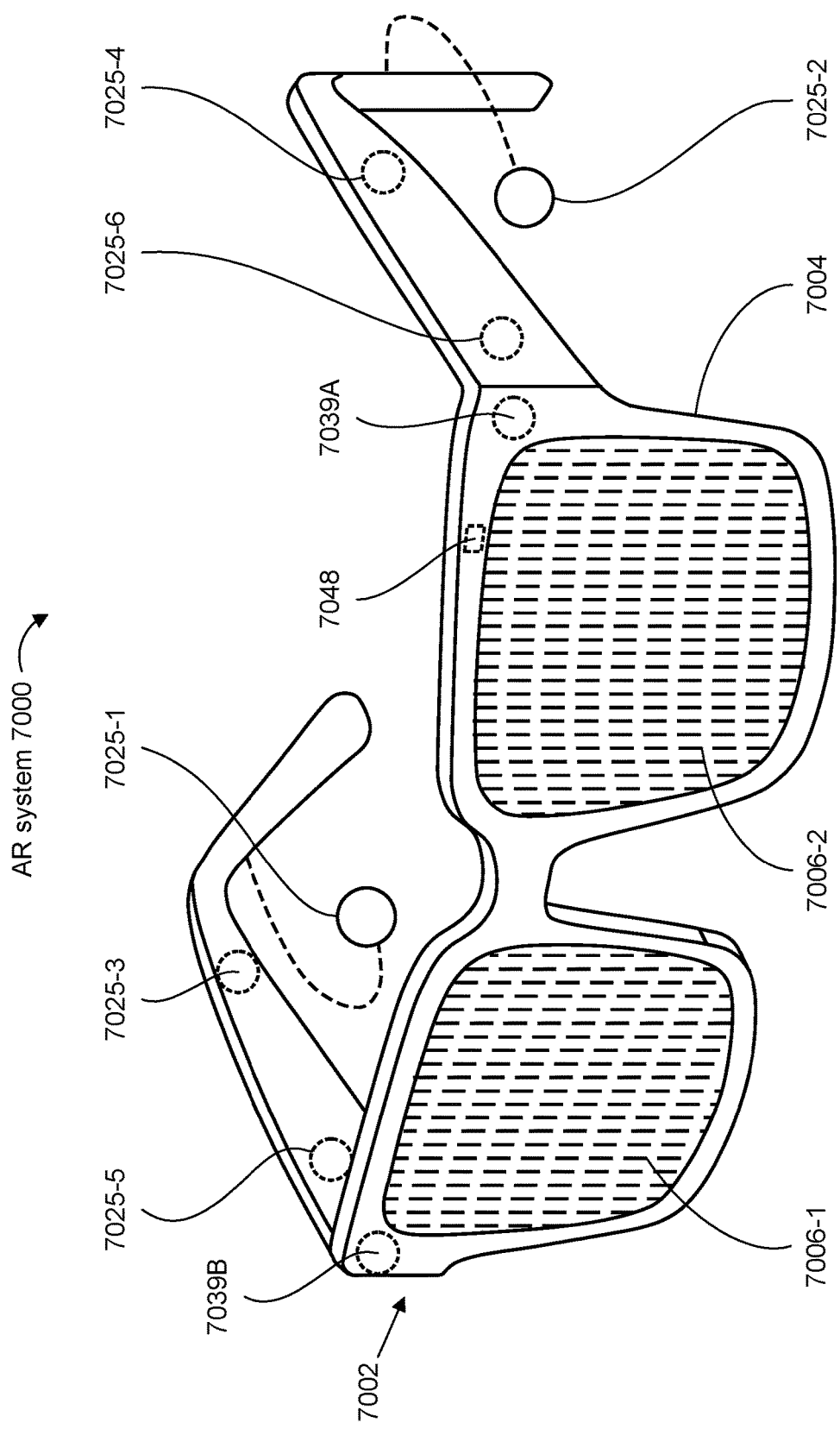
Figures 1, 8B:
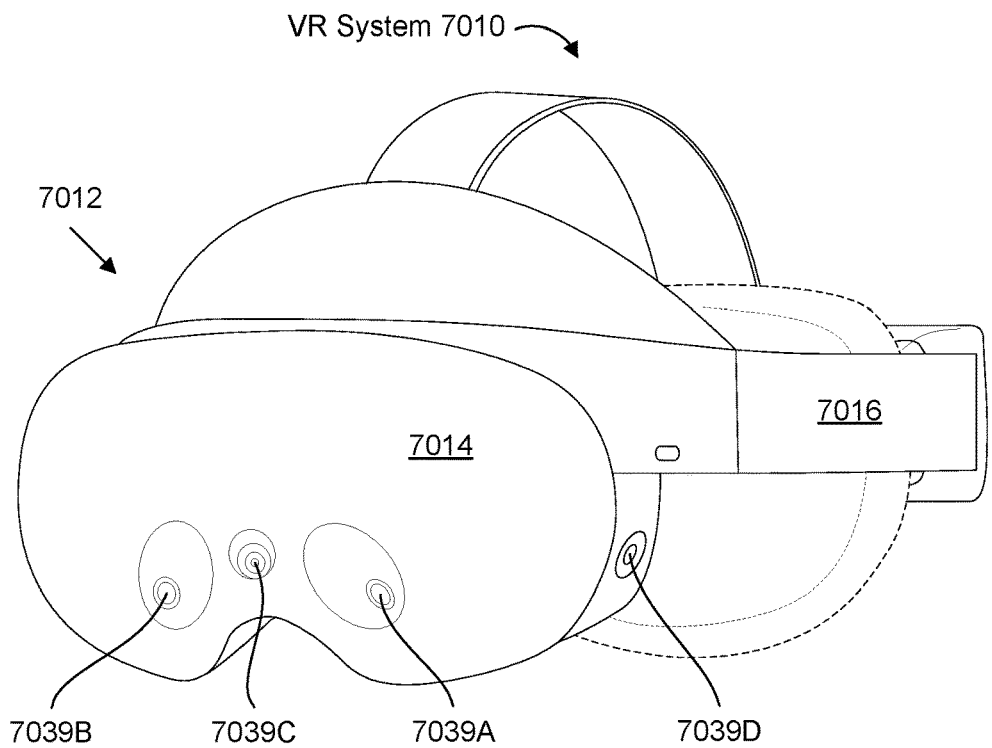
Figures 2, 8B:
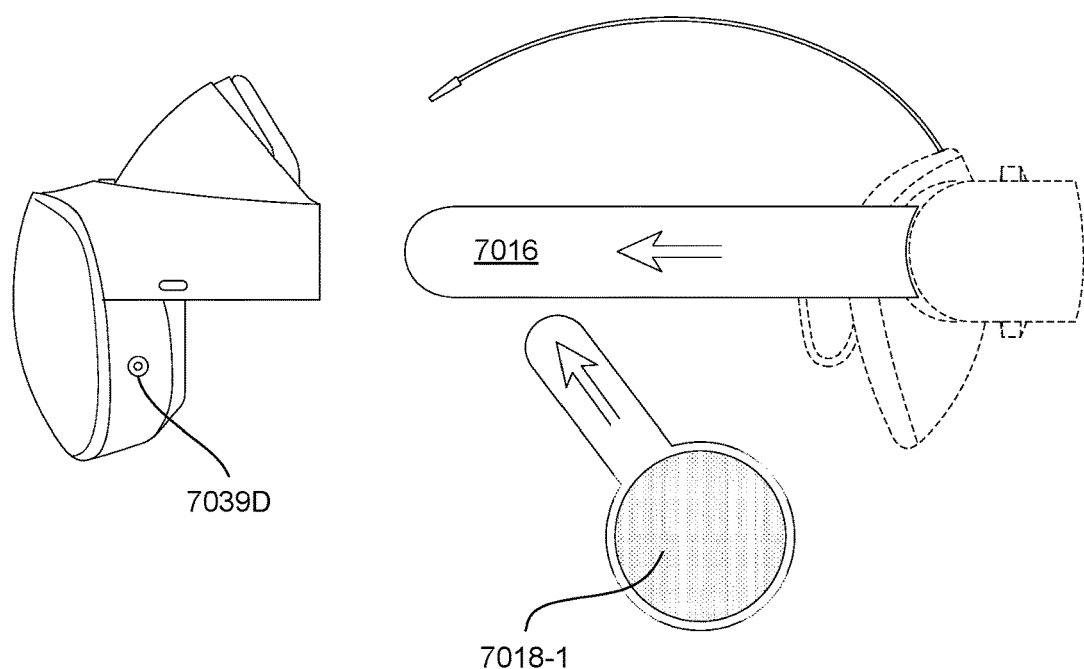
Figure 8C:
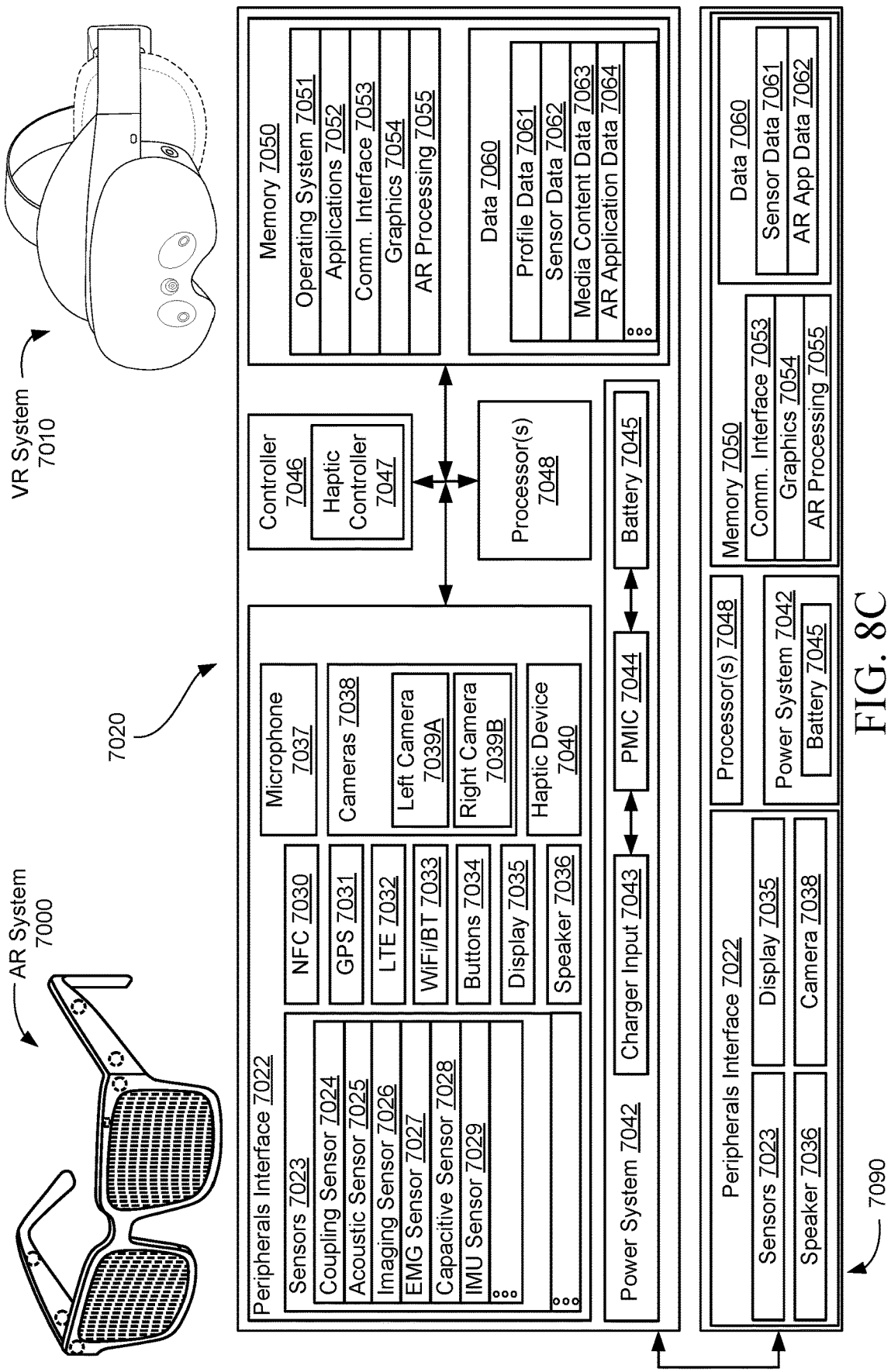

FIGS. 8A to 8C show example artificial-reality systems, including the AR system 7000. In some embodiments, the AR system 7000 is an eyewear device as shown in FIG. 8A. In some embodiments, the VR system 7010 includes a head-mounted display (HMD) 7012, as shown in FIGS. 8B-1 and 8B-2. In some embodiments, the AR system 7000 and the VR system 7010 include one or more analogous components (e.g., components for presenting interactive artificial-reality environments, such as processors, memory, and/or presentation devices, including one or more displays and/or one or more waveguides), some of which are described in more detail with respect to FIG. 8C. As described herein, a head-wearable device can include components of the eyewear device 7002, and/or the head-mounted display 7012. Some embodiments of head-wearable devices do not include any displays, including any of the displays described with respect to the AR system 7000 and/or the VR system 7010. While the example artificial-reality systems are respectively described herein as the AR system 7000 and the VR system 7010, either or both of the example AR systems described herein can be configured to present fully-immersive VR scenes presented in substantially all of a user's field of view, additionally or alternatively to, subtler augmented-reality scenes that are presented within a portion, less than all, of the user's field of view.

FIG. 8A show an example visual depiction of the AR system 7000 (which may also be described herein as augmented-reality glasses, and/or smart glasses). The AR system 7000 can include additional electronic components that are not shown in FIGS. 8A, such as a wearable accessory device and/or an intermediary processing device, in electronic communication or otherwise configured to be used in conjunction with the eyewear device. In some embodiments, the wearable accessory device and/or the intermediary processing device may be configured to couple with the eyewear device via a coupling mechanism in electronic communication with a coupling sensor 7024, where the coupling sensor 7024 can detect when an electronic device becomes physically or electronically coupled with the eyewear device. In some embodiments, the eyewear device is configured to couple to a housing 7090, which may include one or more additional coupling mechanisms configured to couple with additional accessory devices. The components shown in FIG. 8A can be implemented in hardware, software, firmware, or a combination thereof, including one or more signal-processing components and/or application-specific integrated circuits (ASICs).

The eyewear device includes mechanical glasses components, including a frame 7004 configured to hold one or more lenses (e.g., one or both lenses 7006-1 and 7006-2). One of ordinary skill in the art will appreciate that the eyewear device can include additional mechanical components, such as hinges configured to allow portions of the frame 7004 of the eyewear device 7002 to be folded and unfolded, a bridge configured to span the gap between the lenses 7006-1 and 7006-2 and rest on the user's nose, nose pads configured to rest on the bridge of the nose and provide support for the eyewear device, earpieces configured to rest on the user's ears and provide additional support for the eyewear device, temple arms configured to extend from the hinges to the earpieces of the eyewear device, and the like. One of ordinary skill in the art will further appreciate that some examples of the AR system 7000 can include none of the mechanical components described herein. For example, smart contact lenses configured to present artificial reality to users may not include any components of the eyewear device.

The eyewear device includes electronic components, many of which will be described in more detail below with respect to FIG. 8C. Some example electronic components are illustrated in FIG. 8A, including acoustic sensors 7025-1, 7025-2, 7025-3, 7025-4, 7025-5, and 7025-1, which can be distributed along a substantial portion of the frame 7004 of the eyewear device. The eyewear device also includes a left camera 7039A and a right camera 7039B, which are located on different sides of the frame 7004. And the eyewear device includes a processor 7048 (e.g., an integral microprocessor, such as an ASIC) that is embedded into a portion of the frame 7004.

FIGS. 8B-1 and 8B-2 show a VR system 7010 that includes a head-mounted display (HMD) 7012 (e.g., also referred to herein as an artificial-reality headset, a head-wearable device, or a VR headset), in accordance with some embodiments. As noted, some artificial-reality systems may (e.g., the AR system 7000), instead of blending an artificial reality with actual reality, substantially replace one or more of a user's sensory perceptions of the real world with a virtual experience (e.g., the AR systems 5000c and 5000d).

The HMD 7012 includes a front body 7014 and a frame 7016 (e.g., a strap or band) shaped to fit around a user's head. In some embodiments, the front body 7014 and/or the frame 7016 includes one or more electronic elements for facilitating presentation of and/or interactions with an AR and/or VR system (e.g., displays, IMUs, tracking emitter or detectors). In some embodiments, the HMD 7012 includes output audio transducers (e.g., an audio transducer 7018-1), as shown in FIG. 8B-2. In some embodiments, one or more components, such as the output audio transducer(s) 7018-1 and the frame 7016, can be configured to attach and detach (e.g., are detachably attachable) to the HMD 7012 (e.g., a portion or all of the frame 7016, and/or the audio transducer 7018-1), as shown in FIG. 8B-2. In some embodiments, coupling a detachable component to the HMD 7012 causes the detachable component to come into electronic communication with the HMD 7012.

FIGS. 8B-1 to 8B-2 also show that the VR system 7010 includes one or more cameras, such as the left camera 7039A and the right camera 7039B, which can be analogous to the left and right cameras on the frame 7004 of the eyewear device 7002. In some embodiments, the VR system 7010 includes one or more additional cameras (e.g., cameras 7039C and 7039D), which can be configured to augment image data obtained by the cameras 7039A and 7039B by providing more information. For example, the camera 7039C can be used to supply color information that is not discerned by cameras 7039A and 7039B. In some embodiments, one or more of the cameras 7039A to 7039D can include an optional IR cut filter configured to remove IR light from being received at the respective camera sensors.

FIG. 8C illustrates a computing system 7020 and an optional housing 7090, each of which show components that can be included in the AR system 7000 and/or the VR system 7010. In some embodiments, more or less components can be included in the optional housing 7090 depending on practical restraints of the respective AR system being described.

In some embodiments, the computing system 7020 and/or the optional housing 7090 can include one or more peripheral interfaces 7022, one or more power systems 7042, one or more controllers 7046 (including one or more haptic controllers 7047), one or more processors 7048 (as defined above, including any of the examples provided), and memory 7050, which can all be in electronic communication with each other. For example, the one or more processors 7048 can be configured to execute instructions stored in the memory 7050, which can cause a controller of the one or more controllers 7046 to cause operations to be performed at one or more peripheral devices of the peripherals interface 7022. In some embodiments, each operation described can occur based on electrical power provided by the power system 7042.

In some embodiments, the peripherals interface 7022 can include one or more devices configured to be part of the computing system 7020, many of which have been defined above and/or described with respect to wrist-wearable devices shown in FIGS. 7A and 7B. For example, the peripherals interface can include one or more sensors 7023. Some example sensors include: one or more coupling sensors 7024, one or more acoustic sensors 7025, one or more imaging sensors 7026, one or more EMG sensors 7027, one or more capacitive sensors 7028, and/or one or more IMU sensors 7029; and/or any other types of sensors defined above or described with respect to any other embodiments discussed herein.

In some embodiments, the peripherals interface can include one or more additional peripheral devices, including one or more NFC devices 7030, one or more GPS devices 7031, one or more LTE devices 7032, one or more Wi-Fi and/or Bluetooth devices 7033, one or more buttons 7034 (e.g., including buttons that are slidable or otherwise adjustable), one or more displays 7035, one or more speakers 7036, one or more microphones 7037, one or more cameras 7038 (e.g., including the left camera 7039A and/or a right camera 7039B), and/or one or more haptic devices 7040; and/or any other types of peripheral devices defined above or described with respect to any other embodiments discussed herein.

AR systems can include a variety of types of visual feedback mechanisms (e.g., presentation devices). For example, display devices in the AR system 7000 and/or the VR system 7010 can include one or more liquid-crystal displays (LCDs), light emitting diode (LED) displays, organic LED (OLED) displays, and/or any other suitable types of display screens. Artificial-reality systems can include a single display screen (e.g., configured to be seen by both eyes), and/or can provide separate display screens for each eye, which can allow for additional flexibility for varifocal adjustments and/or for correcting a refractive error associated with the user's vision. Some embodiments of AR systems also include optical subsystems having one or more lenses (e.g., conventional concave or convex lenses, Fresnel lenses, or adjustable liquid lenses) through which a user can view a display screen.

For example, respective displays can be coupled to each of the lenses 7006-1 and 7006-2 of the AR system 7000. The displays coupled to each of the lenses 7006-1 and 7006-2 can act together or independently to present an image or series of images to a user. In some embodiments, the AR system 7000 includes a single display (e.g., a near-eye display) or more than two displays. In some embodiments, a first set of one or more displays can be used to present an augmented-reality environment, and a second set of one or more display devices can be used to present a virtual-reality environment. In some embodiments, one or more waveguides are used in conjunction with presenting artificial-reality content to the user of the AR system 7000 (e.g., as a means of delivering light from one or more displays to the user's eyes). In some embodiments, one or more waveguides are fully or partially integrated into the eyewear device 7002. Additionally, or alternatively to display screens, some artificial-reality systems include one or more projection systems. For example, display devices in the AR system 7000 and/or the virtual-reality system 7010 can include micro-LED projectors that project light (e.g., using a waveguide) into display devices, such as clear combiner lenses that allow ambient light to pass through. The display devices can refract the projected light toward a user's pupil and can enable a user to simultaneously view both artificial-reality content and the real world. Artificial-reality systems can also be configured with any other suitable type or form of image projection system. In some embodiments, one or more waveguides are provided additionally or alternatively to the one or more display(s).

The computing system 7020 and/or the optional housing 7090 of the AR system 7000 or the VR system 7010 can include some or all of the components of a power system 7042. The power system 7042 can include one or more charger inputs 7043, one or more PMICs 7044, and/or one or more batteries 7045.

The memory 7050 includes instructions and data, some or all of which may be stored as non-transitory computer-readable storage media within the memory 7050. For example, the memory 7050 can include one or more operating systems 7051; one or more applications 7052; one or more communication interface applications 7053; one or more graphics applications 7054; one or more AR processing applications 7055; and/or any other types of data defined above or described with respect to any other embodiments discussed herein.

The memory 7050 also includes data 7060 which can be used in conjunction with one or more of the applications discussed above. The data 7060 can include: profile data 7061; sensor data 7062; media content data 7063; AR application data 7064; and/or any other types of data defined above or described with respect to any other embodiments discussed herein.

In some embodiments, the controller 7046 of the eyewear device 7002 processes information generated by the sensors 7023 on the eyewear device 7002 and/or another electronic device within the AR system 7000. For example, the controller 7046 can process information from the acoustic sensors 7025-1 and 7025-2. For each detected sound, the controller 7046 can perform a direction of arrival (DOA) estimation to estimate a direction from which the detected sound arrived at the eyewear device 7002 of the AR system 7000. As one or more of the acoustic sensors 7025 detects sounds, the controller 7046 can populate an audio data set with the information (e.g., represented in FIG. 8C as sensor data 7062).

In some embodiments, a physical electronic connector can convey information between the eyewear device and another electronic device, and/or between one or more processors of the AR system 7000 or the VR system 7010 and the controller 7046. The information can be in the form of optical data, electrical data, wireless data, or any other transmittable data form. Moving the processing of information generated by the eyewear device to an intermediary processing device can reduce weight and heat in the eyewear device, making it more comfortable and safer for a user. In some embodiments, an optional wearable accessory device (e.g., an electronic neckband) is coupled to the eyewear device via one or more connectors. The connectors can be wired or wireless connectors and can include electrical and/or non-electrical (e.g., structural) components. In some embodiments, the eyewear device and the wearable accessory device can operate independently without any wired or wireless connection between them.

In some situations, pairing external devices, such as an intermediary processing device (e.g., the HIPD 8000) with the eyewear device 7002 (e.g., as part of the AR system 7000) enables the eyewear device 7002 to achieve a similar form factor of a pair of glasses while still providing sufficient battery and computation power for expanded capabilities. Some, or all, of the battery power, computational resources, and/or additional features of the AR system 7000 can be provided by a paired device or shared between a paired device and the eyewear device 7002, thus reducing the weight, heat profile, and form factor of the eyewear device 7002 overall while allowing the eyewear device 7002 to retain its desired functionality. For example, the wearable accessory device can allow components that would otherwise be included on an eyewear device 7002 to be included in the wearable accessory device and/or intermediary processing device, thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computation capacity than might otherwise have been possible on the eyewear device 7002, standing alone. Because weight carried in the wearable accessory device can be less invasive to a user than weight carried in the eyewear device 7002, a user may tolerate wearing a lighter eyewear device and carrying or wearing the paired device for greater lengths of time than the user would tolerate wearing a heavier eyewear device standing alone, thereby enabling an artificial-reality environment to be incorporated more fully into a user's day-to-day activities.

AR systems can include various types of computer vision components and subsystems. For example, the AR system 7000 and/or the VR system 7010 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An AR system can process data from one or more of these sensors to identify a location of a user and/or aspects of the use's real-world physical surroundings, including the locations of real-world objects within the real-world physical surroundings. In some embodiments, the methods described herein are used to map the real world, to provide a user with context about real-world surroundings, and/or to generate digital twins (e.g., interactable virtual objects), among a variety of other functions. For example, FIGS. 8B-1 and 8B-2 show the VR system 7010 having cameras 7039A to 7039D, which can be used to provide depth information for creating a voxel field and a two-dimensional mesh to provide object information to the user to avoid collisions.

In some embodiments, the AR system 7000 and/or the VR system 7010 can include haptic (tactile) feedback systems, which may be incorporated into headwear, gloves, body suits, handheld controllers, environmental devices (e.g., chairs or floormats), and/or any other type of device or system, such as the wearable devices discussed herein. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback may be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices (e.g., the haptic feedback system described with respect to FIGS. 10A to 10C).

In some embodiments of an AR system, such as the AR system 7000 and/or the VR system 7010, ambient light (e.g., a live feed of the surrounding environment that a user would normally see) can be passed through a display element of a respective head-wearable device presenting aspects of the AR system. In some embodiments, ambient light can be passed through a portion less than all, of an AR environment presented within a user's field of view (e.g., a portion of the AR environment co-located with a physical object in the user's real-world environment that is within a designated boundary (e.g., a guardian boundary) configured to be used by the user while they are interacting with the AR environment. For example, a visual user interface element (e.g., a notification user interface element) can be presented at the head-wearable device, and an amount of ambient light (e.g., 15-50% of the ambient light) can be passed through the user interface element, such that the user can distinguish at least a portion of the physical environment over which the user interface element is being displayed.

Example Handheld Intermediary Processing Devices

Figure 9A:
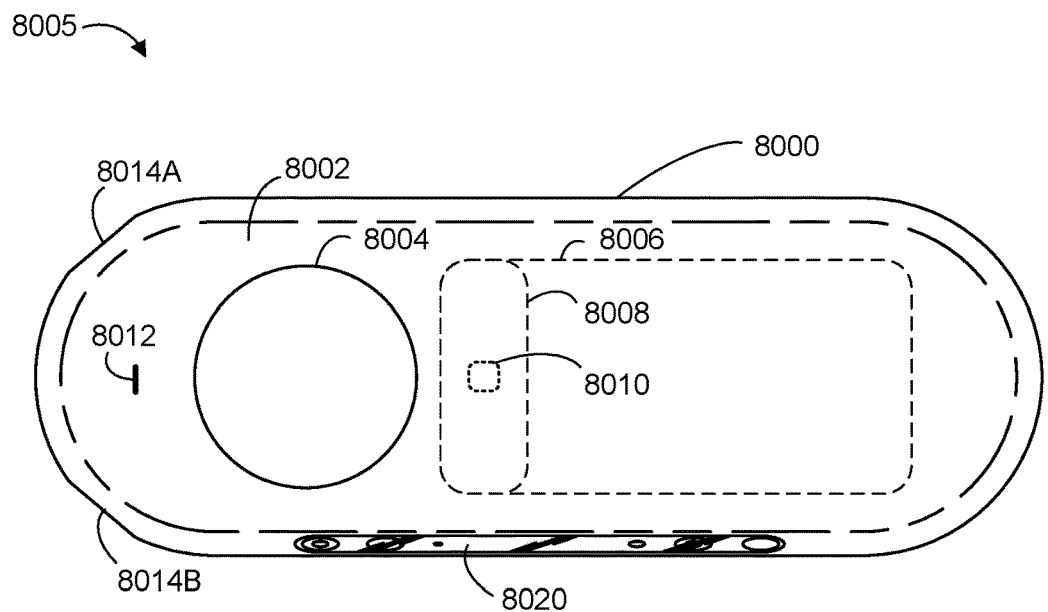
FIGS. 9A-9B illustrate an example handheld device in accordance with some embodiments.
Figure 9A:
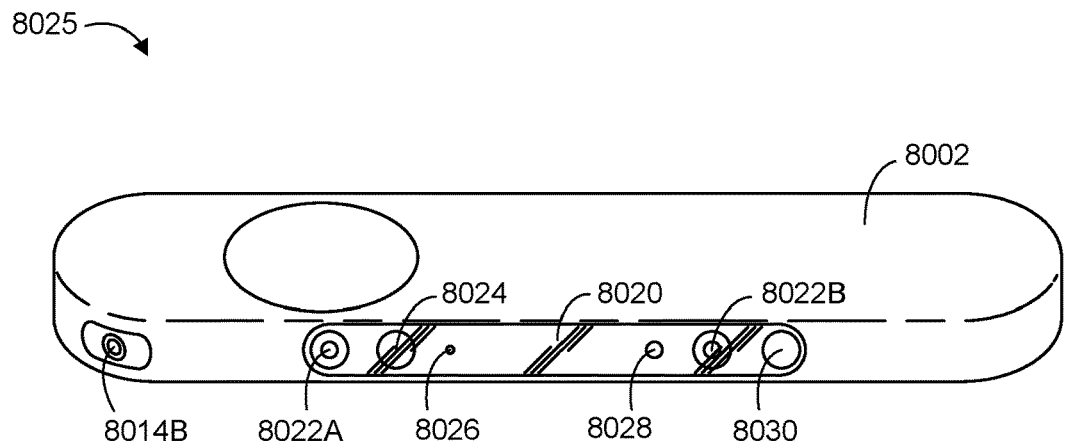
Figure 9B:
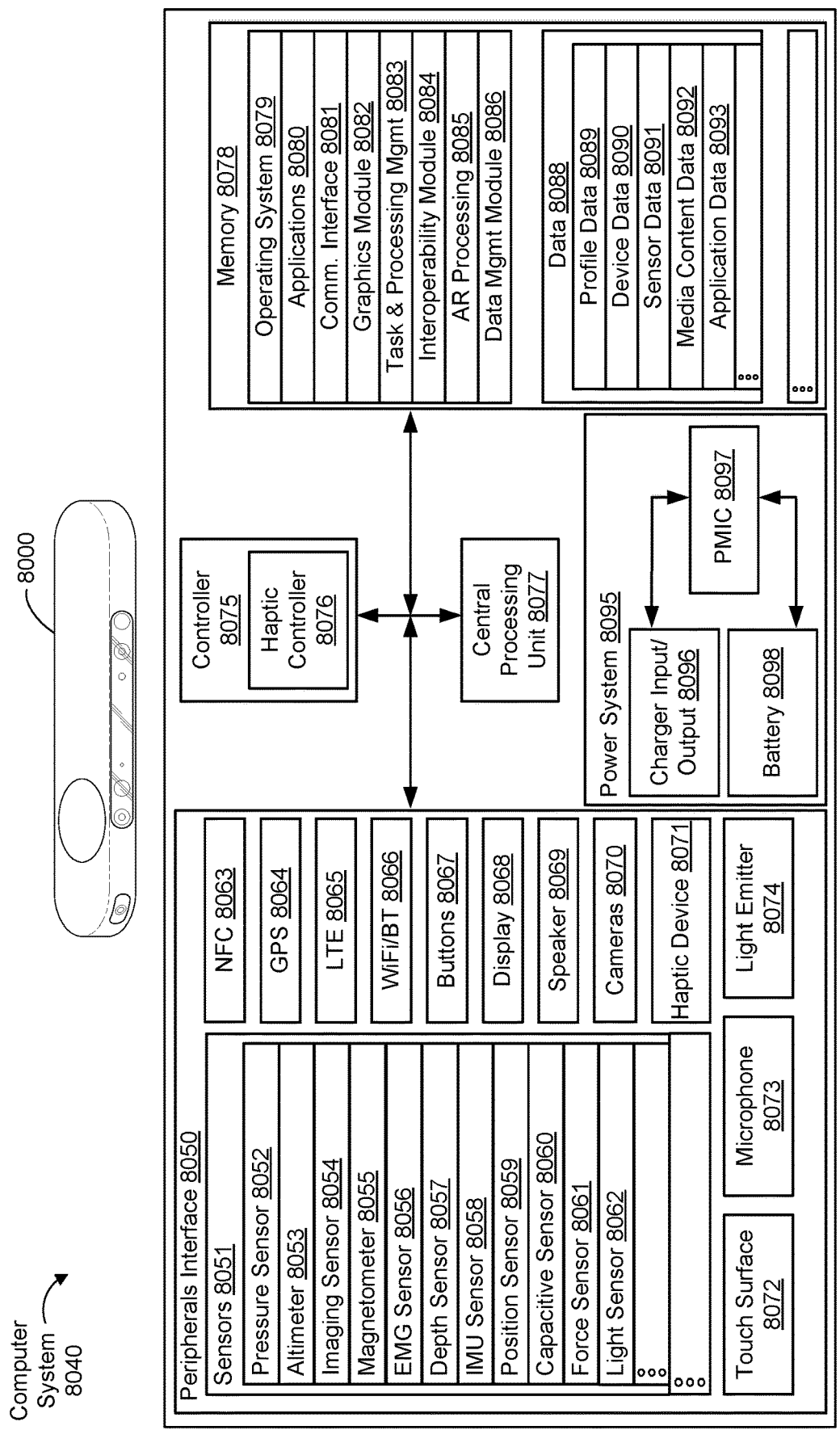

FIGS. 9A and 9B illustrate an example handheld intermediary processing device (HIPD) 8000, in accordance with some embodiments. The HIPD 8000 is an instance of the intermediary device described herein, such that the HIPD 8000 should be understood to have the features described with respect to any intermediary device defined above or otherwise described herein, and vice versa. FIG. 9A shows a top view 8005 and a side view 8025 of the HIPD 8000. The HIPD 8000 is configured to communicatively couple with one or more wearable devices (or other electronic devices) associated with a user. For example, the HIPD 8000 is configured to communicatively couple with a user's wrist-wearable device 6000 (or components thereof, such as the watch body 6020 and the wearable band 6010), AR system 7000, and/or VR headset 7010. The HIPD 8000 can be configured to be held by a user (e.g., as a handheld controller), carried on the user's person (e.g., in their pocket or in their bag), placed in proximity of the user (e.g., placed on their desk while seated at their desk or on a charging dock), and/or placed at or within a predetermined distance from a wearable device or other electronic device (e.g., where, in some embodiments, the predetermined distance is the maximum distance (e.g., 10 meters) at which the HIPD 8000 can successfully be communicatively coupled with an electronic device, such as a wearable device).

The HIPD 8000 can perform various functions independently and/or in conjunction with one or more wearable devices (e.g., wrist-wearable device 6000, AR system 7000, and/or VR headset 7010). The HIPD 8000 is configured to increase and/or improve the functionality of communicatively coupled devices, such as the wearable devices. The HIPD 8000 is configured to perform one or more functions or operations associated with interacting with user interfaces and applications of communicatively coupled devices, interacting with an AR environment, interacting with VR environment, and/or operating as a human-machine interface controller. Additionally, as will be described in more detail below, functionality and/or operations of the HIPD 8000 can include, without limitation, task offloading and/or handoffs; thermals offloading and/or handoffs; 6 degrees of freedom (6 DoF) raycasting and/or gaming (e.g., using imaging devices or cameras 8014, which can be used for simultaneous localization and mapping (SLAM) and/or with other image processing techniques); portable charging; messaging; image capturing via one or more imaging devices or cameras 8022; sensing user input (e.g., sensing a touch on a touch input surface 8002); wireless communications and/or interlining (e.g., cellular, near field, Wi-Fi, or personal area network); location determination; financial transactions; providing haptic feedback; alarms; notifications; biometric authentication; health monitoring; and sleep monitoring. The above-example functions can be executed independently in the HIPD 8000 and/or in communication between the HIPD 8000 and another wearable device described herein. In some embodiments, functions can be executed on the HIPD 8000 in conjunction with an AR environment. As the skilled artisan will appreciate upon reading the descriptions provided herein, the novel the HIPD 8000 described herein can be used with any type of suitable AR environment.

While the HIPD 8000 is communicatively coupled with a wearable device and/or other electronic device, the HIPD 8000 is configured to perform one or more operations initiated at the wearable device and/or the other electronic device. In particular, one or more operations of the wearable device and/or the other electronic device can be offloaded to the HIPD 8000 to be performed. The HIPD 8000 performs the one or more operations of the wearable device and/or the other electronic device and provides to data corresponded to the completed operations to the wearable device and/or the other electronic device. For example, a user can initiate a video stream using AR system 7000 and back-end tasks associated with performing the video stream (e.g., video rendering) can be offloaded to the HIPD 8000, which the HIPD 8000 performs and provides corresponding data to the AR system 7000 to perform remaining front-end tasks associated with the video stream (e.g., presenting the rendered video data via a display of the AR system 7000). In this way, the HIPD 8000, which has more computational resources and greater thermal headroom than a wearable device, can perform computationally intensive tasks for the wearable device improving performance of an operation performed by the wearable device.

The HIPD 8000 includes a multi-touch input surface 8002 on a first side (e.g., a front surface) that is configured to detect one or more user inputs. In particular, the multi-touch input surface 8002 can detect single tap inputs, multi-tap inputs, swipe gestures and/or inputs, force-based and/or pressure-based touch inputs, held taps, and the like. The multi-touch input surface 8002 is configured to detect capacitive touch inputs and/or force (and/or pressure) touch inputs. The multi-touch input surface 8002 includes a touch-input surface 8004 defined by a surface depression, and a touch-input zone 8006 defined by a substantially planar portion. The touch-input surface 8004 can be disposed adjacent to the touch-input zone 8006. In some embodiments, the touch-input surface 8004 and the touch-input zone 8006 can be different dimensions, shapes, and/or cover different portions of the multi-touch input surface 8002. For example, the touch-input surface 8004 can be substantially circular and the touch-input zone 8006 is substantially rectangular. In some embodiments, the surface depression of the multi-touch input surface 8002 is configured to guide user handling of the HIPD 8000. In particular, the surface depression is configured such that the user holds the HIPD 8000 upright when held in a single hand (e.g., such that the using imaging devices or cameras 8014A and 8014B are pointed toward a ceiling or the sky). Additionally, the surface depression is configured such that the user's thumb rests within the touch-input surface 8004.

In some embodiments, the different touch-input surfaces include a plurality of touch-input zones. For example, the touch-input zone 8006 includes at least a touch-input zone 8008 within a touch-input zone 8006 and a touch-input zone 8010 within the touch-input zone 8008. In some embodiments, one or more of the touch-input zones are optional and/or user defined (e.g., a user can specific a touch-input zone based on their preferences). In some embodiments, each touch-input surface and/or touch-input zone is associated with a predetermined set of commands. For example, a user input detected within the touch-input zone 8008 causes the HIPD 8000 to perform a first command and a user input detected within the touch-input zone 8006 causes the HIPD 8000 to perform a second command, distinct from the first.

In some embodiments, different touch-input surfaces and/or touch-input zones are configured to detect one or more types of user inputs. The different touch-input surfaces and/or touch-input zones can be configured to detect the same or distinct types of user inputs. For example, the touch-input zone 8008 can be configured to detect force touch inputs (e.g., a magnitude at which the user presses down) and capacitive touch inputs, and the touch-input zone 8006 can be configured to detect capacitive touch inputs.

The HIPD 8000 includes one or more sensors 8051 for sensing data used in the performance of one or more operations and/or functions. For example, the HIPD 8000 can include an IMU sensor that is used in conjunction with cameras 8014 for 3-dimensional object manipulation (e.g., enlarging, moving, or destroying an object) in an AR or VR environment. Non-limiting examples of the sensors 8051 included in the HIPD 8000 include a light sensor, a magnetometer, a depth sensor, a pressure sensor, and a force sensor. Additional examples of the sensors 8051 are provided below in reference to FIG. 9B.

The HIPD 8000 can include one or more light indicators 8012 to provide one or more notifications to the user. In some embodiments, the light indicators are LEDs or other types of illumination devices. The light indicators 8012 can operate as a privacy light to notify the user and/or others near the user that an imaging device and/or microphone are active. In some embodiments, a light indicator is positioned adjacent to one or more touch-input surfaces. For example, a light indicator can be positioned around the touch-input surface 8004. The light indicators can be illuminated in different colors and/or patterns to provide the user with one or more notifications and/or information about the device. For example, a light indicator positioned around the touch-input surface 8004 can flash when the user receives a notification (e.g., a message), change to red when the HIPD 8000 is out of power, operate as a progress bar (e.g., a light ring that is closed when a task is completed (e.g., 0% to 100%)), or operate as a volume indicator).

In some embodiments, the HIPD 8000 includes one or more additional sensors on another surface. For example, as shown FIG. 9A, HIPD 8000 includes a set of one or more sensors (e.g., sensor set 8020) on an edge of the HIPD 8000. The sensor set 8020, when positioned on an edge of the of the HIPD 8000, can be pe positioned at a predetermined tilt angle (e.g., 26 degrees), which allows the sensor set 8020 to be angled toward the user when placed on a desk or other flat surface. Alternatively, in some embodiments, the sensor set 8020 is positioned on a surface opposite the multi-touch input surface 8002 (e.g., a back surface). The one or more sensors of the sensor set 8020 are discussed in detail below.

The side view 8025 of the of the HIPD 8000 shows the sensor set 8020 and camera 8014B. The sensor set 8020 includes one or more cameras 8022A and 8022B, a depth projector 8024, an ambient light sensor 8028, and a depth receiver 8030. In some embodiments, the sensor set 8020 includes a light indicator 8026. The light indicator 8026 can operate as a privacy indicator to let the user and/or those around them know that a camera and/or microphone is active. The sensor set 8020 is configured to capture a user's facial expression such that the user can puppet a custom avatar (e.g., showing emotions, such as smiles and/or laughter on the avatar or a digital representation of the user). The sensor set 8020 can be configured as a side stereo RGB system, a rear indirect Time-of-Flight (iToF) system, or a rear stereo RGB system. As the skilled artisan will appreciate upon reading the descriptions provided herein, the HIPD 8000 described herein can use different sensor set 8020 configurations and/or sensor set 8020 placements.

In some embodiments, the HIPD 8000 includes one or more haptic devices 8071 (e.g., a vibratory haptic actuator) that are configured to provide haptic feedback (e.g., kinesthetic sensation). The sensors 8051, and/or the haptic devices 8071 can be configured to operate in conjunction with multiple applications and/or communicatively coupled devices including, without limitation, wearable devices, health monitoring applications, social media applications, game applications, and artificial reality applications (e.g., the applications associated with artificial reality).

The HIPD 8000 is configured to operate without a display. However, in optional embodiments, the HIPD 8000 can include a display 8068 (FIG. 9B). The HIPD 8000 can also income one or more optional peripheral buttons 8067 (FIG. 9B). For example, the peripheral buttons 8067 can be used to turn on or turn off the HIPD 8000. Further, the HIPD 8000 housing can be formed of polymers and/or elastomer elastomers. The HIPD 8000 can be configured to have a non-slip surface to allow the HIPD 8000 to be placed on a surface without requiring a user to watch over the HIPD 8000. In other words, the HIPD 8000 is designed such that it would not easily slide off surfaces. In some embodiments, the HIPD 8000 include one or magnets to couple the HIPD 8000 to another surface. This allows the user to mount the HIPD 8000 to different surfaces and provide the user with greater flexibility in use of the HIPD 8000.

As described above, the HIPD 8000 can distribute and/or provide instructions for performing the one or more tasks at the HIPD 8000 and/or a communicatively coupled device. For example, the HIPD 8000 can identify one or more back-end tasks to be performed by the HIPD 8000 and one or more front-end tasks to be performed by a communicatively coupled device. While the HIPD 8000 is configured to offload and/or handoff tasks of a communicatively coupled device, the HIPD 8000 can perform both back-end and front-end tasks (e.g., via one or more processors, such as CPU 8077; FIG. 9B). The HIPD 8000 can, without limitation, can be used to perform augmenting calling (e.g., receiving and/or sending 3D or 2.5D live volumetric calls, live digital human representation calls, and/or avatar calls), discreet messaging, 6 DoF portrait/landscape gaming, AR/VR object manipulation, AR/VR content display (e.g., presenting content via a virtual display), and/or other AR/VR interactions. The HIPD 8000 can perform the above operations alone or in conjunction with a wearable device (or other communicatively coupled electronic device).

FIG. 9B shows block diagrams of a computing system 8040 of the HIPD 8000, in accordance with some embodiments. The HIPD 8000, described in detail above, can include one or more components shown in HIPD computing system 8040. The HIPD 8000 will be understood to include the components shown and described below for the HIPD computing system 8040. In some embodiments, all, or a substantial portion of the components of the HIPD computing system 8040 are included in a single integrated circuit. Alternatively, in some embodiments, components of the HIPD computing system 8040 are included in a plurality of integrated circuits that are communicatively coupled.

The HIPD computing system 8040 can include a processor (e.g., a CPU 8077, a GPU, and/or a CPU with integrated graphics), a controller 8075, a peripherals interface 8050 that includes one or more sensors 8051 and other peripheral devices, a power source (e.g., a power system 8095), and memory (e.g., a memory 8078) that includes an operating system (e.g., an operating system 8079), data (e.g., data 8088), one or more applications (e.g., applications 8080), and one or more modules (e.g., a communications interface module 8081, a graphics module 8082, a task and processing management module 8083, an interoperability module 8084, an AR processing module 8085, and/or a data management module 8086). The HIPD computing system 8040 further includes a power system 8095 that includes a charger input and output 8096, a PMIC 8097, and a battery 8098, all of which are defined above.

In some embodiments, the peripherals interface 8050 can include one or more sensors 8051. The sensors 8051 can include analogous sensors to those described above in reference to FIG. 7B. For example, the sensors 8051 can include imaging sensors 8054, (optional) EMG sensors 8056, IMU sensors 8058, and capacitive sensors 8060. In some embodiments, the sensors 8051 can include one or more pressure sensor 8052 for sensing pressure data, an altimeter 8053 for sensing an altitude of the HIPD 8000, a magnetometer 8055 for sensing a magnetic field, a depth sensor 8057 (or a time-of flight sensor) for determining a difference between the camera and the subject of an image, a position sensor 8059 (e.g., a flexible position sensor) for sensing a relative displacement or position change of a portion of the HIPD 8000, a force sensor 8061 for sensing a force applied to a portion of the HIPD 8000, and a light sensor 8062 (e.g., an ambient light sensor) for detecting an amount of lighting. The sensors 8051 can include one or more sensors not shown in FIG. 10B.

Analogous to the peripherals described above in reference to FIGS. 7B, the peripherals interface 8050 can also include an NFC component 8063, a GPS component 8064, an LTE component 8065, a Wi-Fi and/or Bluetooth communication component 8066, a speaker 8069, a haptic device 8071, and a microphone 8073. As described above in reference to FIG. 9A, the HIPD 8000 can optionally include a display 8068 and/or one or more buttons 8067. The peripherals interface 8050 can further include one or more cameras 8070, touch surfaces 8072, and/or one or more light emitters 8074. The multi-touch input surface 8002 described above in reference to FIG. 9A is an example of touch surface 8072. The light emitters 8074 can be one or more LEDs and/or lasers, and can be used to project or present information to a user. For example, the light emitters 8074 can include light indicators 8012 and 8026 described above in reference to FIG. 9A. The cameras 8070 (e.g., cameras 8014 and 8022 described above in FIG. 9A) can include one or more wide angle cameras, fish-eye cameras, spherical cameras, compound eye cameras (e.g., stereo and multi cameras), depth cameras, RGB cameras, ToF cameras, RGB-D cameras (depth and ToF cameras), and/or other available cameras. Cameras 8070 can be used for SLAM; 6 DoF ray casting, gaming, object manipulation, and/or other rendering; and/or facial recognition and facial expression recognition.

Similar to the watch body computing system 6060 and the watch band computing system 6030 described above in reference to FIG. 7B, the HIPD computing system 8040 can include one or more haptic controllers 8076 and associated componentry (e.g., haptic devices 8071) for providing haptic events at the HIPD 8000.

Memory 8078 can include high-speed random-access memory and/or non-volatile memory, such as one or more magnetic disk storage devices, flash memory devices, or other non-volatile solid-state memory devices. Access to the memory 8078 by other components of the HIPD 8000, such as the one or more processors and the peripherals interface 8050, can be controlled by a memory controller of the controllers 8075.

In some embodiments, software components stored in the memory 8078 include one or more operating systems 8079, one or more applications 8080, one or more communication interface modules 8081, one or more graphics modules 8082, one or more data management modules 8086, which are analogous to the software components described above in reference to FIG. 7B.

In some embodiments, software components stored in the memory 8078 include a task and processing management module 8083 for identifying one or more front-end and back-end tasks associated with an operation performed by the user, performing one or more front-end and/or back-end tasks, and/or providing instructions to one or more communicatively coupled devices that cause performance of the one or more front-end and/or back-end tasks. In some embodiments, the task and processing management module 8083 uses data 8088 (e.g., device data 8090) to distribute the one or more front-end and/or back-end tasks based on communicatively coupled devices' computing resources, available power, thermal headroom, ongoing operations, and/or other factors. For example, the task and processing management module 8083 can cause the performance of one or more back-end tasks (of an operation performed at communicatively coupled AR system 7000) at the HIPD 8000 in accordance with a determination that the operation is utilizing a predetermined amount (e.g., at least 70%) of computing resources available at the AR system 7000.

In some embodiments, software components stored in the memory 8078 include an interoperability module 8084 for exchanging and utilizing information received and/or provided to distinct communicatively coupled devices. The interoperability module 8084 allows for different systems, devices, and/or applications to connect and communicate in a coordinated way without user input. In some embodiments, software components stored in the memory 8078 include an AR module 8085 that is configured to process signals based at least on sensor data for use in an AR and/or VR environment. For example, the AR module 8085 can be used for 3D object manipulation, gesture recognition, facial and facial expression, and/or recognition.

The memory 8078 can also include data 8088, including structured data. In some embodiments, the data 8088 includes profile data 8089, device data 8090 (including device data of one or more devices communicatively coupled with the HIPD 8000, such as device type, hardware, software, and/or configurations), sensor data 8091, media content data 8092, and application data 8093.

It should be appreciated that the HIPD computing system 8040 is an example of a computing system within the HIPD 8000, and that the HIPD 8000 can have more or fewer components than shown in the HIPD computing system 8040, combine two or more components, and/or have a different configuration and/or arrangement of the components. The various components shown in HIPD computing system 8040 are implemented in hardware, software, firmware, or a combination thereof, including one or more signal processing and/or application-specific integrated circuits.

The techniques described above in FIG. 9A-9B can be used with any device used as a human-machine interface controller. In some embodiments, an HIPD 8000 can be used in conjunction with one or more wearable device such as a head-wearable device (e.g., AR system 7000 and VR system 7010) and/or a wrist-wearable device 6000 (or components thereof). In some embodiments, an HIPD 8000 is used in conjunction with a wearable garment, such as the wearable gloves of FIGS. 10A-10C. Having thus described example HIPD 8000, attention will now be turned to example feedback devices, such as device 9000.

Example Feedback Devices

Figure 10B:
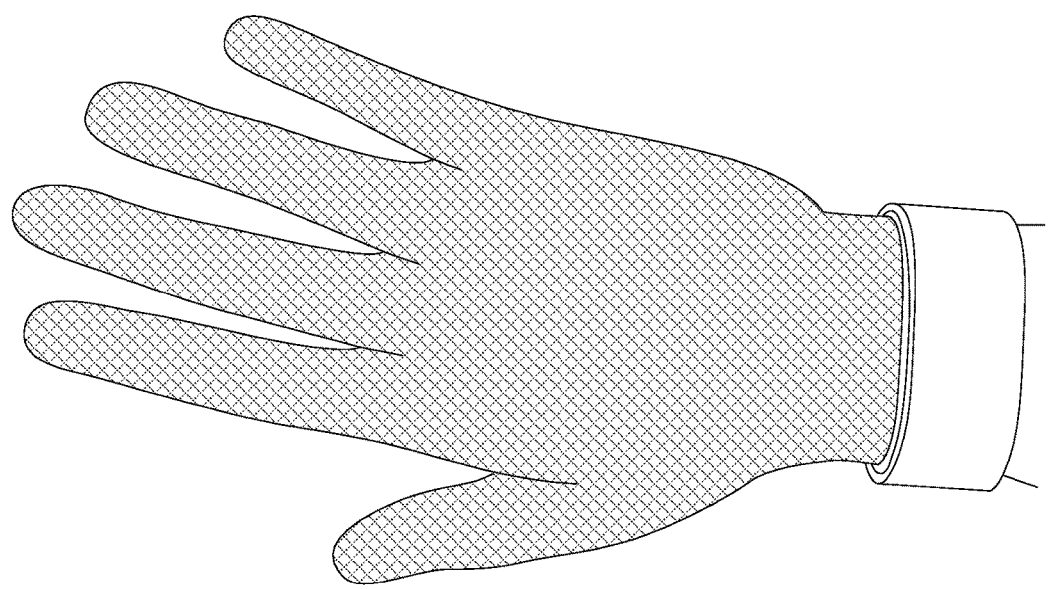
FIGS. 10A-10C illustrate example wearable gloves in accordance with some embodiments.
Figure 10A:
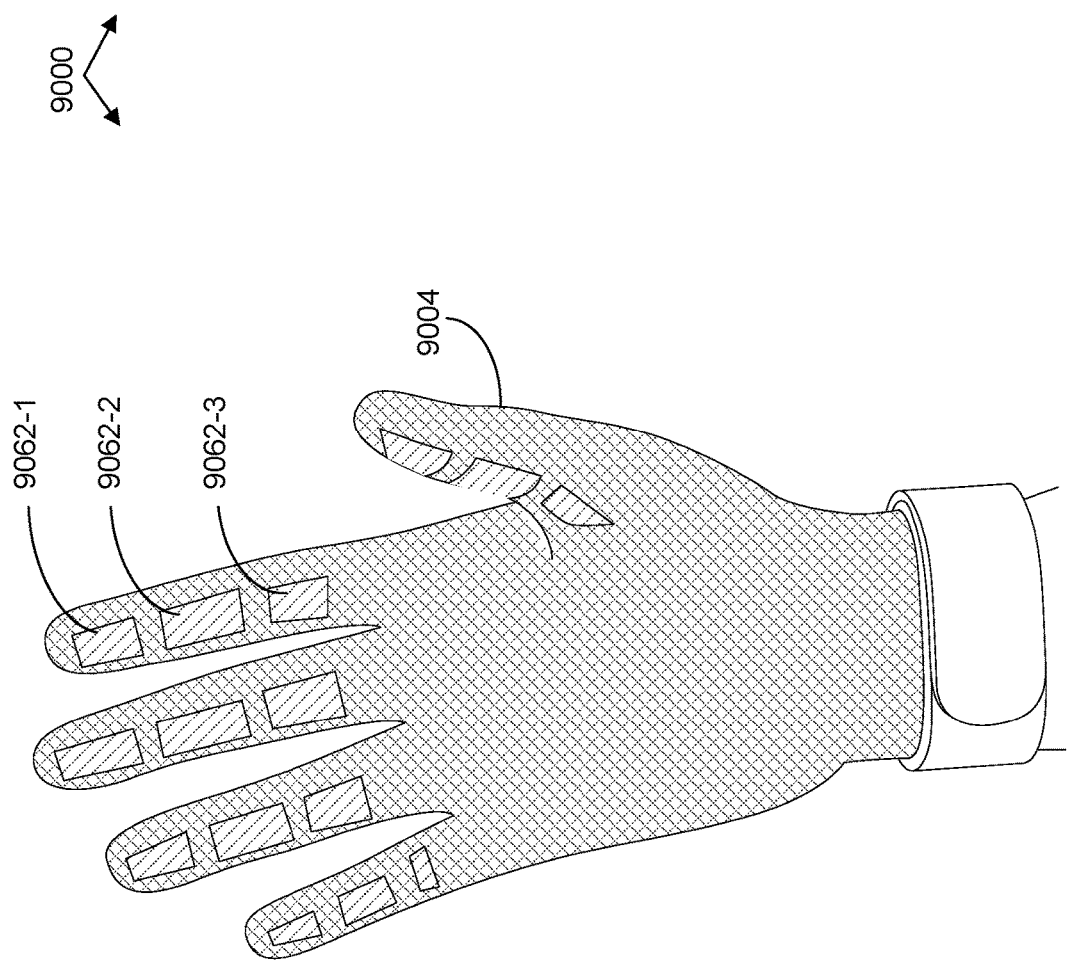

FIGS. 10A and 10B show example haptic feedback systems (e.g., hand-wearable devices) for providing feedback to a user regarding the user's interactions with a computing system (e.g., an artificial-reality environment presented by the AR system 7000 or the VR system 7010). In some embodiments, a computing system (e.g., the AR system 5000d) may also provide feedback to one or more users based on an action that was performed within the computing system and/or an interaction provided by the AR system (e.g., which may be based on instructions that are executed in conjunction with performing operations of an application of the computing system). Such feedback may include visual and/or audio feedback and may also include haptic feedback provided by a haptic assembly, such as one or more haptic assemblies 9062 of the device 9000 (e.g., haptic assemblies 9062-1, 9062-2, and 9062-3). For example, the haptic feedback may prevent (or, at a minimum, hinder/resist movement of) one or more fingers of a user from bending past a certain point to simulate the sensation of touching a solid coffee mug. In actuating such haptic effects, the device 9000 can change (either directly or indirectly) a pressurized state of one or more of the haptic assemblies 9062.

Each of the haptic assemblies 9062 includes a mechanism that, at a minimum, provides resistance when the respective haptic assembly 9062 is transitioned from a first pressurized state (e.g., atmospheric pressure or deflated) to a second pressurized state (e.g., inflated to a threshold pressure). Structures of haptic assemblies 9062 can be integrated into various devices configured to be in contact or proximity to a user's skin, including, but not limited to devices such as glove worn devices, body worn clothing device, and headset devices.

As noted above, the haptic assemblies 9062 described herein can be configured to transition between a first pressurized state and a second pressurized state to provide haptic feedback to the user. Due to the ever-changing nature of artificial reality, the haptic assemblies 9062 may be required to transition between the two states hundreds, or perhaps thousands of times, during a single use. Thus, the haptic assemblies 9062 described herein are durable and designed to quickly transition from state to state. To provide some context, in the first pressurized state, the haptic assemblies 9062 do not impede free movement of a portion of the wearer's body. For example, one or more haptic assemblies 9062 incorporated into a glove are made from flexible materials that do not impede free movement of the wearer's hand and fingers (e.g., an electrostatic-zipping actuator). The haptic assemblies 9062 are configured to conform to a shape of the portion of the wearer's body when in the first pressurized state. However, once in the second pressurized state, the haptic assemblies 9062 can be configured to restrict and/or impede free movement of the portion of the wearer's body (e.g., appendages of the user's hand). For example, the respective haptic assembly 9062 (or multiple respective haptic assemblies) can restrict movement of a wearer's finger (e.g., prevent the finger from curling or extending) when the haptic assembly 9062 is in the second pressurized state. Moreover, once in the second pressurized state, the haptic assemblies 9062 may take different shapes, with some haptic assemblies 9062 configured to take a planar, rigid shape (e.g., flat and rigid), while some other haptic assemblies 9062 are configured to curve or bend, at least partially.

As a non-limiting example, the device 9000 includes a plurality of haptic devices (e.g., a pair of haptic gloves, and a haptics component of a wrist-wearable device (e.g., any of the wrist-wearable devices described with respect to FIGS. 7A-7B. Each of which can include a garment component (e.g., a garment 9004) and one or more haptic assemblies coupled (e.g., physically coupled) to the garment component. For example, each of the haptic assemblies 9062-1, 9062-2, 9062-3, . . . 9062-N are physically coupled to the garment 9004 are configured to contact respective phalanges of a user's thumb and fingers. As explained above, the haptic assemblies 9062 are configured to provide haptic simulations to a wearer of the device 9000. The garment 9004 of each device 9000 can be one of various articles of clothing (e.g., gloves, socks, shirts, or pants). Thus, a user may wear multiple devices 9000 that are each configured to provide haptic stimulations to respective parts of the body where the devices 9000 are being worn.

Figure 10C:
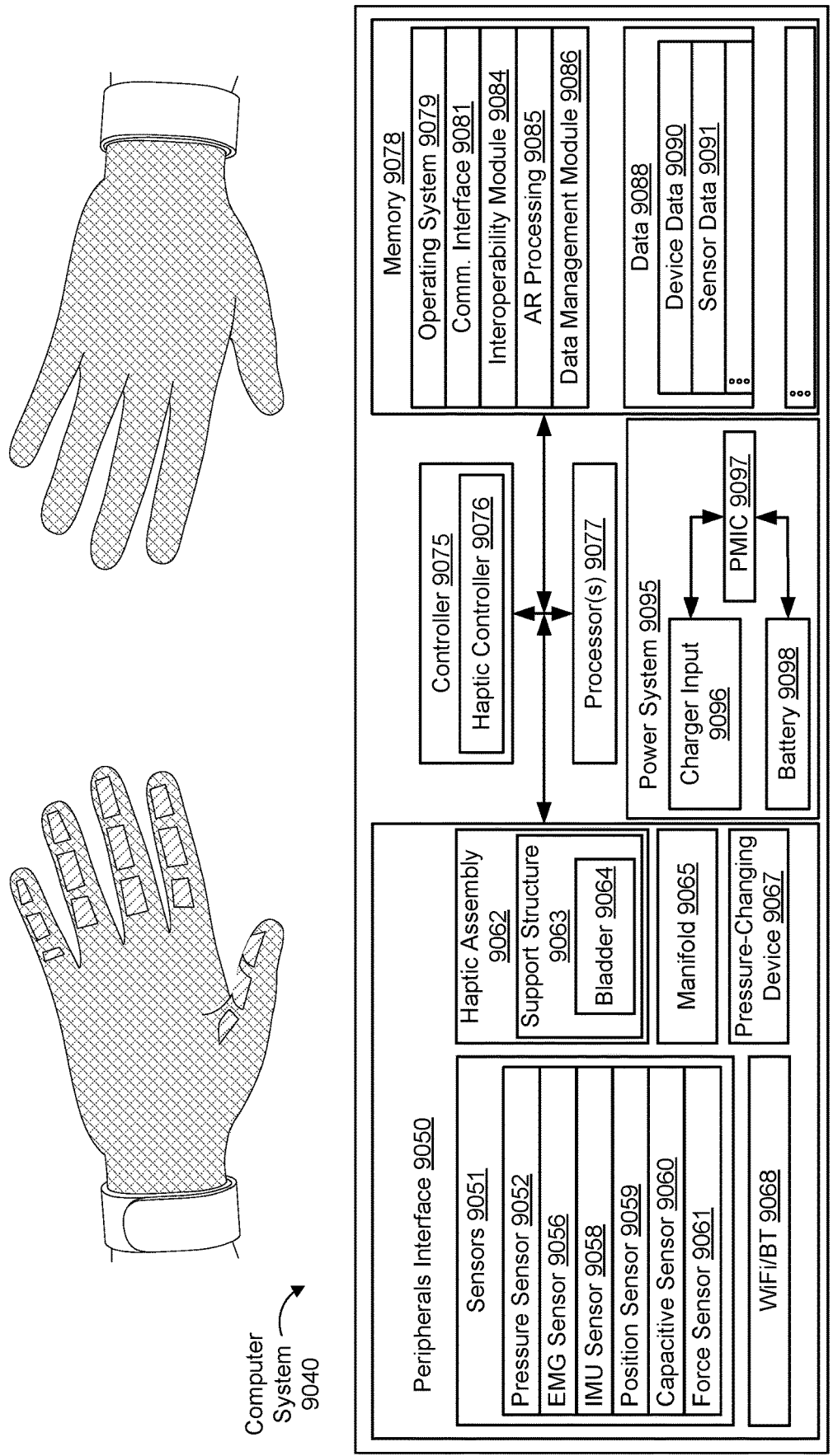

FIG. 10C shows block diagrams of a computing system 9040 of the device 9000, in accordance with some embodiments. The computing system 9040 can include one or more peripheral interfaces 9050, one or more power systems 9095, one or more controllers 9075 (including one or more haptic controllers 9076), one or more processors 9077 (as defined above, including any of the examples provided), and memory 9078, which can all be in electronic communication with each other. For example, the one or more processors 9077 can be configured to execute instructions stored in the memory 9078, which can cause a controller of the one or more controllers 9075 to cause operations to be performed at one or more peripheral devices of the peripherals interface 9050. In some embodiments, each operation described can occur based on electrical power provided by the power system 9095. The power system 9095 includes a charger input 9096, a PMIC 9097, and a battery 9098.

In some embodiments, the peripherals interface 9050 can include one or more devices configured to be part of the computing system 9040, many of which have been defined above and/or described with respect to wrist-wearable devices shown in FIGS. 7A and 7B. For example, the peripherals interface 9050 can include one or more sensors 9051. Some example sensors include: one or more pressure sensors 9052, one or more EMG sensors 9056, one or more IMU sensors 9058, one or more position sensors 9059, one or more capacitive sensors 9060, one or more force sensors 9061; and/or any other types of sensors defined above or described with respect to any other embodiments discussed herein.

In some embodiments, the peripherals interface can include one or more additional peripheral devices, including one or more Wi-Fi and/or Bluetooth devices 9068; one or more haptic assemblies 9062; one or more support structures 9063 (which can include one or more bladders 9064; one or more manifolds 9065; one or more pressure-changing devices 9067; and/or any other types of peripheral devices defined above or described with respect to any other embodiments discussed herein.

In some embodiments, each haptic assembly 9062 includes a support structure 9063, and at least one bladder 9064. The bladder 9064 (e.g., a membrane) is a sealed, inflatable pocket made from a durable and puncture resistance material, such as thermoplastic polyurethane (TPU), a flexible polymer, or the like. The bladder 9064 contains a medium (e.g., a fluid such as air, inert gas, or even a liquid) that can be added to or removed from the bladder 9064 to change a pressure (e.g., fluid pressure) inside the bladder 9064. The support structure 9063 is made from a material that is stronger and stiffer than the material of the bladder 9064. A respective support structure 9063 coupled to a respective bladder 9064 is configured to reinforce the respective bladder 9064 as the respective bladder changes shape and size due to changes in pressure (e.g., fluid pressure) inside the bladder.

The device 9000 also includes a haptic controller 9076 and a pressure-changing device 9067. In some embodiments, the haptic controller 9076 is part of the computer system 9040 (e.g., in electronic communication with one or more processors 9077 of the computer system 9040). The haptic controller 9076 is configured to control operation of the pressure-changing device 9067, and in turn operation of the device 9000. For example, the controller 9076 sends one or more signals to the pressure-changing device 9067 to activate the pressure-changing device 9067 (e.g., turn it on and off). The one or more signals may specify a desired pressure (e.g., pounds-per-square inch) to be output by the pressure-changing device 9067. Generation of the one or more signals, and in turn the pressure output by the pressure-changing device 9067, may be based on information collected by the sensors in FIGS. 6A and 6B. For example, the one or more signals may cause the pressure-changing device 9067 to increase the pressure (e.g., fluid pressure) inside a haptic assembly 9062 at a first time, based on the information collected by the sensors in FIGS. 6A and 6B (e.g., the user makes contact with an artificial coffee mug). Then, the controller may send one or more additional signals to the pressure-changing device 9067 that cause the pressure-changing device 9067 to further increase the pressure inside the haptic assembly 9062 at a second time after the first time, based on additional information collected by the sensors 9051. Further, the one or more signals may cause the pressure-changing device 9067 to inflate one or more bladders 9064 in a device 9000-A, while one or more bladders 9064 in a device 9000-B remain unchanged. Additionally, the one or more signals may cause the pressure-changing device 9067 to inflate one or more bladders 9064 in a device 9000-A to a first pressure and inflate one or more other bladders 9064 in the device 9000-A to a second pressure different from the first pressure. Depending on the number of devices 9000 serviced by the pressure-changing device 9067, and the number of bladders therein, many different inflation configurations can be achieved through the one or more signals and the examples above are not meant to be limiting.

The device 9000 may include an optional manifold 9065 between the pressure-changing device 9067 and the devices 9000. The manifold 9065 may include one or more valves (not shown) that pneumatically couple each of the haptic assemblies 9062 with the pressure-changing device 9067 via tubing. In some embodiments, the manifold 9065 is in communication with the controller 9075, and the controller 9075 controls the one or more valves of the manifold 9065 (e.g., the controller generates one or more control signals). The manifold 9065 is configured to switchably couple the pressure-changing device 9067 with one or more haptic assemblies 9062 of the same or different devices 9000 based on one or more control signals from the controller 9075. In some embodiments, instead of using the manifold 9065 to pneumatically couple the pressure-changing device 9067 with the haptic assemblies 9062, the device 9000 may include multiple pressure-changing devices 9067, where each pressure-changing device 9067 is pneumatically coupled directly with a single (or multiple) haptic assembly 9062. In some embodiments, the pressure-changing device 9067 and the optional manifold 9065 are configured as part of one or more of the devices 9000 (not illustrated) while, in other embodiments, the pressure-changing device 9067 and the optional manifold 9065 are configured as external to the device 9000. A single pressure-changing device 9067 may be shared by multiple devices 9000.

In some embodiments, the pressure-changing device 9067 is a pneumatic device, hydraulic device, a pneudraulic device, or some other device capable of adding and removing a medium (e.g., fluid, liquid, gas) from the one or more haptic assemblies 9062.

The devices shown in FIGS. 10A to 10C may be coupled via a wired connection (e.g., via busing). Alternatively, one or more of the devices shown in FIGS. 10A to 10C may be wirelessly connected (e.g., via short-range communication signals).

The memory 9078 includes instructions and data, some or all of which may be stored as non-transitory computer-readable storage media within the memory 9078. For example, the memory 9078 can include one or more operating systems 9079; one or more communication interface applications 9081; one or more interoperability modules 9084; one or more AR processing applications 9085; one or more data management modules 9086; and/or any other types of data defined above or described with respect to any other embodiments discussed herein.

The memory 9078 also includes data 9088 which can be used in conjunction with one or more of the applications discussed above. The data 9088 can include: device data 9090; sensor data 9091; and/or any other types of data defined above or described with respect to any other embodiments discussed herein.

Having thus described system-block diagrams and then example devices, attention will now be directed to certain example embodiments.

EXAMPLE ASPECTS AND EMBODIMENTS (A1) In one aspect, a method (e.g., the method 400) of tracking user movements is disclosed. The method 400 is performed at a computing system (e.g., the AR system 5000 shown in FIGS. 6A-6D). In some embodiments, the computing system includes one or more wearable devices (e.g., the wrist-wearable device 120 and/or head-wearable device 230). In some embodiments, the computing system includes one or more intermediary devices (e.g., a smartphone, laptop, or gaming console). In some embodiments, the computing system includes one or more handheld devices 360 (e.g., a controller or HIPD 8000). In some embodiments, a method of tracking user movements includes while a user (e.g., user 110) is interacting with a virtual object (e.g., virtual object 140), obtaining tracking information by tracking, via a sensor (e.g., a neuromuscular-signal sensor or IMU), a position of an arm of a user. In conjunction with tracking the position of the arm, the method further includes obtaining wrist information by detecting, via a neuromuscular-signal sensor, a movement of a wrist of the arm and assigning one or more motion characteristics to the virtual object in accordance with the tracking information and the wrist information. For example, detecting the arm position includes detecting a position a hand on the arm. In some embodiments, assigning the one or more motion characteristics includes programmatically associating the one or more motion characteristics with the virtual object, e.g., so that a device can later retrieve the motion characteristics and render the virtual object with the motion characteristics applied.

(A2) In some embodiments of A1, the method further includes determining an angle of release based on the wrist information and a release input from the user and assigning the one or more motion characteristics in accordance with the angle of release.

(A3) In some embodiments of A1 or A2, the method further includes determining a center of mass based on the wrist information and assigning the one or more motion characteristics in accordance with the center of mass.

(A4) In some embodiments of any of A1-A3, assigning the one or more motion characteristics to the virtual object includes assigning a speed and a direction to the virtual object. In some embodiments, an acceleration is assigned to the virtual object in accordance with the wrist and tracking information.

(A5) In some embodiments of any of A1-A4, assigning the one or more motion characteristics to the virtual object includes assigning a trajectory to the virtual object. For example, as illustrated in FIG. 1D, the system recognized the velocity assigned to the virtual object 140 was that akin to a fastball and thus appropriately displayed the trajectory of the virtual object 140 to the user on the display 130.

(A6) In some embodiments of any of A1-A5, the sensor is an inertial measurement unit (IMU) sensor. For example, as shown in FIG. 7B, the sensor can include an IMU 6068, an imaging sensor 6063, and/or an EMG sensor 6065.

(A7) In some embodiments of any of A1-A6, the sensor is an imaging sensor. In some embodiments, the sensor is an imaging sensor of an image-based hand tracking system. In some embodiments, the sensor is arranged on a head-wearable device. For example, in FIGS. 3A-3C, the head-wearable device 232 can include an imaging sensor that tracks the user's arm and wrist movements. In some embodiments, the wrist-wearable devices 222 and 322 are coupled to the head-wearable device 232 and can assist the imaging sensor in tracking the arm and wrist movement.

(A8) In some embodiments of any of A1-A7, the sensor and the neuromuscular-signal sensor are arranged on a wrist-wearable device. For example, as shown in FIG. 7B, the sensor, neuromuscular-signal sensor, and additional sensors are arranged on the wrist-wearable device. In some embodiments, the sensors are arranged on an armband. In some embodiments, the sensors are arranged on a glove.

(A9) In some embodiments of A8, the neuromuscular-signal sensor is arranged to sense signals for a first motor unit in the arm of the user and the wrist-wearable device further includes a second neuromuscular-signal sensor arranged to sense signals for a second motor unit in the arm of the user. For example, signals in the first muscle correspond to wrist deflection in a first direction and signals in the second muscle correspond to wrist deflection in a second direction (e.g., opposite the first direction). In some embodiments, the first and second motor units correspond to the same muscle or muscle group. In some embodiments, the first and second motor units correspond to different muscles or muscle groups.

(A10) In some embodiments of any of A1-A9, the method further includes, in conjunction with tracking the position of the arm, obtaining additional tracking information by tracking a position of the other arm of the user and obtaining additional wrist information by detecting, via an additional neuromuscular-signal sensor, a movement of a wrist of the other arm, such that the one or more motion characteristics are based on the additional tracking information and the additional wrist information. In some embodiments, the position of the other arm is tracked via an additional sensor (e.g., an IMU sensor on a wearable device on the other arm).

In some embodiments, the additional neuromuscular-signal sensor is arranged on a wearable device with the additional sensor. In some embodiments, a same sensor (e.g., the sensor) is used to obtain the tracking information and the additional tracking information.

(A11) In some embodiments of any of A1-A10, the sensor is arranged on a controller. For example, the user is holding the controller while interacting with the virtual object. In some embodiments, the user 110 uses a handheld device 360 in conjunction with or independently of a wrist-wearable device 120. In some embodiments, the handheld device 360 also includes a sensor that can also track arm/wrist information and provide it to the system or the user 110.

(A12) In some embodiments of any of A1-A11, the user interacting with the virtual object includes the user throwing the virtual object and the one or more motion characteristics are assigned to the virtual object in response to detecting the user perform a release gesture. In some embodiments, the one or more motion characteristics are determined based on a time of release of the virtual object.

(A13) In some embodiments of A12, a rotational velocity of the virtual object is assigned based on the wrist information. In some embodiments, the wrist information can indicate the user 110 has rotated their wrist in a way that would affect the rotational velocity of the virtual object 140 and ultimately the trajectory the virtual object 140 will travel. In some embodiments, the rotational velocity is assigned based on hand (e.g., finger) information in the wrist information. For example, the rotational velocity is assigned based on a position of one or more fingers at a time of release (e.g., the time when the release gesture is performed).

(A14) In some embodiments of A12 or A13, the release gesture comprises the user pressing or releasing a button. In some embodiments, the user 110 can be throwing a virtual object 140 while holding a handheld device 360, such that when the user 110 is ready to release the virtual object 140, they press or release a button either coupled or integrated with the handheld device 360.

(A15) In some embodiments of A12 or A13, during a throwing motion the user is performing a pinch gesture, and wherein the release gesture includes the user releasing the pinch gesture. For example, as illustrated in FIG. 1A-1H, the user 110 makes a pinching gesture as if they were holding a real ball in their hand to simulate the user 110 is getting ready to throw the ball. Additionally, when the user's arm and hand are in the release position, as shown in FIGS. 1D, 1G and 1H, the user 110 releases the pinch gesture to indicate they have let go/thrown the virtual ball.

(A16) In some embodiments of any of A1-A11, the virtual object is a virtual ball and the user interacting with the virtual object includes the user striking the virtual ball. For example, the user is striking the virtual ball with a (real or virtual) golf club or baseball bat. For example, as shown in FIGS. 2A-2C, the user 110 is playing virtual baseball and is hitting a virtual baseball with a virtual bat 250. Additionally, as illustrated in FIGS. 3A-3C, the user 110 is playing virtual golf and hitting a virtual golf ball with a virtual golf club 350.

(A17) In some embodiments of any of A1-A16, the virtual object is displayed to the user via a head-wearable device (e.g., artificial reality glasses or a virtual reality headset). For example, as shown in FIGS. 2A-3C, the virtual object is displayed on either AR glasses or a VR headset.

(A18) In some embodiments of any of A1-A17, feedback information corresponding to the one or more motion characteristics is provided to the user. For example, as shown in FIG. 1G, the system provided the user 110 with feedback via a message 136 on the display 130 indicating the user 110 can improve their form. For example, the feedback information indicates to the user whether the user's form is correct. In some embodiments, the feedback information includes audio feedback, visual feedback, and/or haptic feedback. In some embodiments, the feedback information is provided to the user via the head-wearable device.

In some embodiments, a wearable device detects neuromuscular signals travelling through the user's neck or back, which can be done using neuromuscular-signal sensors coupled with the VR goggles or the AR glasses in some example embodiments.

In another aspect, some embodiments include a computing system (e.g., the AR system 5000) comprising one or more processors and memory coupled to the one or more processors, the memory storing one or more programs configured to be executed by the one or more processors, the one or more programs including instructions for performing any of the methods described herein (e.g., the methods 400, 500, and A1-A18 above).

In yet another aspect, some embodiments include a non-transitory computer-readable storage medium storing one or more programs for execution by one or more processors of a computing system, the one or more programs including instructions for performing any of the methods described herein (e.g., the methods 400, 500, and A1-A18 above).

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of tracking user movements, the method comprising:
   while a user is interacting with a virtual object displayed to the user via a head-wearable device:
   obtaining tracking information by tracking, via a sensor, a position of an arm of the user; and
   in conjunction with tracking the position of the arm, obtaining wrist information by detecting, via a neuromuscular-signal sensor, neuromuscular signals indicating respective muscle intensity levels at a wrist of the arm while the user is continuing to interact with the virtual object;
   determining, based on one or both of the tracking information and the neuromuscular signals indicating respective muscle intensity levels at the wrist of the arm while the user is continuing to interact with the virtual object, a contact feature characterizing the user's interaction with the virtual object; and
   in response to determining the contact feature, assigning one or more motion characteristics to the virtual object in accordance with the tracking information and the wrist information, wherein the one or more motion characteristics include an object velocity and an object trajectory.

2. The method of claim 1, further comprising determining an angle of release based on the wrist information and a release input from the user and assigning the one or more motion characteristics in accordance with the angle of release.

3. The method of claim 1, further comprising determining a center of mass based on the wrist information and assigning the one or more motion characteristics in accordance with the center of mass.

4. The method of claim 1, wherein the sensor is an inertial measurement unit (IMU) sensor.

5. The method of claim 1, wherein the sensor is an imaging sensor.

6. The method of claim 1, wherein the sensor and the neuromuscular-signal sensor are arranged on a wrist-wearable device.

7. The method of claim 6, wherein:
   the neuromuscular-signal sensor is arranged to sense signals for a first motor unit in the arm of the user; and
   the wrist-wearable device further includes a second neuromuscular-signal sensor arranged to sense signals for a second motor unit in the arm of the user.

8. The method of claim 1, further comprising, in conjunction with tracking the position of the arm:
   obtaining additional tracking information by tracking a position of the other arm of the user; and
   obtaining additional wrist information by detecting, via an additional neuromuscular-signal sensor, a movement of a wrist of the other arm, wherein the one or more motion characteristics are based on the additional tracking information and the additional wrist information.

9. The method of claim 1, wherein the sensor is arranged on a controller.

10. The method of claim 1, wherein:
    the user interacting with the virtual object comprises the user throwing the virtual object; and
    the one or more motion characteristics are assigned to the virtual object in response to detecting the user perform a release gesture.

11. The method of claim 10, wherein a rotational velocity of the virtual object is assigned based on the wrist information.

12. The method of claim 10, wherein the release gesture comprises the user pressing or releasing a button.

13. The method of claim 10, wherein during a throwing motion the user is performing a pinch gesture, and wherein the release gesture comprises the user releasing the pinch gesture.

14. The method of claim 1, wherein:
    the virtual object is a virtual ball; and
    the user interacting with the virtual object comprises the user striking the virtual ball.

15. The method of claim 1, wherein feedback information corresponding to the one or more motion characteristics is provided to the user.

16. A computing system, comprising:
    control circuitry;
    memory; and
    one or more sets of instructions stored in the memory and configured for execution by the control circuitry, the one or more sets of instructions comprising instructions for:
    while a user is interacting with a virtual object displayed to the user via a head-wearable device:
    obtaining tracking information by tracking, via a sensor, a position of an arm of the user; and
    in conjunction with tracking the position of the arm, obtaining wrist information by detecting, via a neuromuscular-signal sensor, neuromuscular signals indicating respective muscle intensity levels at a movement of a wrist of the arm while the user is continuing to interact with the virtual object;
    determining, based on one or both of the tracking information and the neuromuscular signals indicating respective muscle intensity levels at the wrist of the arm while the user is continuing to interact with the virtual object, a contact feature characterizing the user's interaction with the virtual object; and
    in response to determining the contact feature, assigning one or more motion characteristics to the virtual object in accordance with the tracking information and the wrist information, wherein the one or more motion characteristics include an object velocity and an object trajectory.

17. A non-transitory computer-readable storage medium storing one or more sets of instructions configured for execution by a computing device having control circuitry and memory, the one or more sets of instructions comprising instructions for:
    while a user is interacting with a virtual object displayed to the user via a head-wearable device:
    obtaining tracking information by tracking, via a sensor, a position of an arm of the user; and
    in conjunction with tracking the position of the arm, obtaining wrist information by detecting, via a neuromuscular-signal sensor, neuromuscular signals indicating respective muscle intensity levels at a movement of a wrist of the arm while the user is continuing to interact with the virtual object;
    determining, based on one or both of the tracking information and the neuromuscular signals indicating respective muscle intensity levels at the wrist of the arm while the user is continuing to interact with the virtual object, a contact feature characterizing the user's interaction with the virtual object; and
    in response to determining the contact feature, assigning one or more motion characteristics to the virtual object in accordance with the tracking information and the wrist information, wherein the one or more motion characteristics include an object velocity and an object trajectory.

18. The non-transitory computer-readable storage medium of claim 17, wherein the one or more sets of instructions further include instructions for: conjunction with tracking the position of the arm:
  determining an angle of release based on the wrist information and a release input from the user and assigning the one or more motion characteristics in accordance with the angle of release.

19. The non-transitory computer-readable storage medium of claim 17, wherein the one or more sets of instructions further include instructions for:
  in conjunction with tracking the position of the arm:
    obtaining additional tracking information by tracking a position of the other arm of the user; and
    obtaining additional wrist information by detecting, via an additional neuromuscular-signal sensor, a movement of a wrist of the other arm, wherein the one or more motion characteristics are based on the additional tracking information and the additional wrist information.

* * * * *